INVENTOR:
RICHARD P. BOYER JR.
BY John J. Bellamy
ATTORNEY

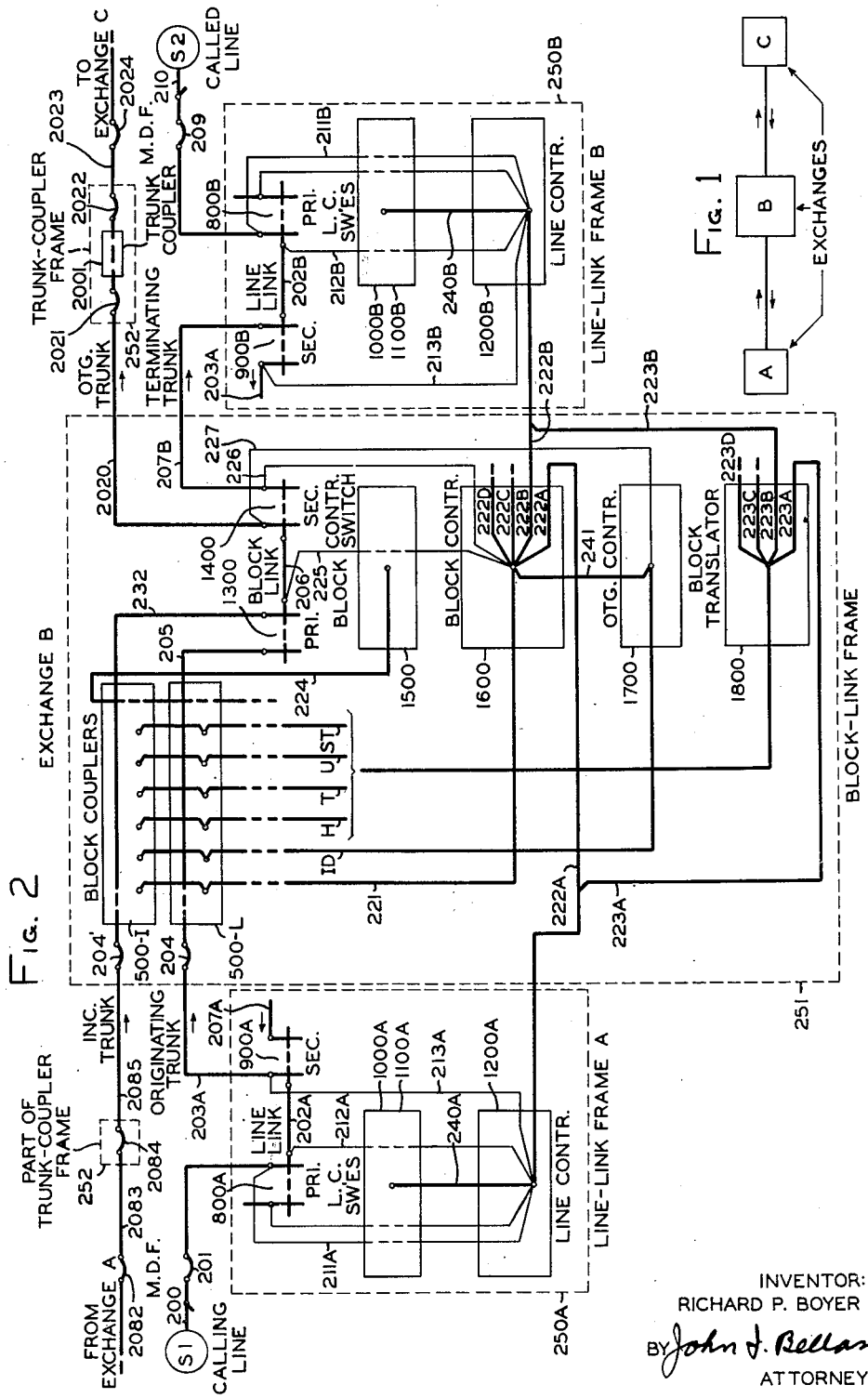

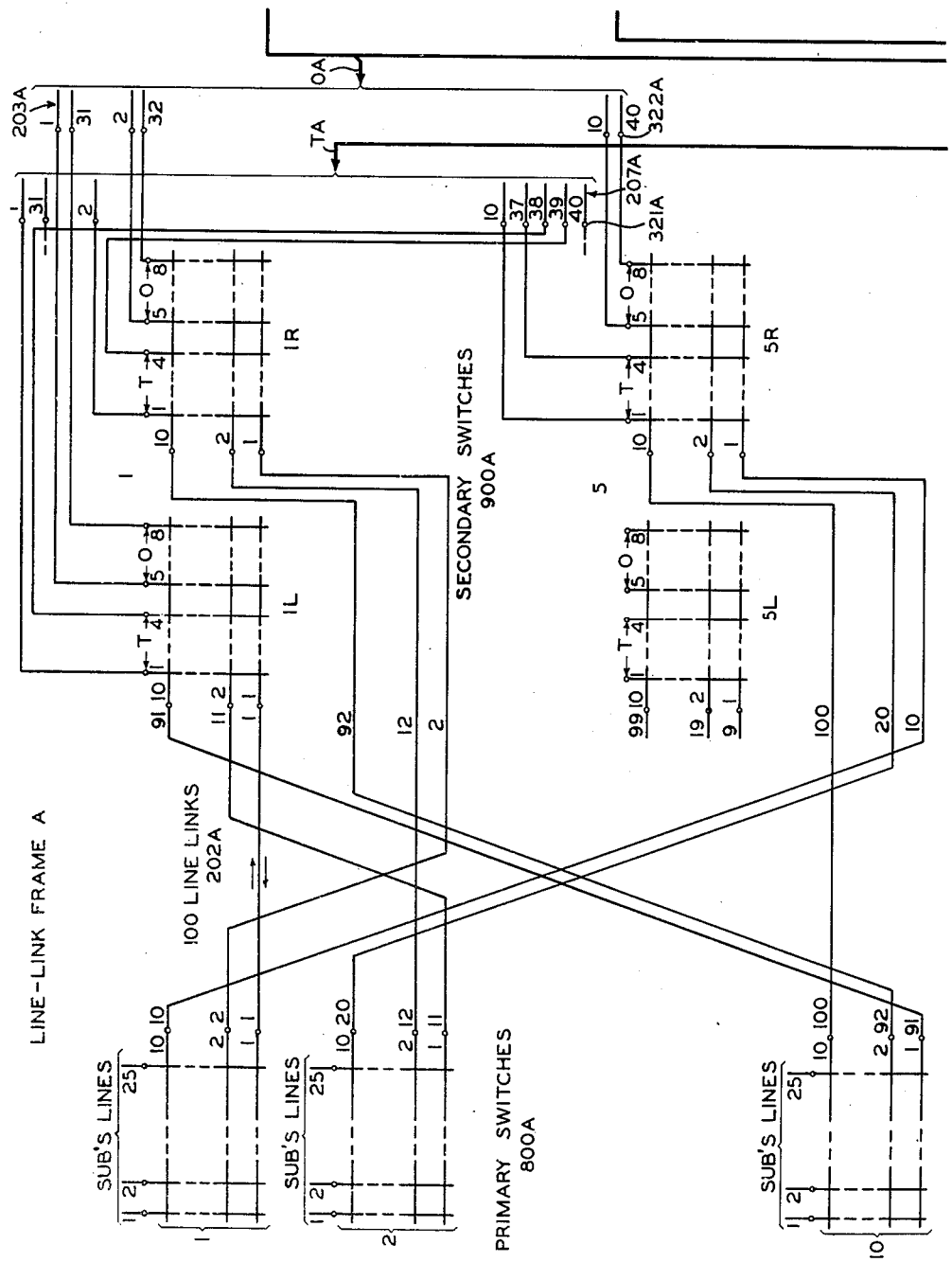

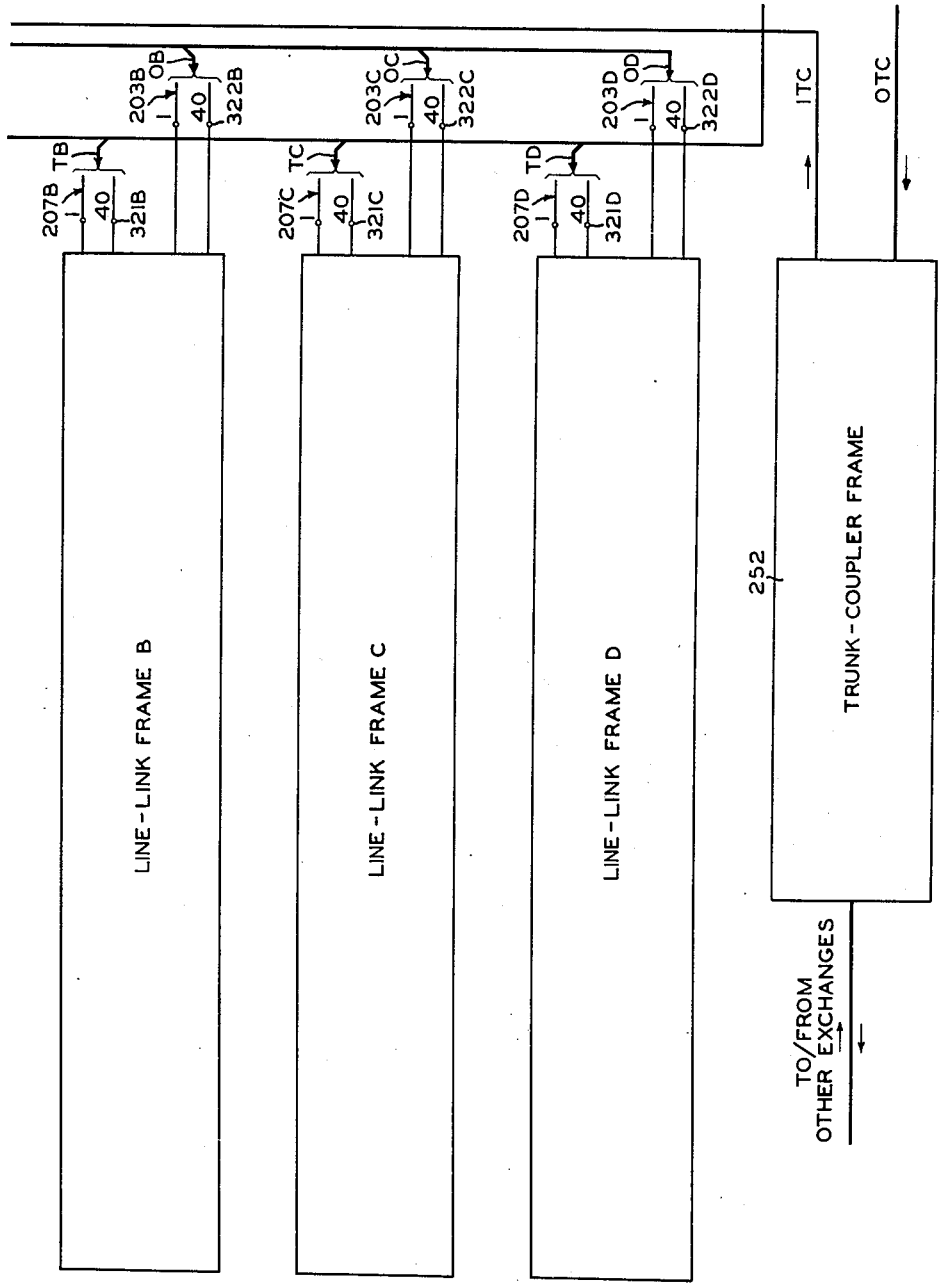

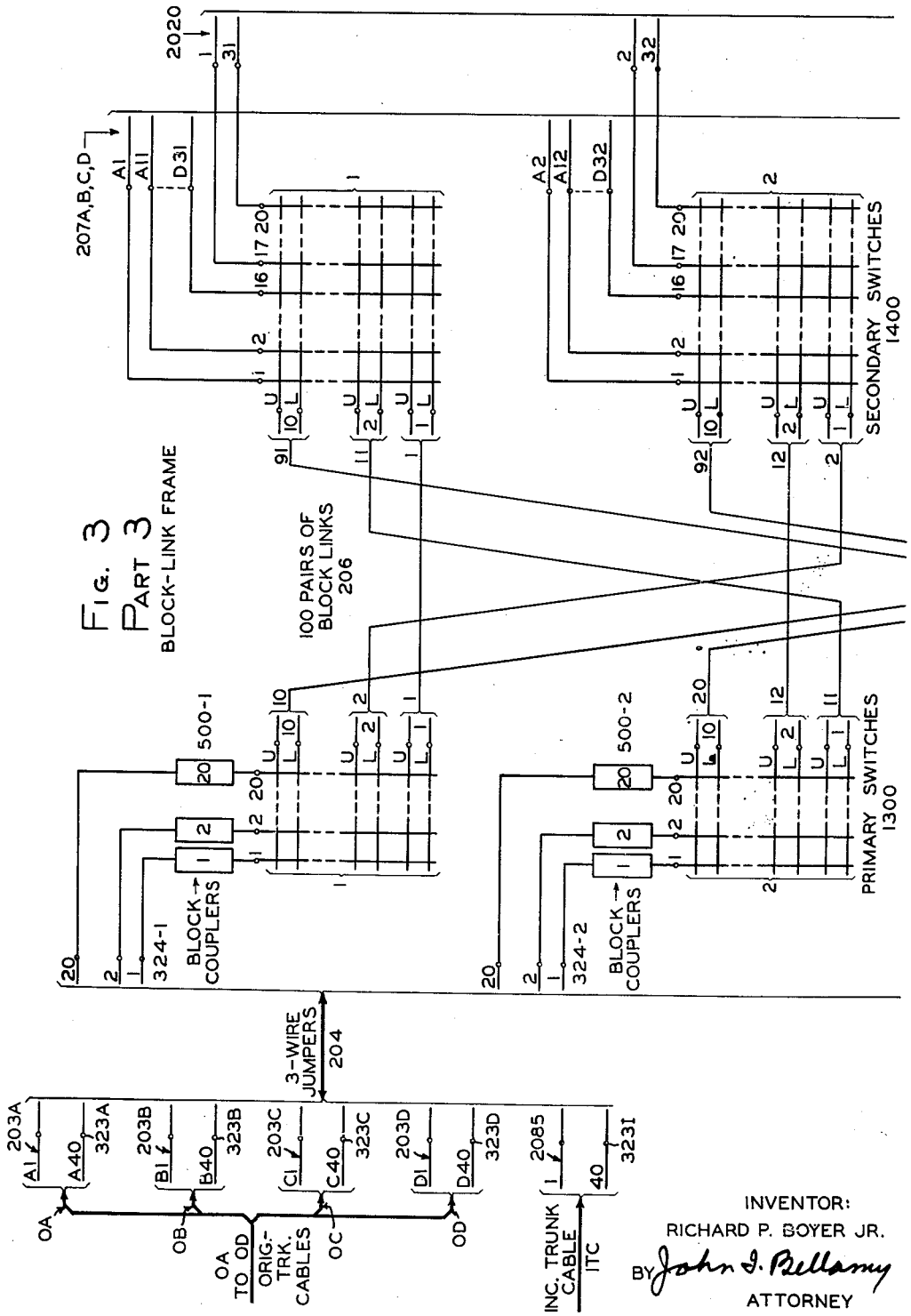

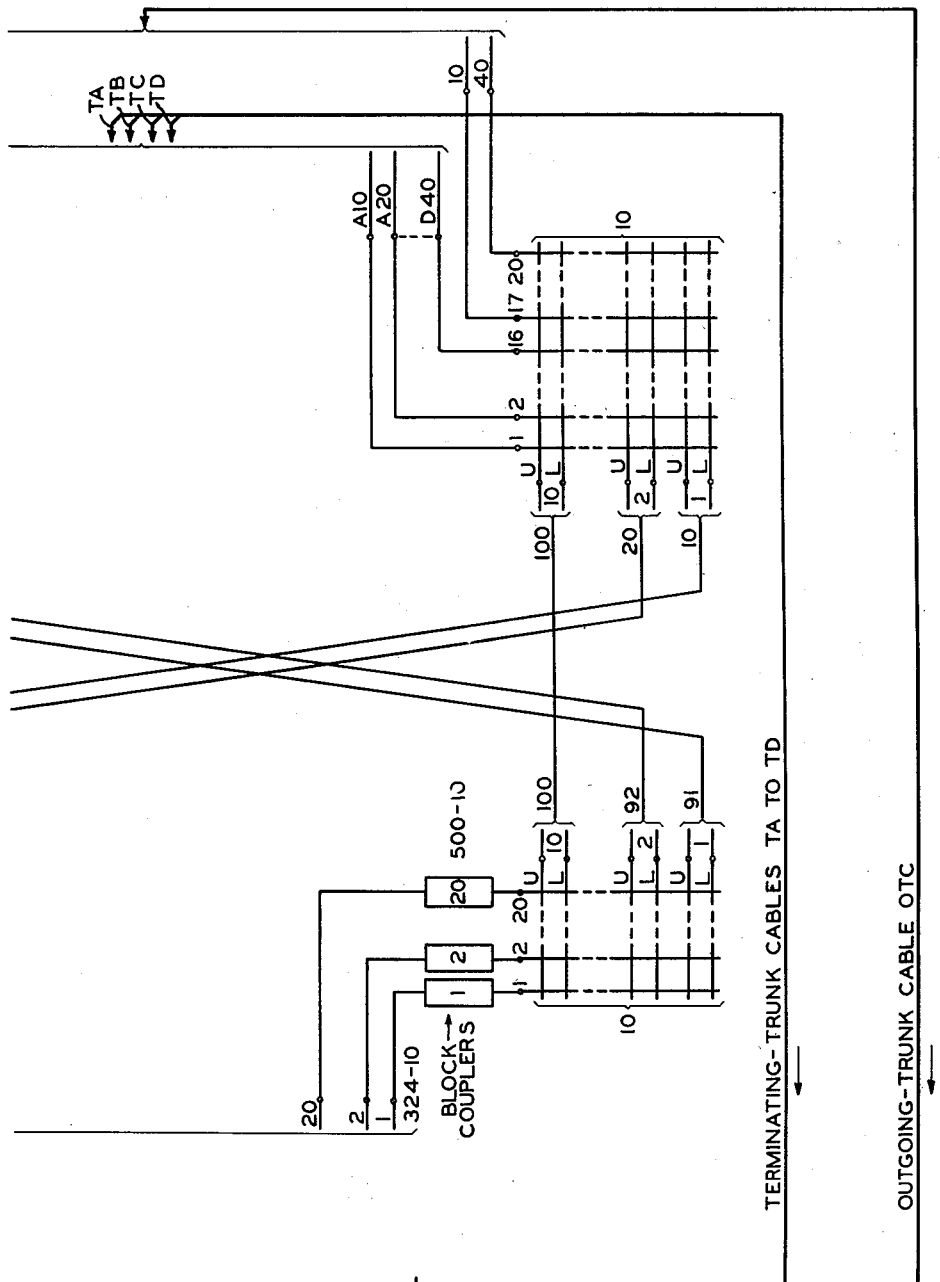

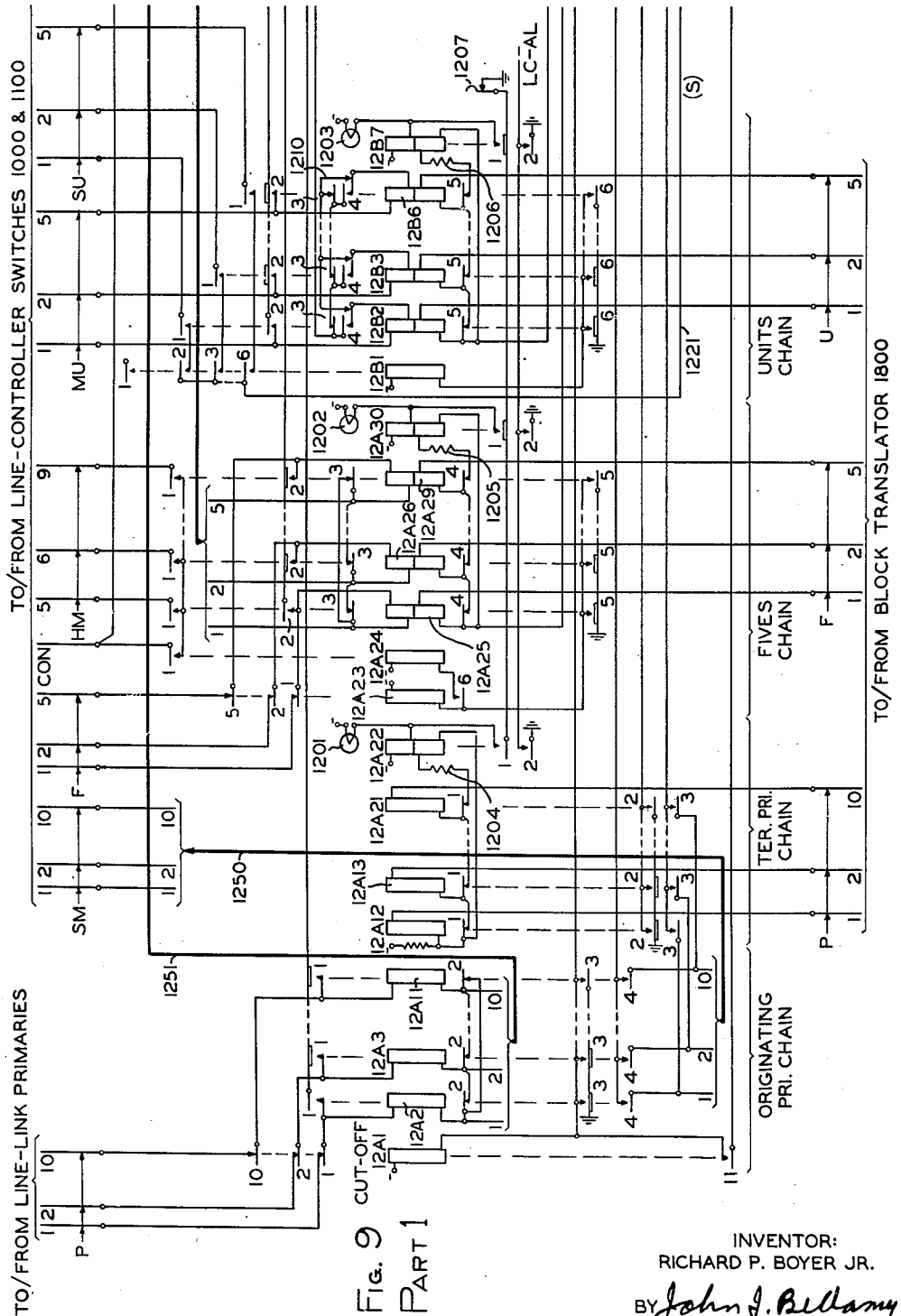

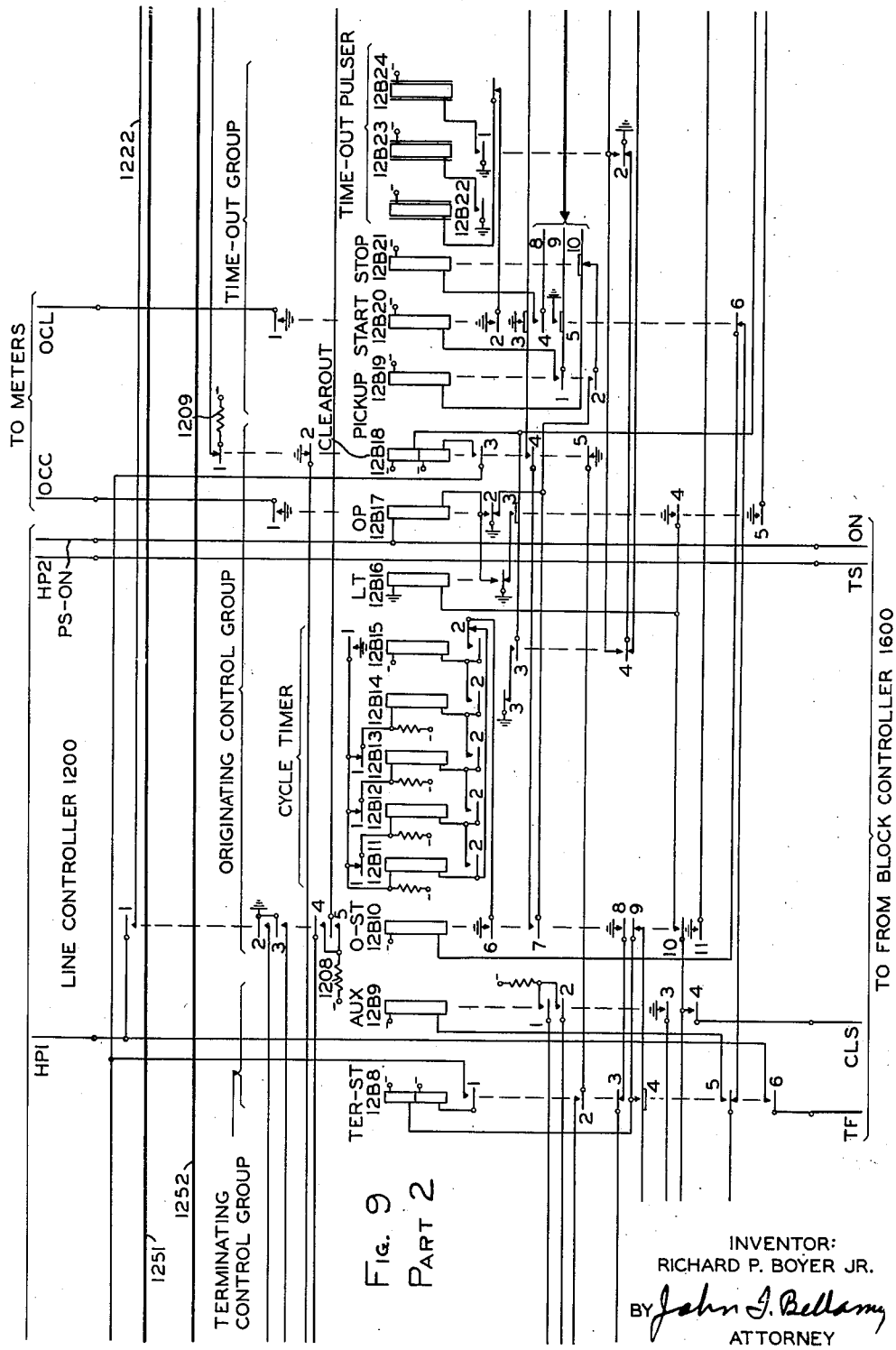
Fig. 9 Part 2
INVENTOR:
RICHARD P. BOYER JR.
BY John J. Bellamy
ATTORNEY

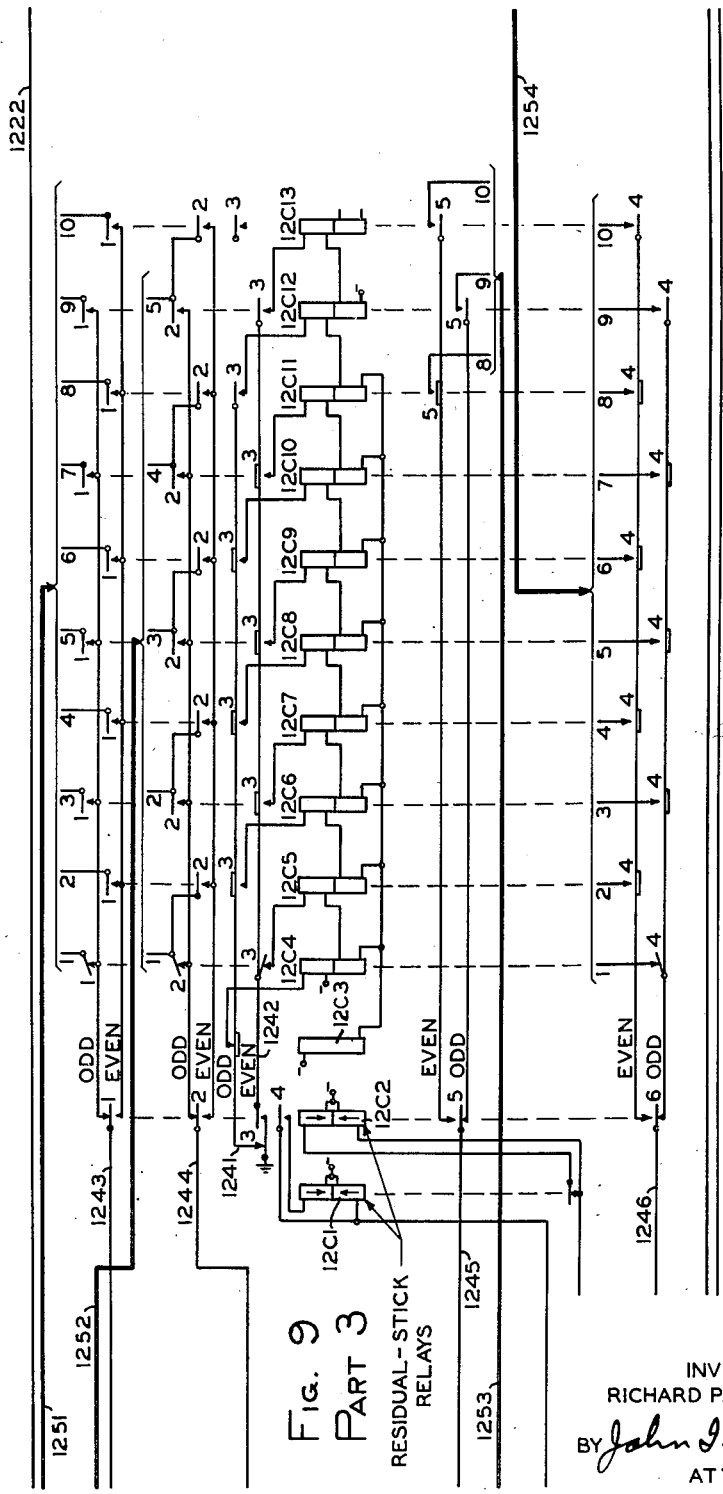

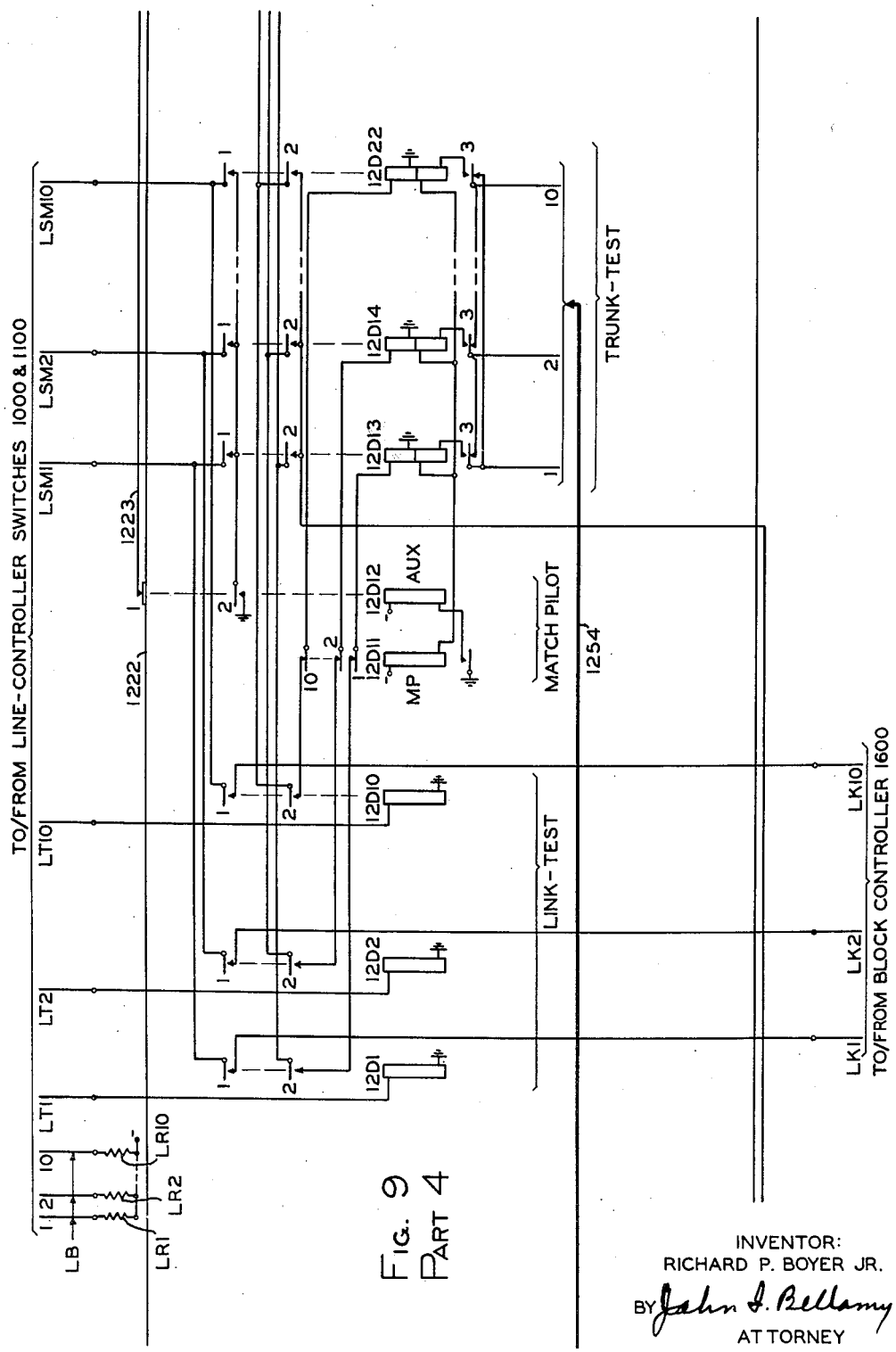

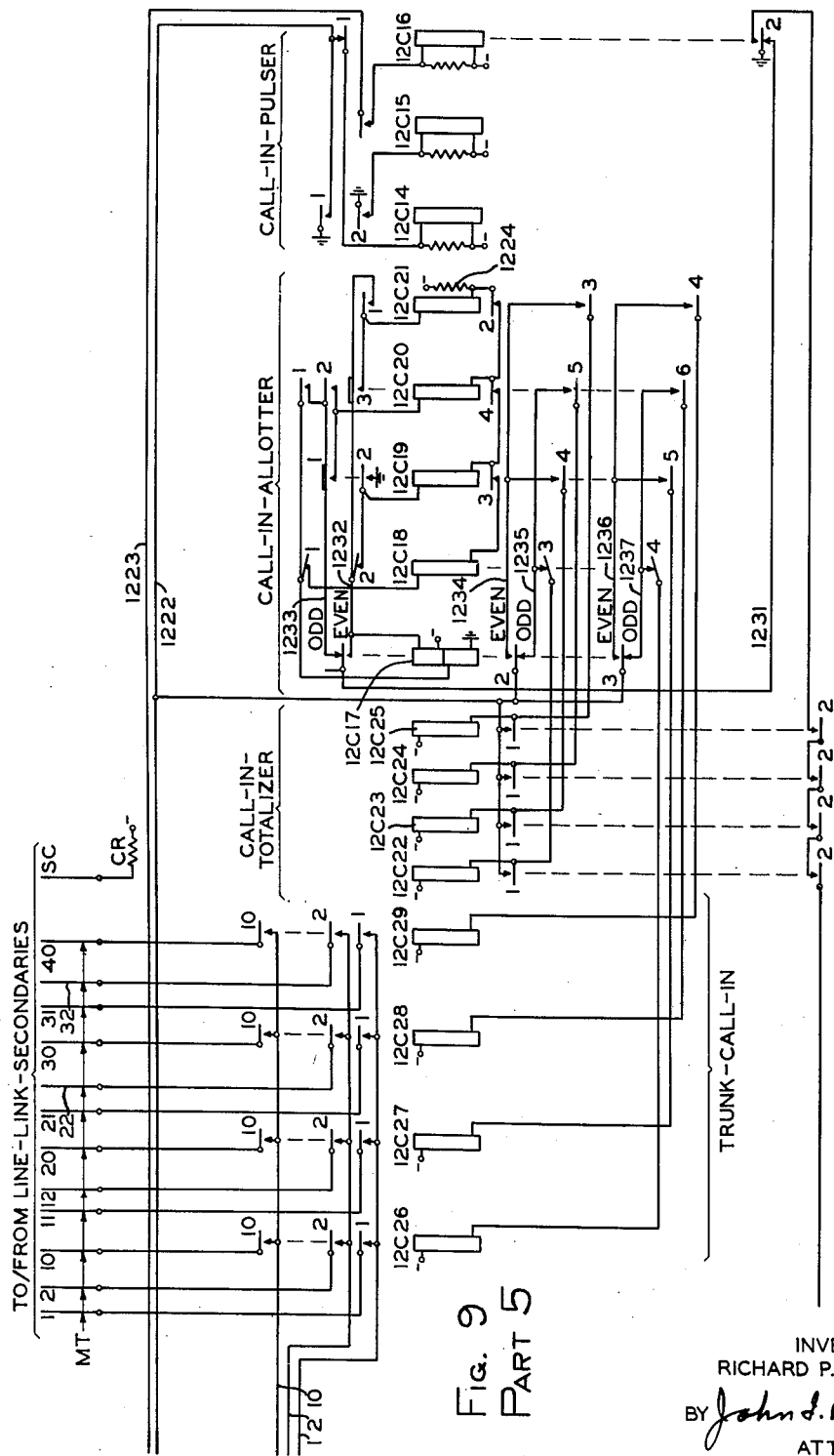

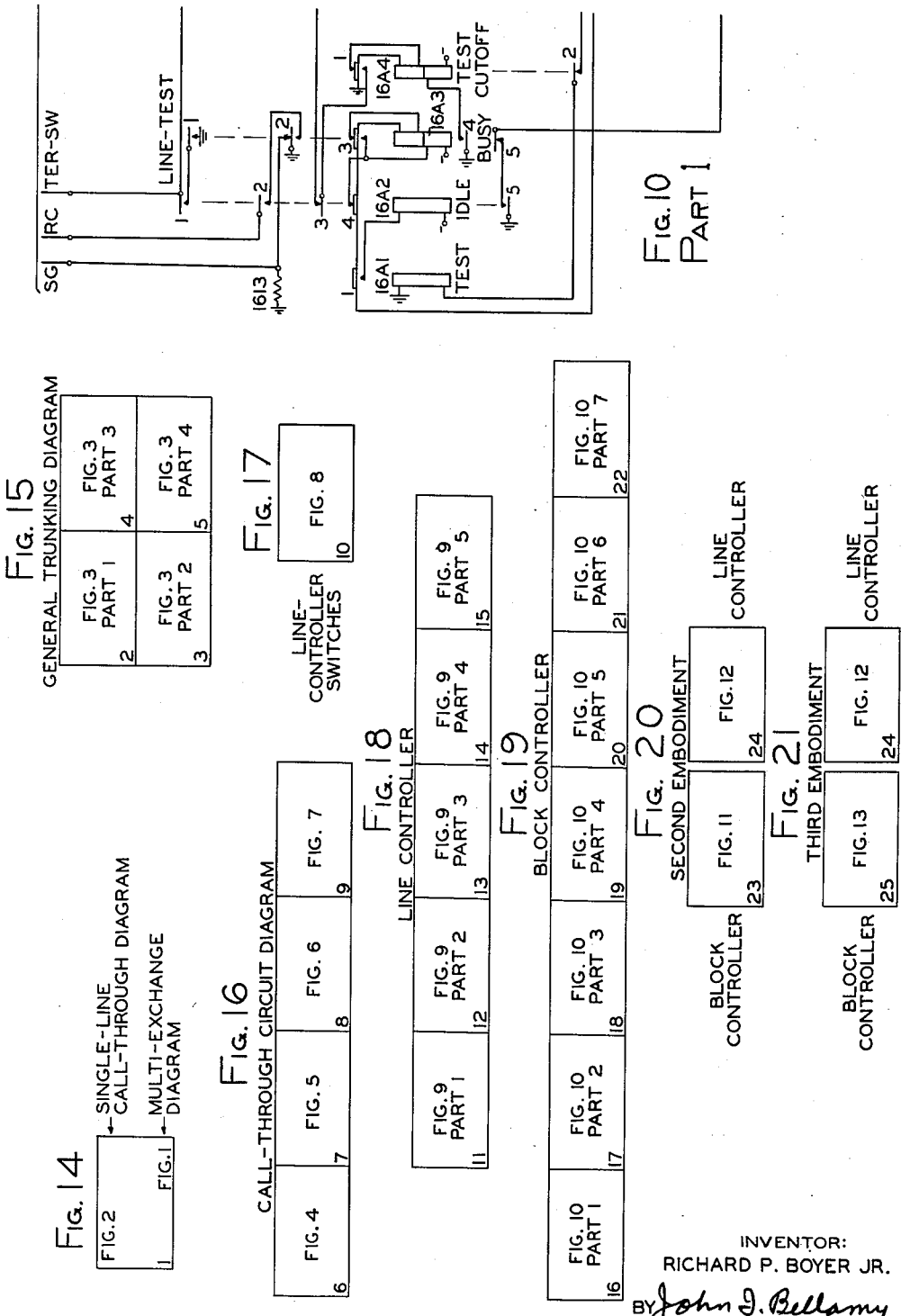

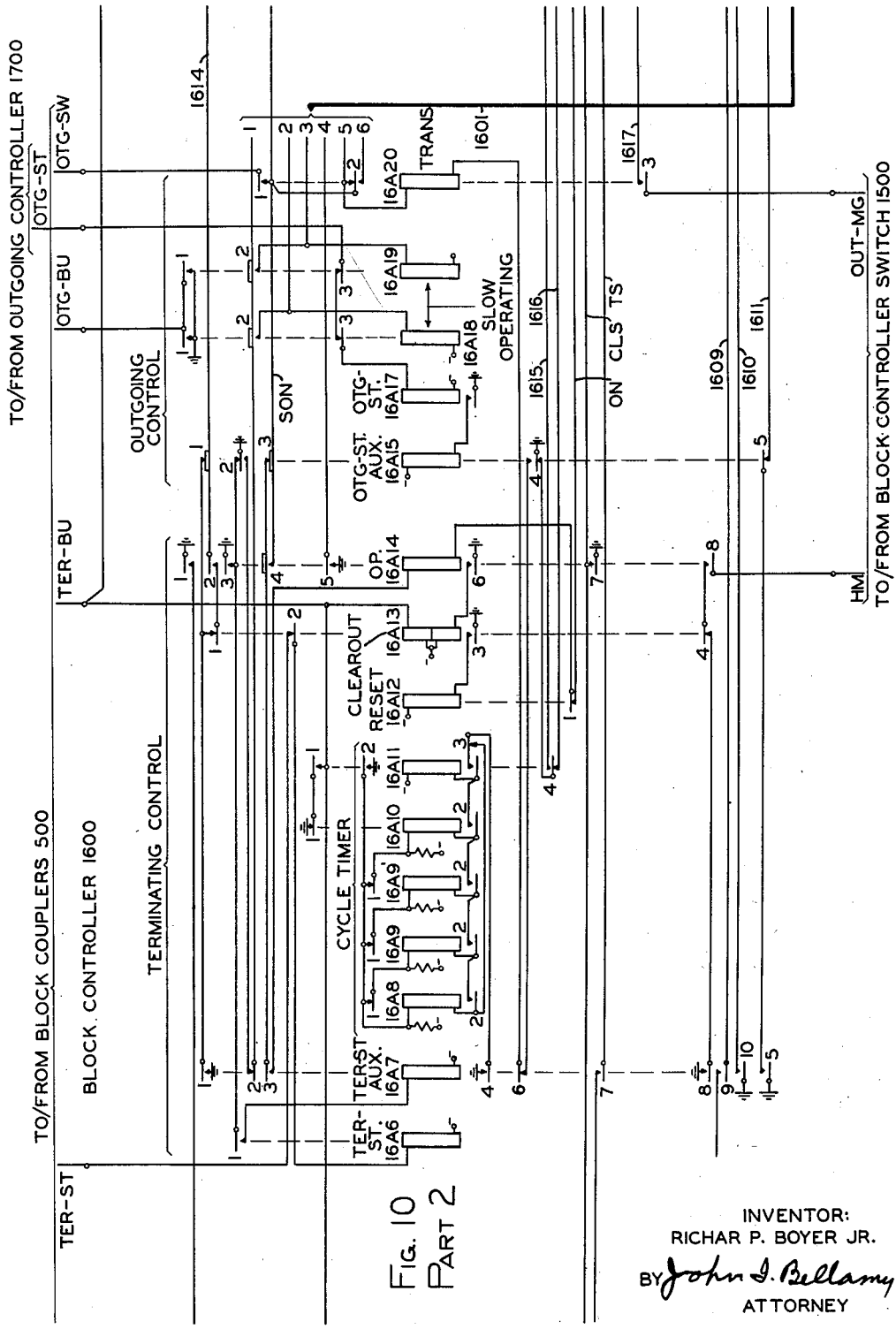

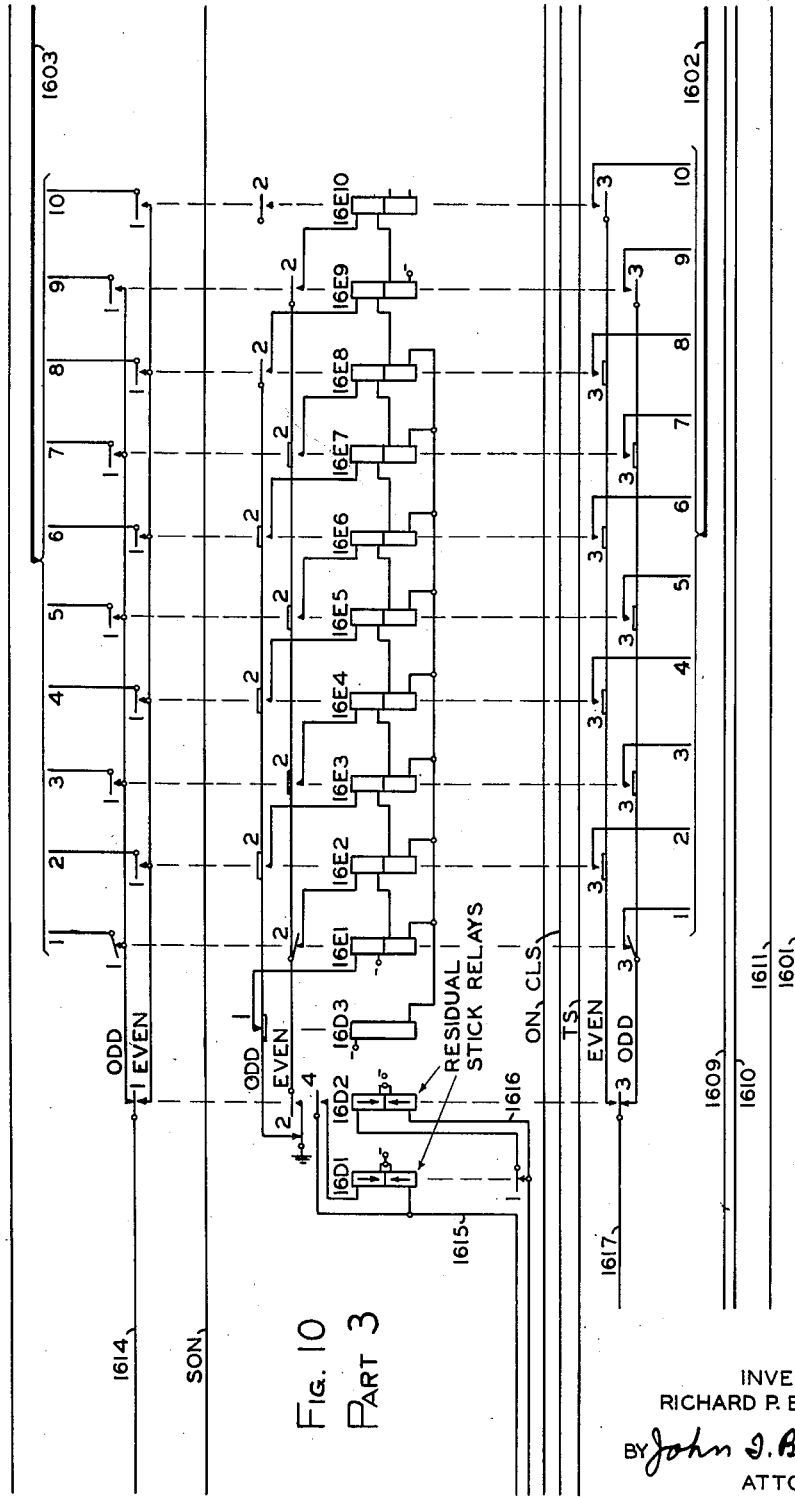

Feb. 26, 1952   R. P. BOYER, JR   2,587,103
PATH-SELECTION CONTROL ARRANGEMENT FOR
PRIMARY-SECONDARY SWITCHING SYSTEMS
Filed Nov. 26, 1949   25 Sheets-Sheet 19
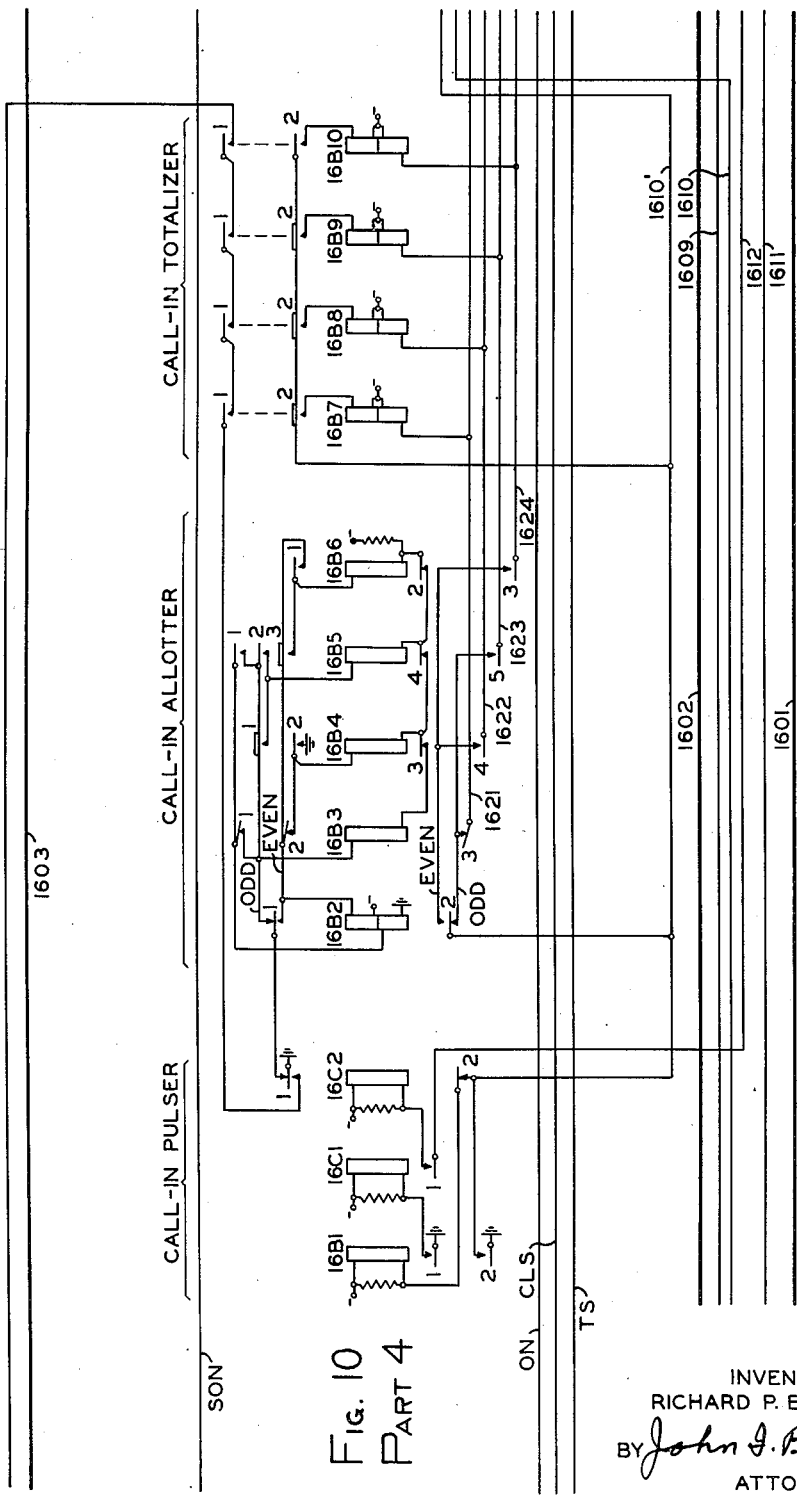
INVENTOR:
RICHARD P. BOYER JR.
BY John J. Bellamy
ATTORNEY

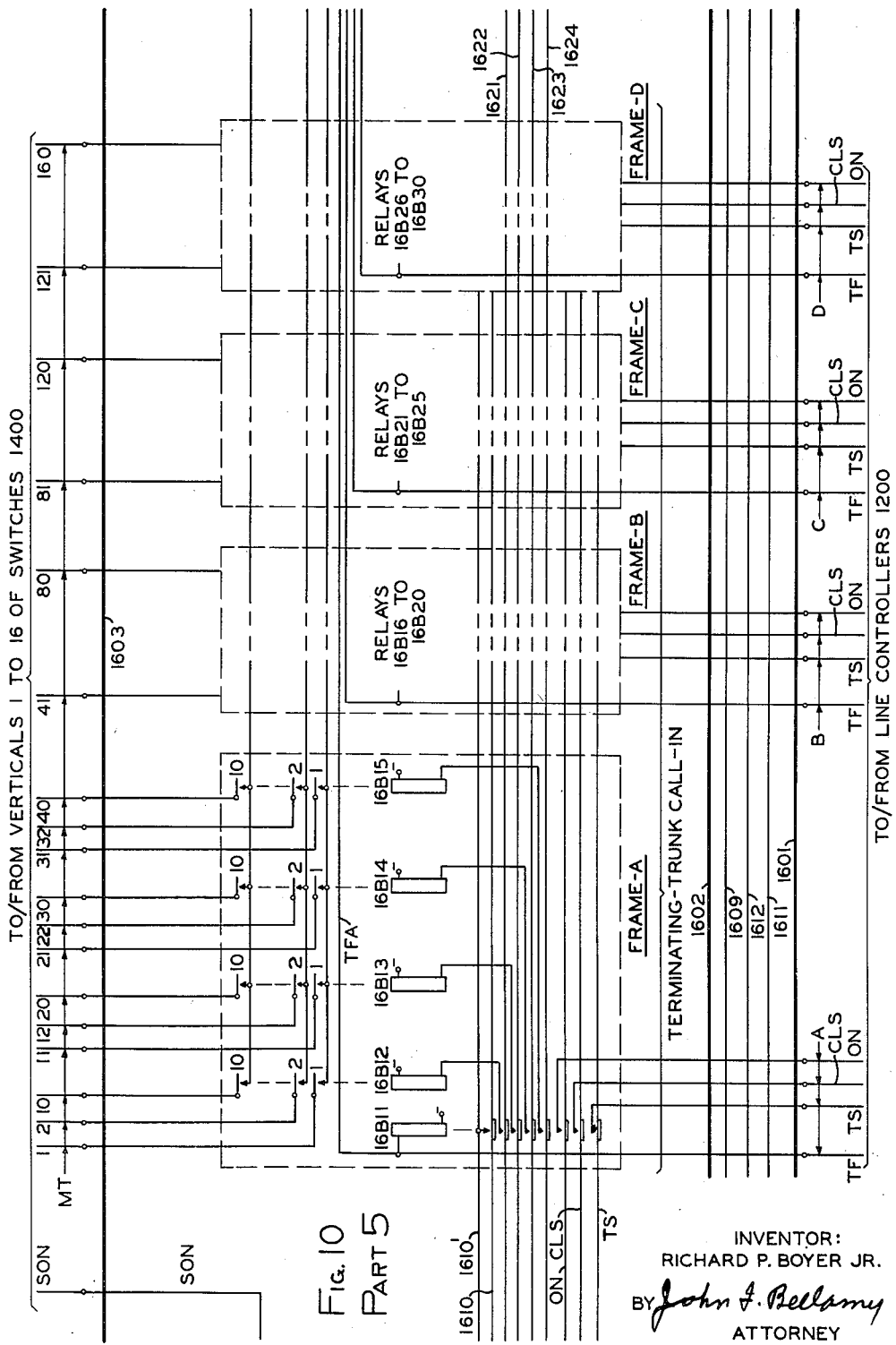

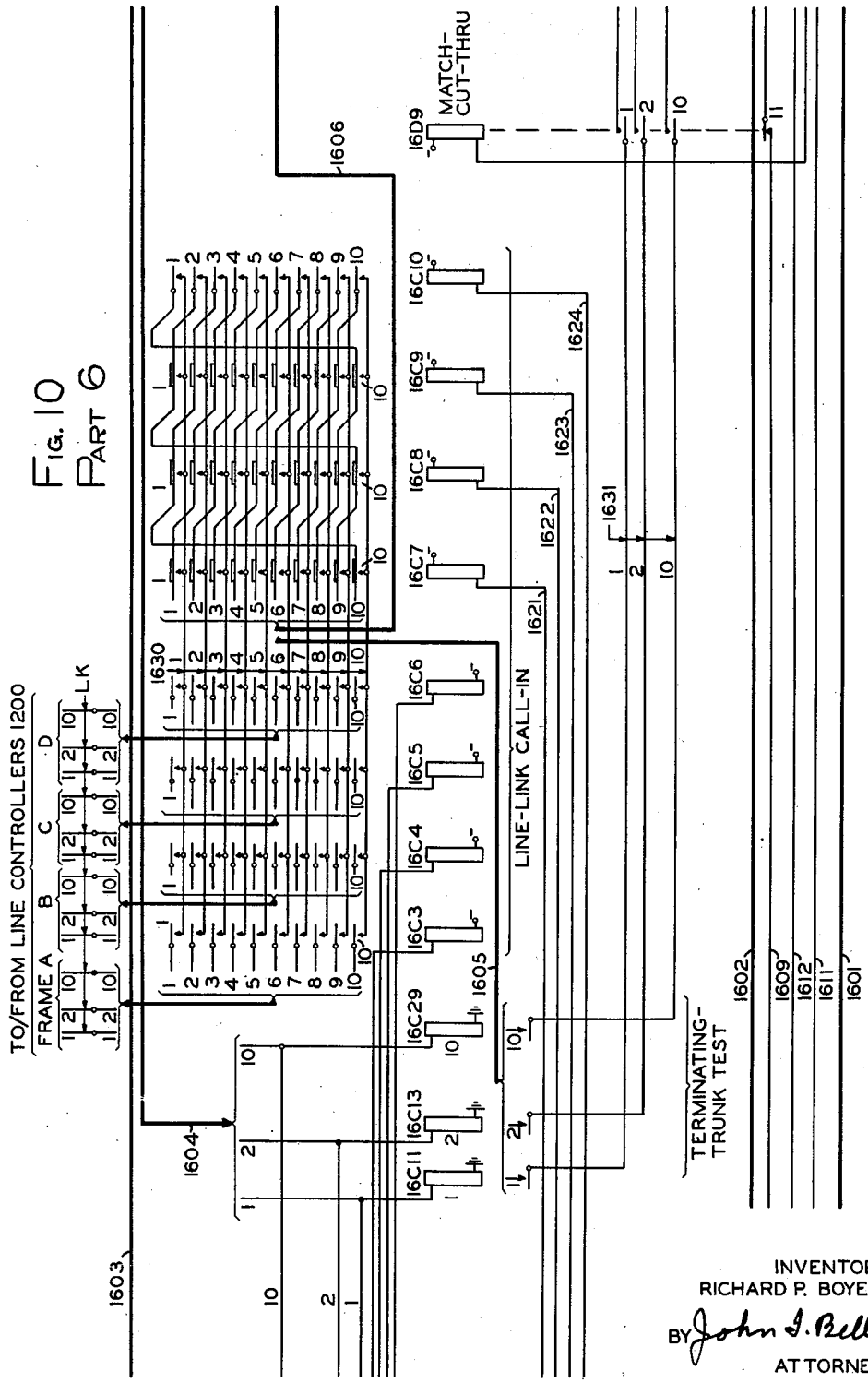

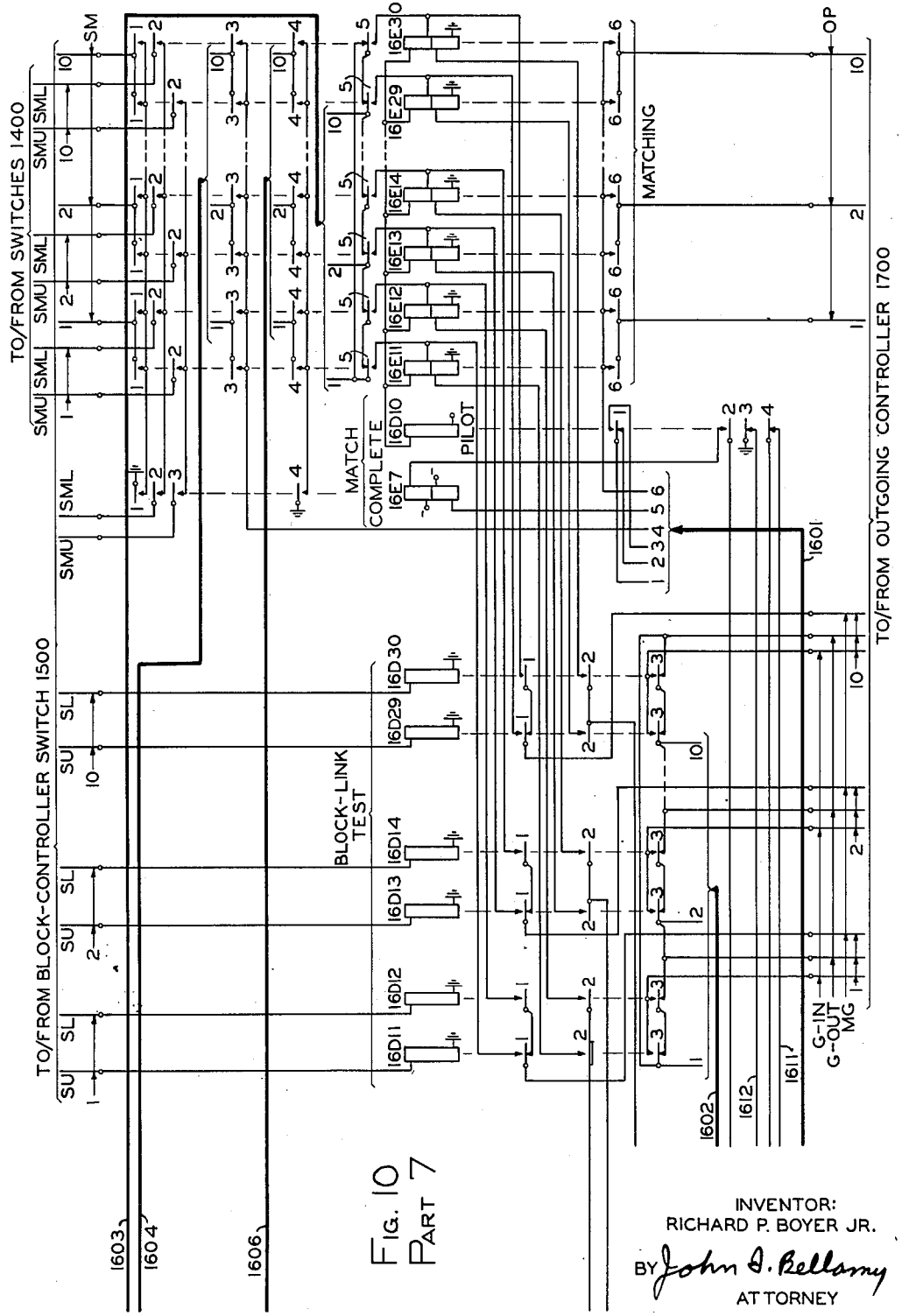

Patented Feb. 26, 1952

2,587,103

UNITED STATES PATENT OFFICE 2,587,103

PATH-SELECTION CONTROL ARRANGE-
MENT FOR PRIMARY - SECONDARY
SWITCHING SYSTEMS

Richard P. Boyer, Jr., La Grange, Ill., assignor to
Kellogg Switchboard and Supply Company,
Chicago, Ill., a corporation of Illinois Application November 26, 1949, Serial No. 129,617

9 Claims. (Cl. 179—22)

This invention relates to a path-selection-control arrangement for a primary-secondary switching system.

Its principal object is to provide an improved control arrangement for path selection which enables the overall switching-control operations to be completed within a shorter interval of time.

It has been chosen to disclose the invention as applied to the switching system disclosed in the pending application of Bellamy and Bowser, for a Primary-Secondary-Spread Crossbar Telephone System, Serial No. 85,292, filed April 4, 1949. This Bellamy and Bowser application will hereinafter be termed the "former" application, system, or disclosure.

I. GENERAL DESCRIPTION

In the noted former application, operations by which available idle paths are determined, and a preferred one is selected, are referred to as matching. Matching is but one of a series of control operations which are performed by switching-control apparatus to extend a connection across a frame of primary and secondary switches. Since the noted control apparatus is common to all circuit paths through the frame, and handles calls on a one-at-a-time basis as noted in the former application, it is necessary that the time during which a connection in progress monopolizes the common control apparatus be held to a minimum to avoid congestion during busy periods. In the system of the former application, the starting of the matching operation is withheld until the concerned subscriber line is completely identified if a calling line, or is tested and found to be idle if a called line. While this arrangement insures that the matching operation will be of utility when performed, it often delays completion of the overall controlling operations for certain ones of them cannot be performed until after the matching operation has been effected.

The principal feature of this invention is that the matching operation is started incidental to the bringing into the controlling apparatus, for test, all of the connection-path sections (links and trunks) necessary for the extension of the desired connection to or from a subscriber line, rather than waiting for specific information regarding the concerned subscriber line.

Other objects and features of the invention will appear as the description progresses.

IA. THE DRAWINGS

The accompanying drawings, comprising Figs. 1 to 21, disclose a preferred embodiment and two additional embodiments of the invention as follows:

Fig. 1 shows three interconnected telephone exchanges A, B, and C, of which exchange B contains telephone switchboard apparatus embodying the features of the invention;

Fig. 2 is a single-line block diagram of apparatus in exchange B which is employed in extending connections to and from lines of the exchange and in extending connections to and from trunks interconnecting exchange B with exchanges A and C;

Fig. 3 (Parts 1 to 4) is a complete single-line trunking diagram showing the relationship between the crossbar switches employed to extend connections to and from lines and trunks of exchange B of Figs. 1 and 2;

Figure 4:
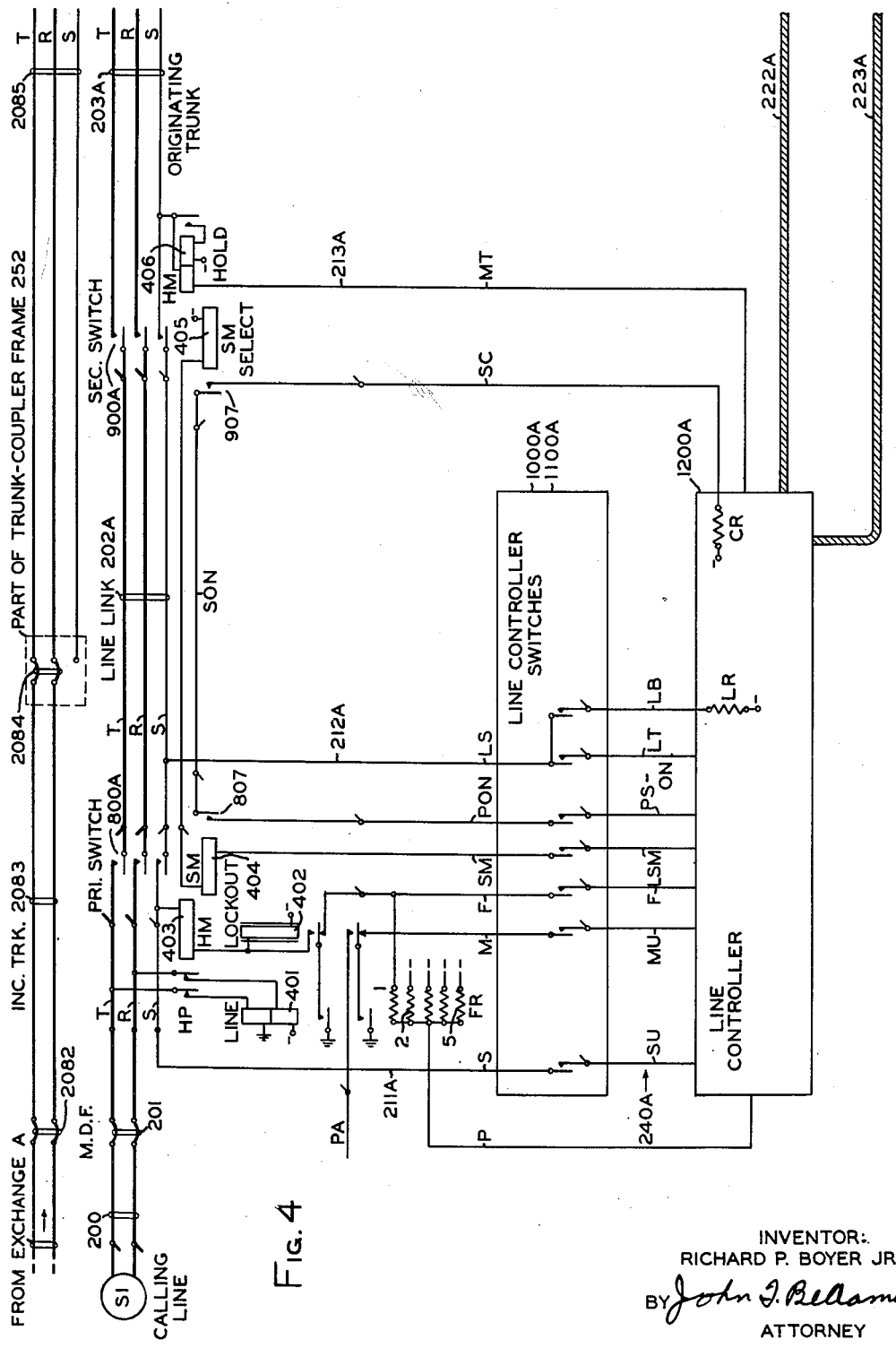
Figure 5:
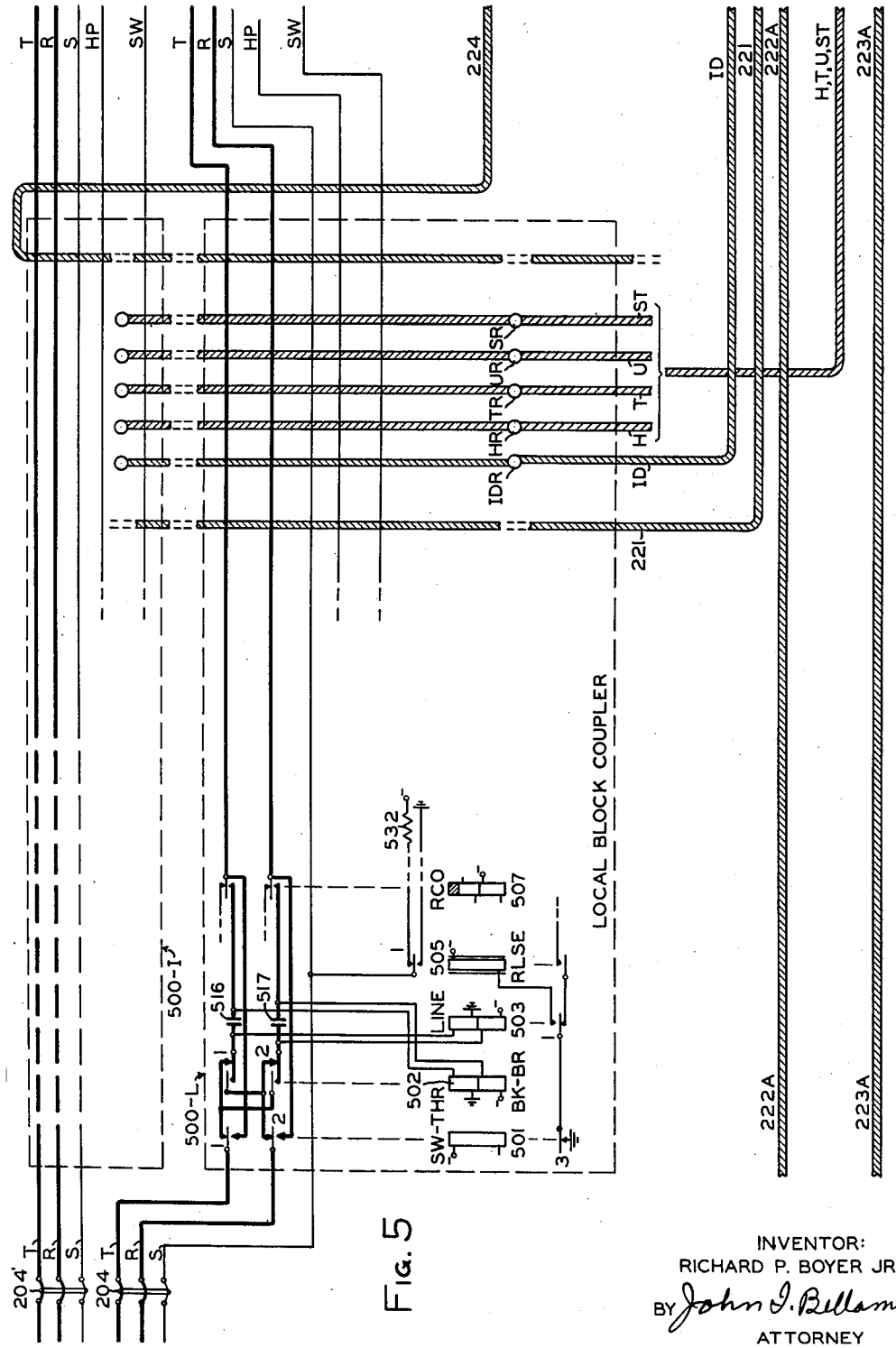
Figure 6:
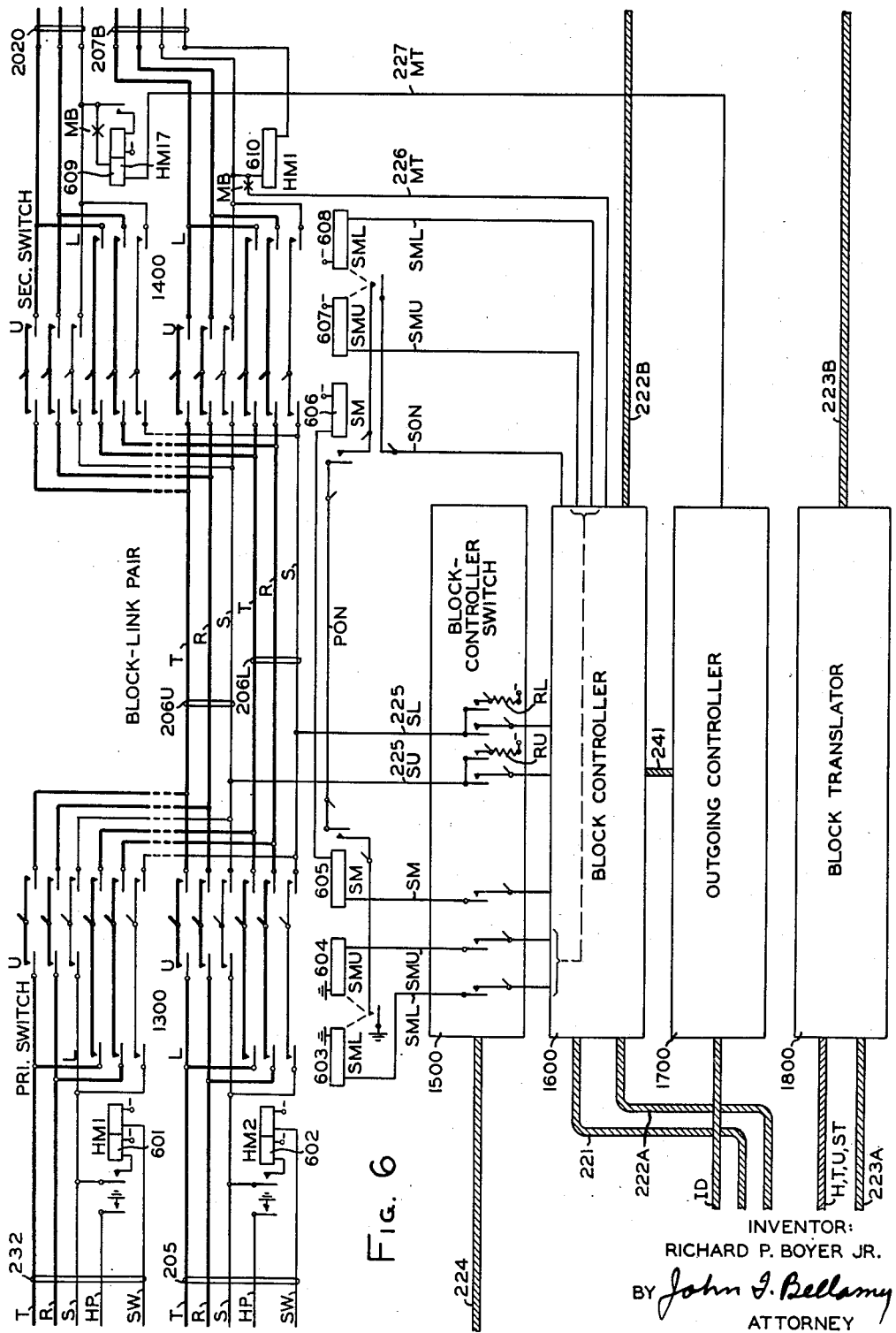
Figure 7:
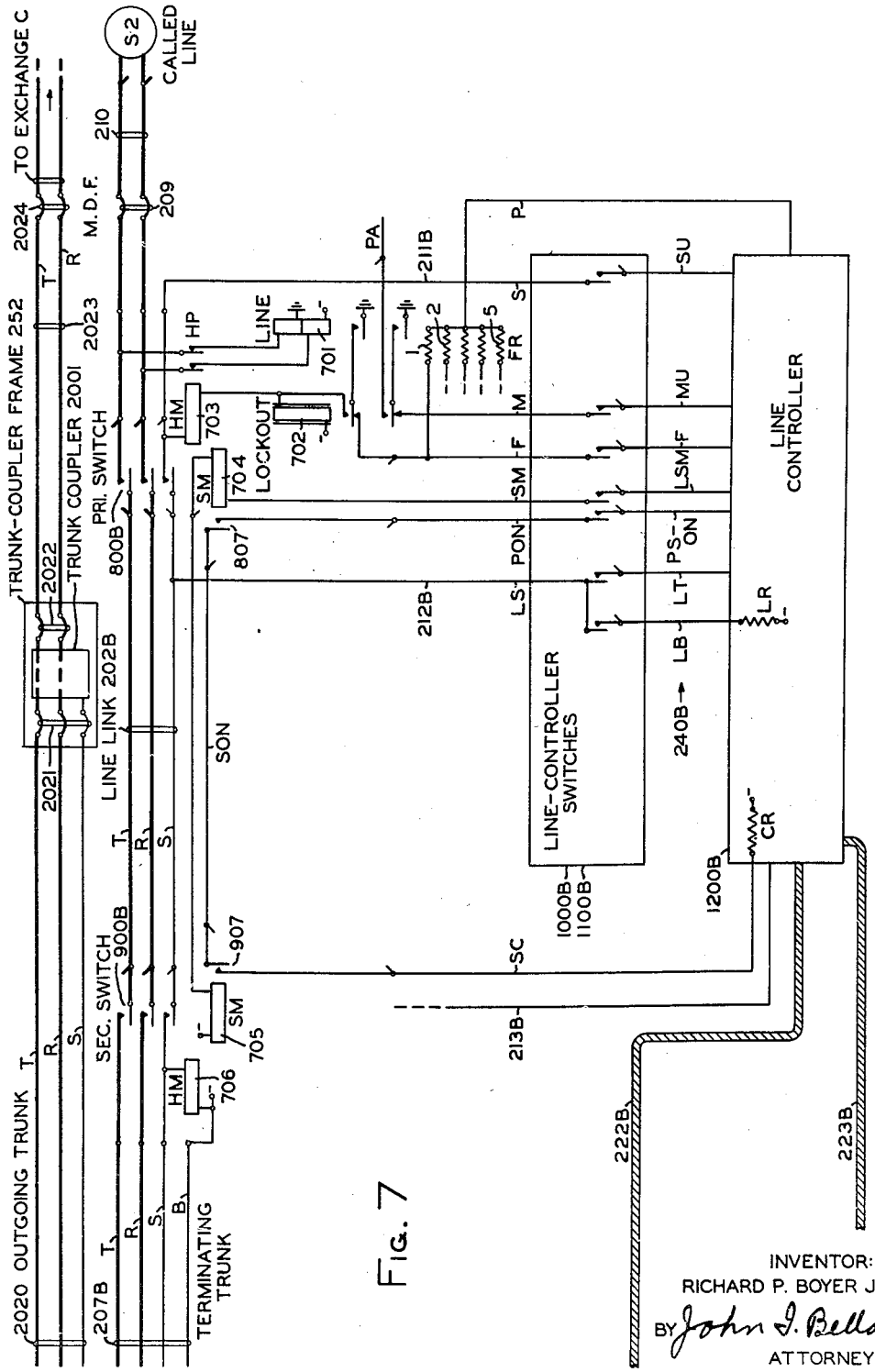
Figure 8:
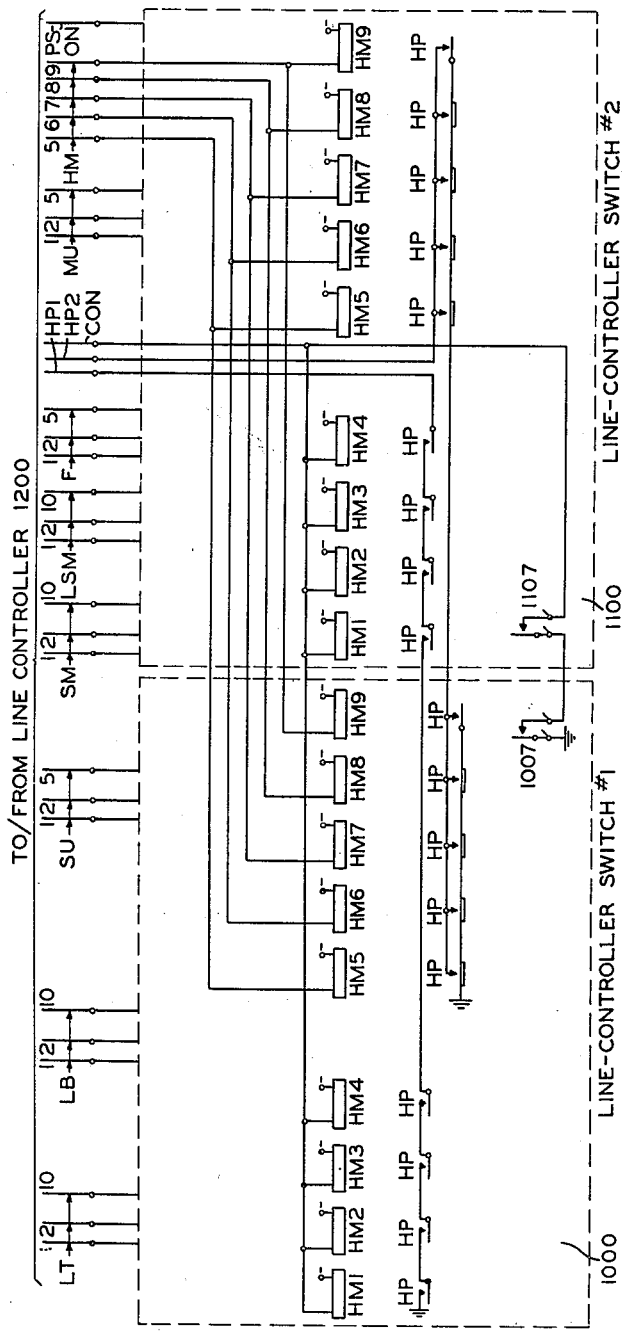
Figure 11:
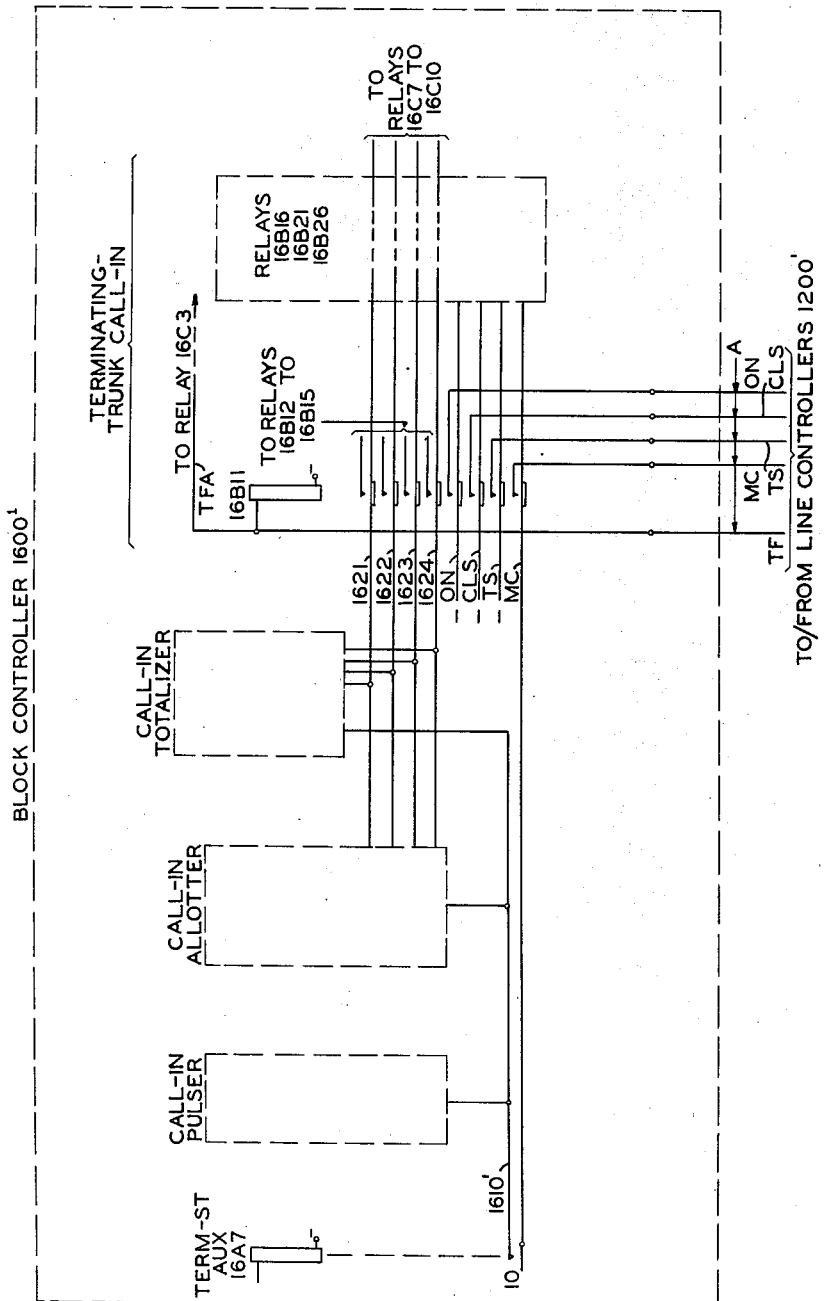
Figure 12:
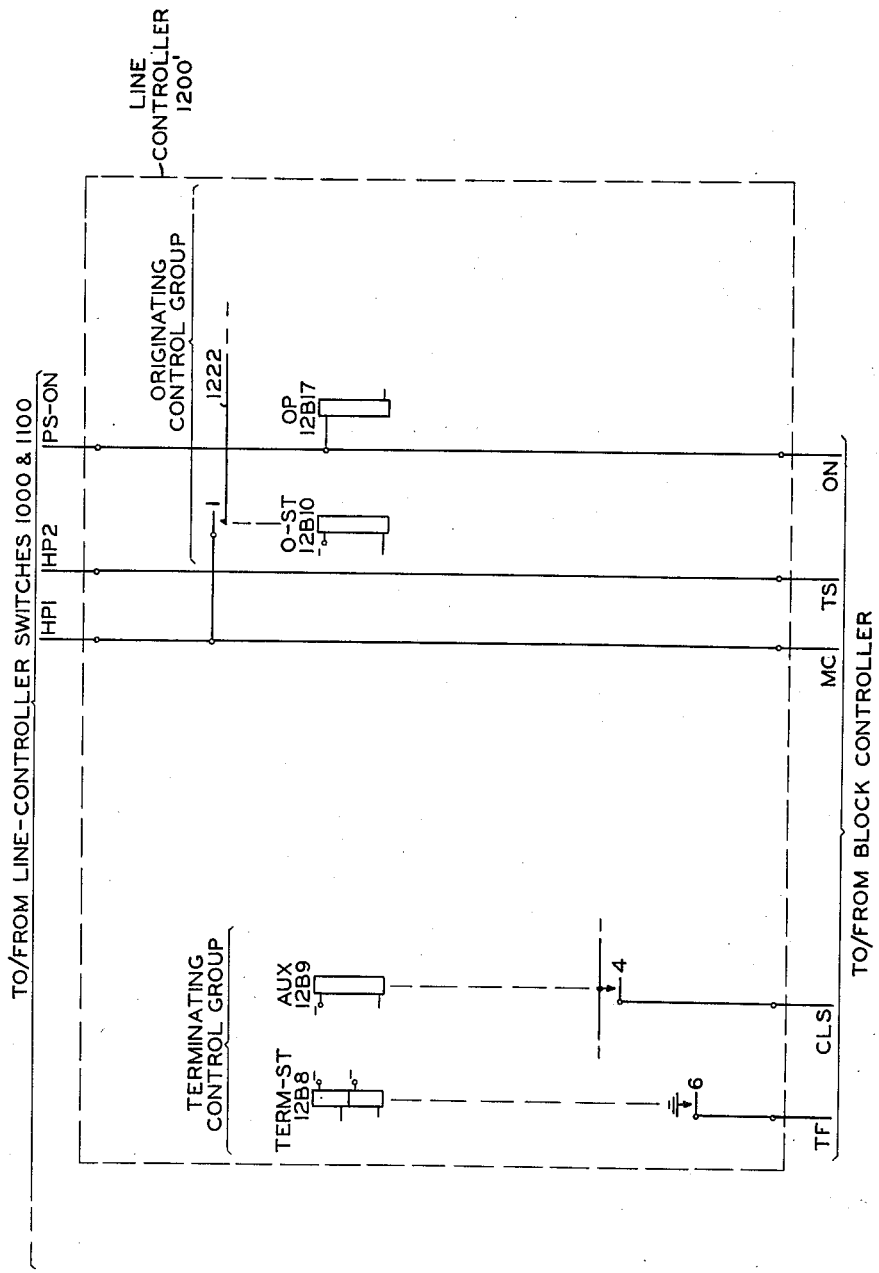
Figure 13:
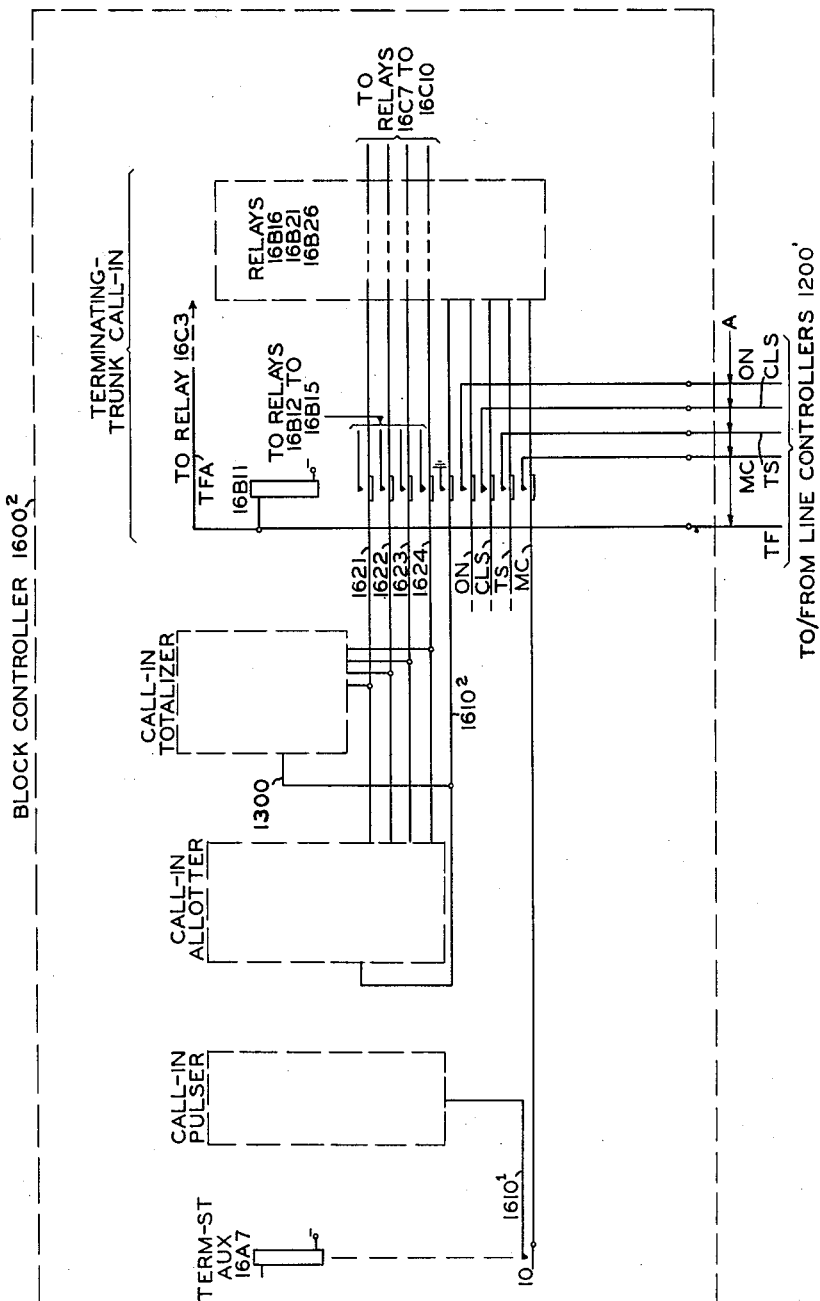

Figs. 4 to 7, taken together, comprise generally a redrawing of Fig. 2 to show in more detail the circuit paths and intimately associated electrical equipment employed in extending the talking connections indicated in Fig. 2; Fig. 4 shows apparatus on line-link frame A of Fig. 2; Fig. 5 is a partial circuit diagram of block-coupler equipment on the block-link frame; Fig. 6 shows, with some amplification, the remaining apparatus of the block-link frame as shown in Fig. 2; and Fig. 7 shows in more circuit detail the apparatus on line-link frame B of Fig. 2;

Fig. 8 is a partial circuit diagram of the line-controller switches showing in detail only the circuit parts which differ from those of the line-controller switches of the former application;

Fig. 9 (Parts 1 to 5) is a circuit diagram of the line controller on any line-link frame;

Fig. 10 (Parts 1 to 7) is a circuit diagram of the block controller on the block-link frame;

Fig. 11 shows the block controller of Fig. 10 modified according to the second embodiment of the invention;

Fig. 12 shows the line controller of Fig. 9 modified according to the second and third embodiments of the invention;

Fig. 13 shows the block controller further modified according to the third embodiment of the invention; and Figs. 14 to 21 show the way in which the sheets of drawings on which Figs. 1 to 13 are drawn, should be arranged in order to be understood best.

IB. GENERAL OPERATION (FIGS. 1 AND 2)

Fig. 1 shows three exchanges A, B, and C. As indicated, exchanges A and C are each connected with exchange B by trunk lines over which connections in each direction can be established.

The apparatus indicated in Fig. 2 is all located in exchange B of Fig. 1.

In Fig. 2, the apparatus of exchange B includes the main distributing frame M. D. F., through which the subscriber lines and the trunks are interconnected with the switchboard apparatus; four line-link frames A, B, C, and D, of which line-link frames A and B are shown at 250A and 250B; a block-link frame shown at 251; and a trunk-coupler frame shown at 252.

The general purpose of the switching apparatus of exchange B is to interconnect the subscriber lines of the exchange with each other, and with the inter-exchange trunk lines, as desired, as well as to interconnect inter-exchange trunk lines as desired.

In the chosen embodiment of the invention, each of the four line-link frames A to D terminates 250 lines, providing a capacity of 1000 lines for the exchange.

Considering line-link frame A, for example, its function is to connect any calling one of the 250 subscriber lines which it serves with an idle one of a group of originating trunks, such as trunk 203A, and to interconnect any of its terminating trunks, such as 207A, with any called one of the subscriber lines connected with the frame. For this purpose line-link frame A is provided with a number of line-link primary switches 800A and a number of line-link secondary switches 900A. The subscriber lines are brought into the primary switches in the manner shown for calling line 200, which is brought in through jumper 201 on the main distributing frame M. D. F. to its own individual vertical location on line-link primary switch 800A.

The originating trunks extend from respective vertical locations on the line-link secondary switches, such as is shown for originating trunk 203A. The terminating trunks are connected to their own respective vertical locations on the line-link secondary switches, such as is shown for terminating trunk 207A. The line-link primary and secondary switches are inter-connected by a suitable number of line links, one of which is shown at 202A.

The specific interrelation between the line-link primary and secondary switches via the line links is shown in Fig. 3, Part 1.

The apparatus on line-link frame A further includes line-controller apparatus comprising line-controller switches 1000A and 1100A, and line controller 1200A. The line-controller switches are 1000A and 1100A, and are interconnected with line controller 1200A by a group of control wires 240A.

The general purpose of the noted line-controller apparatus is to control the interconnection of lines with trunks through switches 800A and 900A over two-way line links 202A. This general control resides primarily in line controller 1200A, shown in circuit diagram in Fig. 9.

The purpose of the line-controller switches (shown in partial circuit diagram in Fig. 8) is to interconnect line controller 1200A with any concerned line-link primary switch such as 800A over conductors such as 211A and 212A.

Line-link frame B (shown at 250B) contains apparatus similar to that of line-link frame A. The correspondence is shown by employing the letter B as a suffix for each reference character applied at line-link frame B, whereas the letter A is used as a suffix for each reference character applied at line-link frame A.

The purpose of the block-link frame, shown at 251, is to extend connections received over incoming trunks such as 2085, and over originating trunks such as 203A, to an idle outgoing trunk such as 2020 in a called group, or over an idle terminating trunk such as 207B to the line-link frame terminating the called line. For this purpose, the block-link frame is provided with a number of block-link primary switches such as 1300 and with a number of block-link secondary switches such as 1400, interconnected by block links 206.

The incoming and originating trunks such as 2085 and 203A are required to be suitably coupled to the switchboard apparatus at the block-link frame in order that the necessary digit information as to call destination be recorded and acted upon. This general function is assigned to block couplers 500 individual to the respective incoming and originating trunks. Incoming block coupler 500-I is connected individually with incoming trunk 2085 by jumper 204', while local block coupler 500-L is connected individually with originating trunk 203A through jumper 204. Respective conductor sets 205 extend the incoming and originating trunks 2085 and 203A beyond the block couplers to vertical locations on block-link primary switches 1300.

The outgoing and terminating trunks (such as 2020 and 207B) extend from respective vertical locations on block-link secondary switches 1400.

The specific inter-relation between the block-link primary and secondary switches via the block links is shown in the general trunking diagram, Fig. 3, Parts 3 and 4.

General control over the primary and secondary switches on the block-link frame is exercised by block controller 1600, shown in complete circuit diagram in Fig. 10. When any connection which has reached a block coupler is ready to be extended, block-controller switch 1500 (shown in Fig. 6) operates to connect block controller 1600 to the concerned block-link primary switch such as 1300. The calling block coupler is thereupon connected directly with block controller 1600 through conductors in group 221.

If the call being handled is an outgoing call (one to be completed over an outgoing trunk such as 2020) outgoing controller 1700 is called into play over an initial digit wire in group ID. It is interconnected with the outgoing trunks over respective conductors 227, and is interconnected with the block controller over the conductors in group 241. Its function is to determine which trunks in the called group are idle and to appropriately relay that information to the block controller.

When the connection being handled by the block coupler associated with the block controller is for a called line of the local exchange, hundreds, tens, units, and stations digit information already stored in the block coupler, is forwarded to the block translator 1800 over conductor groups H, T, U, and ST. The general purpose of the block translator is to determine from the dialed digit information which of the four line-link frames A to D terminates the called line, as well as the specific location of the called line on such frame, and to transmit appropriate translated information to the line-controller apparatus on the called line-link frame, according to the location of the called line thereon. This information is transmitted over conductors in the concerned one of groups 223A to 223D.

The line-controller apparatus on the called line-link frame acts according to the information received from the block translator to prepare for the extension of the connection to the specific called line. Among other things, this line-controller apparatus indentifies the called line-link frame at block controller 1600, following which the block controller and the line-controller apparatus cooperate in extending a connection to the called line over an idle path. The cooperation between the block controller and the line-controller apparatus on the line-link frames is controlled over respective conductor groups 222A to 222D.

IB1. *Station S1 calls station S2*

The subscriber at station S1 on line 200, to call the subscriber at station S2 on line 210, removes his receiver, waits for dial tone from a local block coupler; and then dials the directory number of station S2, containing five digits, termed initial, hundreds, tens, units, and stations.

When the receiver is removed at calling station S1, calling line 200 is thereby bridged in the usual manner to operate the usual line relay thereof in exchange B. This results in the operation of line controller switches 1000A and 1100A to associate line controller 1200A with line-link primary switch 800A at which the calling line terminates. The line links (such as 202A) serving primary switch 800A are thereupon tested by the line controller 1200A over respective conductors 212A, and the associated originating trunks, such as 203A, are tested over respective conductors 213A. From these tests, the line controller matches an idle path for extending the calling line to an idle block coupler, the path over line-link 202A and originating trunk 203A, for example. When this occurs, the line controller causes primary and secondary switches 800A and 900A to effect a mechanical selection of the matched line link 202A, and energizes conductors 211A and 213A to close the appropriate stackups of contact elements in the primary and secondary switches 800A and 900A to extend the calling line over line link 202A to the local block coupler 500-L, to which originating trunk 203A is connected by jumper 204. Line-controller switches 1000A and 1100A, and line controller 1200A are now returned to common use, leaving the calling line 200 connected to local block coupler 500-L by way of line link 202A and originating trunk 203A.

Upon receiving a dial-tone signal over the established connection, from the block coupler 500-L, the subscriber at calling station S1 operates his usual calling device to transmit imulses representing the fives digits in the directory number of called station S2. They comprise an initial digit indexing exchange B, and hundreds, tens, units, and stations digits indexing the called line and the called station S2 thereon. These digits are recorded on respective registers in the block coupler 500-L before any external switchboard action occurs. As soon as the stations digit has been dialed, block-controller switch 1500 associates block controller 1600 with the primary switch 1300 which serves block coupler 500-L. At the same time, block coupler 500-L is associated with block controller 1600 over the conductors in group 221. Also, at the same time, the dialed hundreds, tens, units, and stations digit information is transmitted to block translator 1800 over the respective conductor groups H, T, U, and ST.

The block translator thereupon determines the line-link frame which serves the called line (line-link frame 250B), and transmits thereto (over conductors in group 223B) translated digit information indicating the primary switch (800B) which serves the called line, and indicating the specific vertical appearance of the called line on that primary switch. When this occurs, line controller 1200B identifies itself at block controller 1600, and exercises a control over conductors in group 240B to cause line-controller switches 1000B and 1100B to position themselves according to the switchboard location of the called line. The line links (such as 202B) serving primary switch 800B are now tested over respective conductors 212B, and the testing information is imparted to block controller 1600 over respective conductors in group 222B. The sleeve conductor 211B of the called line 210, is now extended to block controller 1600 over a conductor in group 222B, enabling the block controller to test the called line to determine its busy or idle condition.

If the called line tests idle, the block controller matches an idle path thereto over a block link such as 206, a terminating trunk such as 207B, and a line link such as 202B. The block links and terminating trunks are tested over respective conductors 225 and 226.

When this available idle path between block coupler 500-L and the called line has been determined, block controller 1600 closes appropriate select-magnet circuits to effect mechanical selection of block link 206 at primary and secondary switches 1300 and 1400, and to effect mechanical selection of line link 202B at switches 900B and 800B. When these selections have been made, block controller 1600 operates through a conductor in group 221 to close the appropriate circuit path through primary switch 1300 to extend the connection to the selected block-link 206; operates over conductor 226 to cause the appropriate connection to be closed in secondary switch 1400 to extend block link 206 to terminating trunk 207B, and to cause that trunk to be extended to the selected line link 202B by switch 900B, and operates, over a conductor in group 222B, and over sleeve conductor 211B, to cause the appropriate connection to be closed in primary switch 800B to interconnect line link 202B with the called line 210.

Upon the foregoing operations having been completed, local block coupler 500-L begins to apply ringing current to the called line to signal the called station S2 thereon over the established connection across the block-link frame and across the called line-link frame, and the items of common apparatus (block-controller switch 1500, block-controller 1600, block translator 1800, and line-controller apparatus 1000B to 1200B) are promptly returned to common use, leaving the connection intact between the calling and called lines.

When the call has been answered, the subscribers at stations S1 and S2 may converse as described. When both subscribers have replaced their receivers, block coupler 500-L opens front and rear holding circuits which it had previously held closed, whereupon the existing connection is broken at each of the switches 800A, 900A, 1300, 1400, 900B, and 800B.

IB2. *Station S1 calls exchange C*

When the subscriber at station S1 on line 200 desires to call a subscriber of exchange C, he removes his receiver; waits for dial tone; and then dials the directory number of the subscriber in exchange C. This directory number includes an initial digit having a value assigned specifically to lines of exchange C.

When the receiver is removed at calling station S1, the previously described operations occur on line-link frame A to extend the calling line to an idle block coupler. It may be assumed again that the calling line is extended to block coupler 500–L over line link 202A and originating trunk 203A.

When the initial digit assigned specifically to exchange C is dialed and recorded in block coupler 500–L, a connection is immediately thereupon completed over a wire in initial digit group ID for calling in outgoing controller 1700 and for setting it with specific regard to the trunks in the group leading to the called exchange C. This occurs coincidentally with the association of block coupler 500–L with block controller 1600 over conductors 221, and with the operation of block-controller switch 1500 to associate block controller 1600 with primary switch 1300. When the block controller and outgoing controller are both thus called in together, the block controller is adapted specifically to extend the connection to an idle trunk in the called outgoing group. The circuit arrangements are such that the operations necessary to cause the extension to be made occur with sufficient rapidity that the calling subscriber is not required to introduce an additional delay before proceeding to call the remaining digits in the desired telephone number.

If block link 206 and outgoing trunk 2020 are both idle (as shown by tests made over respective conductors 225 and 227) block controller 1600, taking into account information imparted thereto over conductors in group 241, may select that path and condition switches 1300 and 1400 to select block link 206 mechanically. Thereupon, block controller 1600 causes appropriate cross points to be closed in switches 1300 and 1400 to interconnect block-coupler extension conductors 205 with outgoing-trunk conductor 2020 by way of block link 206, thereby extending the calling line through block coupler 500–L, to trunk coupler 2001 on frame 252, and thence through trunk-extension 2023 and jumper 2024 to the trunk conductors outgoing to exchange C. When this occurs, block coupler 500–L "switches through," and the connection from the calling line to the outgoing trunk is thereafter held by trunk coupler 2001, which coupler includes apparatus for repeating the succeeding digit impulses over the trunk line to apparatus in exchange C, which may be similar to the switchboard apparatus of exchange B. Coincidental with the "switching through" operation noted for the block coupler, the items of common equipment on the block-link frame (block-controller switch 1500, block controller 1600, and outgoing controller 1700) are disassociated from the established connection and are returned to common use.

The connection established from the calling line to the outgoing trunk is released responsive to operations occurring in trunk coupler 2001 when the receiver is subsequently replaced at the calling station S1.

IB3. *Calls from exchange A*

When exchange B is called from exchange A, the call from exchange A reaches exchange B over an incoming trunk such as that illustrated. This trunk is extended through parts 2082 to 2085 and jumper 204' to incoming block coupler 500–I, similar to the local block coupler except that it preferably does not apply dial tone upon being taken for use. The trunk line in question may be seized in exchange A by operations previously described in connection with the seizure of a trunk line extending from exchange B to exchange C.

Following seizure of the incoming block coupler, the call may be extended to exchange C by the dialing of the appropriate initial digit at block coupler 500–I or may be extended to any desired called line of exchange B by dialing the appropriate initial digit, followed by the hundreds, tens, units, and stations digits in the directory number of the called line and station thereon. The connection may be extended from block coupler 500–I to line 200 over conductor group 232 and associated vertical location on primary switch 1300, and thence as hereinbefore described for a call originated at local station S1.

II. GENERAL TRUNKING DIAGRAM (FIG. 3)

The general trunking diagram shown in Fig. 3, Parts 1 to 4, will now be explained.

In Fig. 3, the switching and trunking plan for the line-link frames and block-link frame of Fig. 2 are shown more completely.

IIA. THE LINE-LINK FRAMES

Referring now to Part 1 of Fig. 3, there are ten primary switches 800A on line-link frame A, of which the first two and the tenth are shown. Each switch 800A has twenty-five vertical locations, or cross paths, to which twenty-five subscriber lines are respectively connected as indicated. Each such switch has ten horizontal locations, or longitudinal paths, to which ten line links 202A are respectively connected. Each switch 800A may be described as a 25 x 10 three-wire switch, which is one having 250 three-wire cross points. The twenty-five subscriber lines which may be connected to any such switch are served in common by the ten associated two-way line links 202A.

Line-link frame A has five line-link secondary switches 900A. These five switches, in effect, serve as ten separate secondary switches in that each has its "horizontals" or longitudinal paths, severed at the midpoint to provide two separate groups of ten horizontals each. That is, each of the five secondary switches comprises a left section L and a right section R, each section having its own crossing vertical and horizontal paths. Five two-section secondary switches 900A are more economical to produce, and require less mounting space on the switchboard, than ten entirely separate secondary switches.

The left and right sections of secondary switches 900A, considered in regular order from #1 to #10, are referred to as the ten secondary sections. Each secondary section has eight vertical locations thereon, the first four of which serve as attachment points for respective terminating trunks 207A, while the last four serve as attachment points for respective originating trunks 203A. The ten secondary sections thus provide for forty terminating trunks, and forty originating trunks, for line-link frame A.

There are one hundred two-way line links 202A interconnecting the ten primary switches 800A with the ten secondary sections provided by secondary switches 900A. These line links are, for convenience, numbered 1 to 100 at their primary-switch terminals. The line links interconnect the primary switches with the secondary sections in a so-called standard spread, wherein the ten line links of any primary switch extend to respectively corresponding secondary sections, and the ten line links at any secondary section extend thereto from respectively corresponding primary switches. More particularly, the links 1 to 10 extend from the respective horizontals of the first primary switch 800A to horizontals 1 of the respective secondary sections; the links 11 to 20 extend from the second primary switch 800A to horizontals 2 at the respective secondary sections; the links 11 to 20 extend from the second primary switch 800A to horizontals 2 at the respective secondary sections; and so forth to the tenth primary switch 800A, from which line links 91 to 100 extend respectively to horizontal locations 10 at the respective secondary sections 1 to 10.

The forty originating trunks 203A which extend from verticals 5 to 8 of the ten secondary sections on line-link frame A are considered, for numbering and testing purposes, as comprising four groups of ten. Originating trunks 1 to 10 (group 1) extend from verticals 5 of the respective secondary sections; trunks 11 to 20 (group 2) extend from verticals 6 of the respective secondary sections; trunks 21 to 30 (group 3) extend from verticals 7 of the respective secondary sections; and originating trunks 31 to 40 (group 4) extend from verticals 8 of the respective secondary sections.

Similarly, the forty terminating trunks 207A incoming to line-link frame A from the block-link frame are considered as comprising four groups of ten. The trunks in the four groups extend respectively to verticals 1, 2, 3, and 4, on the ten secondary sections. The first ten terminating trunks extend to the respective secondary sections in regular order, the terminating trunks in groups 2, 3, and 4 connect to the secondary section with a progressive slip of one. That is, any terminating trunk in group 2, 3, or 4 is connected to the secondary section next succeeding the one to which the corresponding trunk of the immediately preceding group is connected. This slip in the connections of the four groups of terminating trunks to the secondary sections is for the purpose of enhancing matching possibilities over the terminating trunks as will hereinafter appear.

At line-link frame A, terminal groups 321A and 322A are provided for the terminating and originating trunks respectively, to serve as junction points between the conductors local to the line-link frame and the cable conductors between the line-link frame and the block-link frame. Similar terminals for line-link frames B, C, and D are shown at 321B and 322B, to 321D and 322D. The originating and terminating trunks 203B and 207B to 203D and 207D are connected to these terminals.

IIB. THE BLOCK-LINK FRAME

Referring to Fig. 3, Parts 3 and 4, the crossbar switching apparatus on the block-link frame comprises ten primary switches 1300 and ten secondary switches 1400. Each such switch is described as a 20 x 20 three-wire switch. It has twenty vertical locations or cross paths and ten pairs of horizontal locations or longitudinal paths. Each pair of horizontal paths contains a lower path L and an upper path U, each representing a separate block link 206. Each switch 1300 or 1400 terminates twenty trunks on its verticals and ten pairs of block links 206 on its horizontals. There are two hundred block links 206, comprising 100 pairs which are spread by pairs between the block-link primary and block-link secondary switches 1300 and 1400 as pointed out for the spreading of the one hundred single line links 202A between the line-link primary switches 800A and the secondary sections provided by line-link secondary switches 900A. That is, from any block-link primary switch 1300, the ten pairs of block links extend respectively and in regular order to the secondary switches 1400. The block links are used in pairs, rather than singly as for the line links, because of the greater traffic across the block-link frame.

Each primary switch 1300 has a group of twenty block couplers associated therewith, such as the block couplers 500–I and 500–L of Fig. 2. These groups of block couplers are indicated in Fig. 3 as 500–1 to 500–10. Each such group of block couplers is hereinafter referred to as a section of block couplers, or a block-coupler section, a separate section for each primary switch 1300.

The originating trunks from line-link frames A, B, C, and D are carried from the line-link frames to the block-link frames over originating trunk cables OA, OB, OC, and OD. These cables terminate at terminal groups 323A to 323D. Forty incoming trunks are contained in incoming-trunk cable ITC, extending from trunk-coupler frame 252 to the block-link frame and terminating at terminals 323I. The three-wire trunk sets incoming to the block couplers of sections 500—1 to 500—10 extend thereto from respective terminal sets 324—1 to 324—10. Three-wire jumpers 204 are extended from originating-trunk and incoming-trunk terminals, as required, to respective terminals in groups 324—1 to 324—10. The indicated terminal groups 323A to 323D, 323I, and 324—1 to 324—10, are so located on the block-link frame as to constitute an intermediate distributing frame on which jumpers 204 can be run to connect desired available originating-trunk and incoming-trunk sets of conductors to respective block couplers only as required for the actual handling of the traffic, and to enable such trunks to be diversified among the several sections of block couplers in any manner which may from time to time prove to be advantageous.

The first 16 vertical locations on the ten secondary switches 1400 serve as respective origin points for the 160 terminating trunks, forty to each of the line-link frames A, B, C, and D. Verticals 1 of the ten secondary switches 1400 serve as origin points for terminating trunks A1 to A10, verticals 2 for trunks A11 to A20, verticals 3 for trunks A21 to A30, and verticals 4 serve as origin points for terminating trunks A31 to A40. The forty terminating trunks B1 to B40 for line-link frame B extend similarly from verticals 5 to 8 of switches 1400; the forty terminating trunks for line-link frame C extend from verticals 9 to 12; and the forty terminating trunks for line-link frame D extend from verticals 13 to 16 of secondary switches 1400.

Terminating-trunk cables TA, TB, TC, and TD extend from terminals on the block-link frame to the terminating-trunk terminals on the respective line-link frames A, B, C, and D.

Verticals 17 to 20 of secondary switches 1400 serve as origin points for the outgoing trunks and outgoing branches of two-way trunks (such as 2020, Fig. 2) contained in outgoing-trunk cable OTC.

IIC. Capacity Variations

The capacity of the trunking plan shown in Fig. 3, is capable of variations according to (1) the number of lines required to be served, and according to (2) the traffic demands of these lines, such as the number of them demanding simultaneous service during the so-called busy hour.

If, for example, only 250 lines are required initially for an installation, only line-link frame A need be installed initially, along with minimum equipment on the block-link frame. Line-link frames B, C, and D may be subsequently added, all at the same time, or one at a time as required. The initial minimum equipment on the block-link frame may be added to as required incident to the addition of line-link frames to the full number illustrated.

At any line-link frame, line-link primary switches may be omitted when the full frame capacity (250 lines) is not required. Omitting any such line-link primary switch reduces the capacity of the line-link frame by twenty-five lines. It is contemplated that all five secondary switches 900A will always be provided on a line-link frame irrespective of any reduction in the number of primary switches. By this arrangement, all ten line-links are maintained available for use, at each installed primary switch 800A, and all originating and terminating trunks remain available for use, which would not be the case if one or more of the secondary switches 900A were omitted.

Since there is no expensive item of apparatus (such as a block coupler) individually associated with any terminating trunk, it is contemplated that the entire forty terminating trunks will be provided for each line-link frame irrespective of any light terminating traffic which may be experienced. In this manner the calls lost due to non-availability of terminating trunks is held to a minimum value, permitting the originating trunks required to be equipped with the comparatively expensive couplers to be kept down to a number which will just suffice to maintain the total lost calls during the busy hour at a percentage figure not in excess of that specified for the installation.

In the usual case, the total number of primary switches 1300 required on the block-link frame is simply one-twentieth of the total number of block couplers required to handle the originating and incoming traffic. That is, for each section of twenty block couplers required, a separate primary switch 1300 is required to be installed. Experience with telephone traffic indicates that the entire ten primary switches 1300 will be required only very rarely, even when the four line-link frames A to D are provided and are fully equipped.

When an unrequired primary switch 1300 is omitted, along with its associated section of block couplers 500, the jumpers 204 are simply arranged to connect the originating and incoming trunks in use to block couplers associated with the installed primary switches 1300.

Preferably, all ten secondary switches 1400 are installed on the block-link frame irrespective of the number of primary switches 1300 in use. Then, each installed primary switch 1300 has full use of its ten pairs of block links 206, and the number of terminating trunks per line-link frame is not reduced, nor is the number of outgoing trunks reduced.

III. COMPLETING CALLS (FIGS 1 TO 7)

The operation of the system in completing calls will now be described with particular reference to Figs. 4 to 7, which show in more circuit detail certain of the apparatus of Fig. 2.

IIIA. Block Coupler 500-L

A part of the circuit of block coupler 500-L of Fig. 2 is shown in Fig. 5. Its full circuit arrangement is assumed to be as shown in Fig. 5 of the former application.

The illustrated relays are switch-through relay 501, back-bridge relay 502, line relay 503, release relay 505, and ring-cutoff relay 507.

Digit registers IDR, HR, TR, UR, and SR are indicated by circles associated with the common groups of multipled digit wires in cables ID, H, T, U, and ST, respectively.

IIIB. Locally-Originated Calls

The operations involved in making locally-originated calls from stations S1 on line 200 will now be described with reference to Figs. 4 to 7.

IIIB1. *Initiation of call*

When the receiver (not shown) is removed at calling station S1 of Fig. 4, the usual direct current bridge is closed across tip and ring conductors T and R of line 200, thereby operating line relay 401 to hold pilot contacts HP of the associated hold magnet 403 on line-link primary switch 800A. Line relay 401 applies ground through contacts of lockout relay 402 to mark conductor M individual to the calling line, and to fives conductor F which is common to the five lines constituting the fives group in which the calling line is located.

Grounding fives conductor F applies a ground potential through fives resistor FR-1 to primary conductor P which is common to the twenty-five lines served by primary switch 800A. There are ten such wires P on line-link frame A, a separate one for each line-link primary switch.

Grounding the conductor P illustrated in Fig. 4 causes line controller 1200A to set line-controller switches 1000A and 1100A upon the calling primary switch 800A and with specific reference to the group of five lines including the calling line. Upon being so set, the line-controller switches close the indicated open points therein. Line controller 1200A now matches an idle path from calling line 200 to an originating trunk. This path may be assumed to be over line link 202A to originating trunk 203A. The test circuit for line link 202A from line controller 1200A is from line-test conductor LT through contacts of one of the line-controller switches to link-sleeve wire LS, connected to the sleeve of 202A. The test is for an idle indicating battery potential on the sleeve of the link, which is supplied through the illustrated resistor in the line controller, link-battery wire LB, and contacts of one of the line-controller switches. If line link 202A is busy, holding ground potential thereon masks the resistance-supplied battery potential, causing the link to test busy, but the idle indicating battery potential is effectively received by the line controller when the line link is idle.

When originating trunk 203A (being connected to block coupler 500-L through jumper 204) is idle the line controller 1200A receives an idle indicating battery potential over a circuit path which includes match-test conductor MT-213A through the left-hand winding of hold magnet 406, sleeve conductor S of originating trunk 203A, contacts 1 of release relay 505, and resistor 532. On the other hand, when originating trunk 203A is in use, the idle indicating battery potential on its sleeve conductor S is replaced by ground potential.

Upon matching a path over line link 202A to originating trunk 203A, line controller 1200A grounds link-select magnet wire LSM closing a circuit through contacts of one of the line-controller switches and over select-magnet wire SM for primary and secondary select magnets 404 and 405 which are associated with the primary end and with the secondary end respectively of line link 202A. Select magnets 404 and 405 thereupon operate to effect mechanical selection of link 202A at primary switch 800A and at secondary switch 900A. When select magnets 404 and 405 have both operated to effect the noted selection, battery potential from resistor CR in line controller 1200A is extended through contacts of magnets 405 and 404 and contacts of one of the line-controller switches to the primary-secondary off-normal wire PS—ON leading to the line controller.

Upon receiving battery potential over wire PS—ON, line controller 1200A operates hold magnets 403 and 406 to extend the calling line over the selected line link 202A to the matched originating trunk 203A. Hold magnet 403 is operated by the line controller upon the application of ground potential to the illustrated sleeve-units conductor SU, which is extended through contacts of one of the line-controller switches to sleeve conductor S–211A (an extension of sleeve conductor S of the calling line), and thence to battery through hold magnet 403 and lockout relay 402 in series. Upon operating, hold magnet 403 closes the illustrated stackup of contacts of primary switch 800A to extend calling line 200 to line link 202A. Additionally, it opens its illustrated hold-pilot contacts HP to disconnect line relay 401 (in the manner of the usual cut-off relay), whereupon line relay 401 restores.

Lockout relay 402, upon operating in series with hold magnet 403, prepares for placing the associated line in lockout condition if called upon so to do.

Line controller 1200A operates hold magnet 406 by applying ground potential directly to match-test conductor MT–213A, closing a circuit through the left-hand winding of hold magnet HM and thence to battery through the resistor 532 in block coupler 500–L over the previously traced path. Upon operating, hold magnet 406 connects conductors T, R, and S of line link 202A respectively to the corresponding conductors of originating trunk 203A, completing the extension of the calling line to the calling trunk. At the same time, hold magnet 406 locks it to ground on its right-hand winding to sleeve conductor S of trunk 203A. Initially the locking ground on the sleeve wire is maintained on the left-hand winding of hold magnet 406 and over the sleeve conductor controlling the line. The line controller 1200A maintains the operate circuits of magnets 403 and 406 closed for an interval sufficient to permit the seized block coupler 500–L to return holding ground over the sleeve conductor of the seized originating trunk 203A. Shortly thereafter, line controller 1200A clears out and permits line-controller switches 1100A and 1000A to clear out, leaving the extended connection held by ground applied to the sleeve conductor thereof by the seized block coupler.

IIIB2. *Seizure of block coupler 500–L*

When block coupler 500–L is seized by the described extension of a connection thereto from calling line 200, over line link 202A, originating trunk 203A, and jumper 204, line relay 503 operates over the calling line, through contacts 1 and 2 of relays 501 and 502. Line relay 503, at its front contacts 1, operates release relay 505 through contacts 3 of relay 501. At its contacts 1, release relay 505 transfers the sleeve conductors of originating trunk 203A from battery through resistor 532 to holding ground. The established connection, from the calling line to the block coupler, is thereby maintained after the line-controller apparatus of Fig. 4 has cleared out.

As explained in the former application, dial tone is placed on the calling line informing the calling subscriber that the desired number now may be dialed. The dialed digits are stored on registers indicated by circles IDR, HR, TR, UR, and SR.

IIIBA. *Outgoing calls*

If an outgoing call is being made, as to exchange C, this fact is marked by the setting of register IDR to select the desired group of outgoing trunks. Thereupon, the common control apparatus is rendered temporarily individual to the calling block coupler; the block-controller switch 1500 is positioned on the primary switch 1300 which serves the calling block coupler; and the single digit of stored information is transmitted to the outgoing controller. The outgoing controller 1700 and the block controller 1600 now act together pursuant to matching a path across the block-link frame to an idle outgoing trunk in the called group.

IIIBA1. *Outgoing matching and path selection*

If trunk 2020 is idle, an idle path may be matched thereto over a block link such as 206U of the pair illustrated in Fig. 6. The idle condition of trunk 2020 is indicated in the outgoing controller 1700 by idle-indicating battery potential normally applied to sleeve conductor S of trunk 2020 by trunk coupler 2001 and reaching the outgoing controller through the left-hand winding of hold magnet HM17 and match-test conductor MT–227. The busy or idle condition of block links such as 206U and 206L is determined by the block controller over respective sleeve conductors 225 extended thereto through contacts of the block-controller switch 1500. Sleeve resistors RU and RL are connected respectively to conductors 225 by the block-controller switch, thereby applying idle-indicating battery potential to each of them subject to being masked by ground potential thereon at any block link which is actually in use.

When the path over items 206U and 2020 has been determined by the matching operation of controllers 1600 and 1700, block controller 1600 closes a circuit through contacts of block-controller switch 1500 and over select-magnet wire SM of principal select magnets 605 and 606 in series. In order to effect selection of the matched upper link 206U of the illustrated pair, as distinct from the lower link 206L thereof, block controller 1600 closes a circuit from ground through the upper auxiliary select magnet SMU–604 of primary switch 1300 over the associated wire SMU and contacts of the block controller switch, conductors and contacts in the block controller, wire SMU leading to switch 1400, and thence to battery through the upper auxiliary select magnet SMU-607. Auxiliary magnet 604 and 607 thereupon operate to complete the mechanical selection of link 206U.

An off-normal or pilot circuit now extends from ground through off-normal contacts controlled in common by auxiliary select magnets 603 and 604 of switch 1300, contacts of any one of the ten principal magnets 605, primary off-normal conductor PON, contacts controlled by any one of the ten principal select magnets 606, contacts controlled in common by auxiliary select magnets 607 and 608, and thence over secondary off-normal conductor SON to block controller 1600.

IIIBA2. *Trunk seizure and switch-through*

Upon receiving ground as noted over the associated conductor SON, block controller 1600 closes circuits to effect the extension of the connection through switches 1300 and 1400. Closure of the switch 1400 is responsive to the application of ground potential to match-test conductor MT-227 by the block controller thereby closing a circuit through the left-hand winding of hold magnet 609 and thence over sleeve conductor S of outgoing trunk 2020 to battery in trunk coupler 2001. Hold magnet 609 thereupon locks its right-hand winding to the associated sleeve conductor S, at the same time closing its principal stackup (vertically aligned with magnet 606) which partially extends both block links of the illustrated pair, and closing its upper auxiliary stackup U (aligned with select magnet 607) to extend the conductors T, R, and S, of block link 206U respectively to conductors T, R, and S of the matched outgoing trunk 2020.

The circuit closed by block controller 1600 for effecting closure of the matched connection at primary switch 1300 is over circuit elements, not shown herein, to switching conductor SW of Fig. 5, and thence to battery through the right-hand winding of hold magnet HM2-602. Magnet 602 locks its left-hand winding to ground on the associated sleeve conductor S of extension group 205, and at the same time closes its associated principal and auxiliary stackups selected respectively by magnets 605 and 604. Conductors T, R, and S in group 205 are thereby extended respectively to conductors T, R, and S in block link 206U, and thence through secondary switch 1400 as stated to the corresponding conductors in outgoing trunk 2020.

Hold magnet 602 grounds hold-pilot wire HP in group 205, thereby closing an operate circuit (not shown) for switch-through relay 501 of block coupler 500-L.

At its contacts 1 and 2, relay 501 switches the tip and ring conductors of the attached originating trunk through metallically to conductors T and R of extension group 205, now extended across the block-link frame to the trunk coupler 2001 (Fig. 7) associated with the seized outgoing trunk. The line and release relays (not shown) thereupon operate in the seized trunk coupler, whereby holding ground is applied to the sleeve wire at that point to maintain the extended connection.

Line and release relays 503 and 505 of the block coupler now restore, leaving the established connection held by the seized trunk coupler.

The impulses constituting the remaining digits in the called number are repeated in the usual manner at trunk coupler 2001 of Fig. 7.

IIIBA3. *Outgoing-call clearout*

When trunk coupler 2001 on the seized outgoing trunk clears out, responsive to the receiver being replaced on the calling line, it responds in the usual manner to remove ground potential from the sleeve conductor of the established connection, thereby breaking down the connection by releasing the primary and secondary hold magnets 602 and 609 on the block-link frame and lockout relay 402 and hold magnets 403 and 406 (Fig. 4) on the line-link frame. The release of primary hold magnet 602 on the block-link frame ungrounds the associated conductor HP to release switch-through relay 501 of coupler 500-L, thereby clearing out the block coupler as described in the former application.

IIIBB. *Terminating calls*

Following the described seizure of block coupler 500-L, if the initial digit dialed and registered on IDR is the one which indexes the local block of one thousand line numbers, it is followed by hundreds, tens, units, and stations digits which are registered respectively on registers HR, TR, UR, and SR. Such digits are transmitted to the block translator 1800 when the block controller is called in for terminating operation.

IIIBB1. *Testing the called line*

Upon receiving the extended digit information, the block translator transmits a suitably translated version of the hundreds, tens, and units digits to the line controller on the line-link frame at which the called line terminates. The station-digit information is used for ringing-control and station-intercept purposes as explained in the former application.

If the illustrated station S2 is the one called, it is served by line-link frame B which includes apparatus shown in Fig. 7. In this event, the translated digit information is sent to line controller 1200B over conductors in cable 223B.

On receiving the translated digit information indicating which primary switch (primary switch 800B, Fig. 7) serves the line being called, and indicating the fives and units location of the called line thereon, line controller 1200B identifies itself at block controller 1600 by a signal transmitted over a conductor in group 222B and positions line-controller switches 1000B and 1100B in accordance with line-link primary switch 800B and in accordance with the fives group thereon in which the called line is located.

When switches 1000B and 1100B have been set, one of them extends the sleeve conductor S-211B of the called line over sleeve-units wire SU-240B to line controller 1200B, whence it is extended over a conductor in cable 222B to the block controller 1600 to enable the called line to be tested as to its busy or idle condition. At the same time, each of the ten link sleeves associated with the called primary switch 800B is connected to the line controller through one of the line-controller switches. For example, the sleeve of the illustrated link is connected through link-sleeve wire LS-212B and link-test wire LT. Link resistor LR is connected to this sleeve conductor over conductor LB and other contacts of the line-controller switches to provide an idle-indicating test potential on the sleeve of the link unless the link is in use. The busy or idle condition of the line link serving primary switch 800B is separately indicated to block controller 1600 over respective conductors in cable 222B.

IIIBB2. *Terminating-busy operation*

On testing the called line, if block controller 1600 finds it busy, or finds that no idle path can be matched thereto, the block controller operates the busy relay (not shown) in block coupler 500-L which applies busy-tone current to the calling line.

IIIBB3. *Called-line seizure*

If an idle path can be matched to the called line, and if the called line is idle, the block controller matches a path thereto, such as over block link 206U, (Fig. 6) terminating trunk 207B, and line link 202B.

Block link 206U is selected mechanically at switches 1300 and 1400 by the operation of select magnets 604 to 607 as described, whereupon they cooperate to ground conductor SON as described to signal the block controller 1600.

Line link 202B is selected mechanically by the operation of select magnets SM-705 and SM-704. Their circuit is closed at the block controller over a wire in cable 222B, through line controller 1200B, wire LSM, a contact pair of one of the line-controller switches, the associated select-magnet wire SM, and thence to battery through magnets 704 and 705 in series.

With magnets 705 and 704 operated, a signal is transmitted to block controller over a circuit path from battery at control resistor CR of the line controller 1200B series contacts of magnets 705 and 704, contacts of a line-controller switch, associated wire PS-ON, and thence to the block controller over a wire in cable 222B.

Upon receiving the noted signals that the select magnets have operated on the block-link and line-link frames, block controller 1600 grounds the sleeve of the called line 210 (Fig. 7) over the noted test extensions thereof, thereby operating hold magnet HM-703 in series with lockout relay 702. Magnet 703 disconnects line relay 701 and connects the called line to the selected line link 202B. Block controller 1600 also grounds the sleeve wire of the matched terminating trunk 207B (by way of wire MT-226), thereby operating magnet HM1-610 on the block-link frame and secondary hold magnet HM-706 on the line-link frame. Block link 206U is thereby extended over conductors T, R, and S of trunk 207B to line link 202B. Block controller 1600 also grounds its terminating switching wire to close a path over circuit elements (not shown) in coupler 500-L, and thence over the associated wire SW, to operate primary hold magnet HM2-602 to complete the connection over the matched path to the called line. Hold magnet HM2-602 also closes its local contacts to ground hold-pilot conductor HP, thereby operating the switching relay (not shown) in the block coupler to free the common apparatus, and to apply ringing current to the called line over a circuit path only partially shown, but which includes the line winding of ring-cutoff relay 507.

IIIBB4. *Answering*

When the call is answered, relay 507 operates in the usual manner to open the ringing circuit and close the talking path through condensers 516 and 517.

IIIBB5. *Terminating-call clearout*

If the called subscriber (at station S2, Fig. 7) is the first to replace his receiver at the end of the conversation, back-bridge relay 502 thereupon restores, reversing current flow over the calling line back to normal direction.

When the receiver is replaced on the calling line, line relay 503 restores and (at its make contact 1) open-circuits release relay 505, which restores a moment later, removing ground potential (at its make contact 1) from the sleeve conductor S of the established connection. The established connection is thereby cleared out, by the release of the primary and secondary hold magnets 403 and 405 on the calling line-link frame, the primary and secondary hold magnets 602 and 610 on the block-link frame, and the secondary and primary hold magnets 706 and 703 on the called line-link frame.

IIIBC. *Reverting call*

To make a reverting call (call another station on the same line with the calling station), the calling subscriber removes his receiver; responds to dial tone by dialing the regular directory number of the called station; replaces his receiver upon hearing a distinctive reverting-call tone prompting him so to do; waits a reasonable time for ringing current to be applied to the line to signal the called station; and then again removes his receiver for conversation. It may be assumed, for the purpose of this description, that the subscriber at station S1 has become connected to block coupler 500-L as described, and has dialed the number of another station on calling line 200.

When block coupler 500-L is used for a reverting call, its operation is as described for a terminating call, up to the point when the common apparatus on the block-link frame has been called in, after the complete number has been dialed and registered on registers IDR to SR.

In the present example, since the number dialed is that of a line (200) served by line-link frame A as shown in Fig. 4, block translator 1800 sends the translated equivalent of the hundreds, tens, and units digits of the called number over wires in cable 223A to line controller 1200A, which responds as described for line controller 1200B to set line controller switches 1100A and 1100B appropriately, thereby closing a test extension of sleeve conductor S of the called (and calling) line 200 to the block controller 1600 over conductor S-211A, line-controller contacts, conductor 249A, and a wire in cable 222A.

The holding ground maintained on the sleeve of calling line 200 by block coupler 500-L causes that line to test busy when the block controller 1600 tests it over the described extended sleeve connection. Before treating the called line as normally busy when it tests busy as stated, the block controller applies a reverting-call test to the called line as described in the former application, operating the reverting-call relay (not shown) in the block coupler when the reverting-call test so indicates.

When the noted reverting-call relay is operated in the block coupler, no forward connection is closed, but switch-through relay 501 is operated to cause ringing current to flow back to the calling line, to signal the called substation thereon, as described in the former application.

IV. LINE-CONTROLLER SWITCHES (FIG. 8)

Referring to Fig. 8, it has been chosen to illustrate the line-controller switches 1000 and 1100 only so far as they differ from the line-controller switches of the former application. Switches 1000 and 1100 of this application may be as shown in Figs. 11 and 12 of the former application, with the exception that the connections to the hold-pilot contacts HP have been rearranged to provide hold-pilot wires HP1 and HP2, rather than the single wire HP of the former application.

As described in the former application, the setting of switches 1000 and 1100 for originating and for terminating operation is started when a select magnet of each (not shown herein) is operated from the line controller. An off-normal contact 1007, and a similar contact 1107, are thereby closed to apply ground potential to common off-normal wire CON. Ground on this wire operates hold magnets HM1 and HM4 in each switch. The ten select-magnet wires and the ten link-sleeve wires (such as SM and LS of Fig. 4) of the selected primary switch 800 are thereby closed through to the line controller, and battery through a link resistor LR is placed on each such wire LS pursuant to link test.

At this point, wire HP1 of Fig. 8 is grounded through a series of contacts of the operated hold magnets HM1 to HM4 of each switch, as a signal that the line links of the selected primary switch 800 are undergoing test (by link-test relays of the line controller).

Over one or another of the associated wires HM5 to HM9, the line controller operates a hold magnet HM5 to HM9 of each line-controller switch to effect fives selection with respect to the selected primary switch 800. On originating operation, this necessarily occurs later than the first-noted hold-magnet operation, while both noted hold-magnet operations occur at about the same time on terminating operation of the line-controller apparatus.

When the desired one of hold magnets HM5 to HM9 has operated to each line-controller switch, wire HP2 is grounded by their contacts HP in series, as a signal that fives selection has been accomplished in the two switches 1000 and 1100.

V. LINE CONTROLLER (FIG. 9)

Line controller 1200 of Fig. 9 will now be described. It represents any one of four line controllers, a separate one for each of the four 250-line line-link frames A to D of Figs. 2, 3 and 4 to 7.

As will appear hereinafter, the line controller 1200 in this disclosure is generally similar to the line controller of the former application, differing primarily by having certain of its circuit paths altered pursuant to the improved control arrangement for path selection with which this application deals.

Primary points of operational difference include (1) earlier starting of the originating-call matching operation (on the noted grounding of wire HP1), and (2) notifying the block controller as soon as the line-controller apparatus is in readiness for terminating-call matching.

VA. Purpose and Arrangement

The purpose of line controller 1200 is (1) to control the previously described extension of connections from calling lines, across the associated line-link frame to available idle originating trunks, and (2) to cooperate with the block controller in extending connections as described across the block-link frame and the called line-link frame to idle called lines thereof.

In the fulfillment of the foregoing purposes, the two associated line-controller switches 1000 and 1100 are employed to select and connect with the concerned line-link primary switch 800 and with the concerned five-line group served thereby.

Line controller 1200 comprises more than one hundred relays (such as 12A1) and associated circuit apparatus. These parts are suitably interconnected with each other and with the illustrated external leads of the line controller to perform all control and testing operations required of the line controller. It may be noted that all calls to and from lines of the associated line-link frame are handled through its assigned line controller 1200, one call at a time.

VB. General Originating-Call Operation

On originating calls, starting from normal cleared-out condition, the general operation of line controller 1200 is as follows:

VB1. *Primary selection*

It responds to resistance ground placed on the P lead of any associated line-link primary switch 800 by a calling line, by selecting that primary switch, exercising an order of preference if two or more P leads are grounded; locks in the selection; and opens all such P leads to prevent subsequent interference thereover.

VB2. *Starting*

It operates its originating-start relay 12B10 to disable its terminating-start relay 12B8, thereby preventing interference, by terminating calls; it starts a cycle-timing operation preparatory to clearing itself out shortly if the originating operation is blocked from normal completion in any manner; and it grounds the line-controller switch select-magnet wire SM which corresponds to the selected line-link primary switch, causing both line-controller switches 1000 and 1100 to select the selected calling primary switch and to connect therewith.

VB3. *Line-link test*

On the noted operation of the line-controller switches, the line controller makes a continuing test of all the line links of the selected primary switch for idle-indicating battery on the sleeve, in preparation for matching.

VB4. *Fives selection*

On receiving ground (from contacts of an operated line relay) over a fives lead F of the selected primary switch 800, the line controller selects the corresponding fives group of lines, exercising an order of preference if two or more fives wires are grounded; it locks in the fives selection locally and disconnects the fives wires to preclude subsequent interference thereover; and it operates one of hold magnets 5 to 9 in each line-controller switch to cause switch 1000 to connect up the sleeve leads of the lines in the selected fives group, and to cause switch 1100 to connect up the individual mark leads of the lines in the selected fives group.

VB5. *Units selection*

On receiving ground (from another contact of the operated line relay) over an individual mark wire M in the selected fives group, the line controller selects the corresponding line as the calling line (by connecting with the sleeve wire S thereof), exercising an order of preference if two or more lines are calling in the selected fives group; and it locks in the units selection locally and opens its units chain circuit to preclude subsequent interference with the established units selection.

VB6. *Line test*

The line controller now tests the sleeve of the calling line for battery thereon through the associated hold magnet HM.

VB7. *Matching; first call-in*

Subject to the receipt of a hold-pilot signal showing that all required hold magnets have been operated in both line-controller switches, the line controller starts the matching operation by connecting up the match-test wires (MT) of the call-in group of originating trunks next succeeding the one last called in (on the preceding originating operation) and tests the MT wires in combination with the line-link sleeve wires for an idle matching path. Since the ten line links from any primary switch extend respectively to the ten secondary sections, there are ten originating trunks in any call-in group, extending respectively from the ten secondary sections. An idle test of an originating trunk requires that it be jumpered to a block coupler 500-L which supplies idle-indicating battery to the sleeve wire thereof.

VB8. *Matching; succeeding call-ins*

If no idle path can be matched from the calling line to an originating trunk of the group first called in, the line controller calls in the next succeeding call-in group of ten originating trunks, and repeats the matching attempt with respect thereto, continuing to call in the groups one after another until all four have been called in. If no idle path can be matched on the fourth call-in, the line controller immediately clears out and returns to normal condition, clearing out the associated line-controller switches.

VB9. *Matching; path preference*

The matching of an idle path requires that the line link and the originating trunk of such path both test idle. If two or more paths test idle on the same call-in of originating trunks, the line controller exercises an order of preference to select one as the matched path.

VB10. *Select-magnet operation*

Upon the selection of the matched path, the line controller closes a series primary and secondary select-magnet circuit (through contacts of line-controller switch 1100) for causing the matched line link to be selected mechanically at switches 800 and 900.

VB11. *Hold-magnet operation*

Upon a signal over wire PS-ON that the matched line link has been selected mechanically at the primary switch and at the secondary switch, the line controller simultaneously closes a circuit for the secondary hold magnet associated with the matched originating trunk and for the primary hold magnet associated with the calling line. These hold magnets operate as described to extend the calling line to the matched originating trunk, by connecting it with the primary end of the matched line link, and by connecting the matching originating trunk with the secondary end of such line link.

VB12. *Clearing out*

At the end of a time interval sufficient to allow holding ground to be returned over the sleeve wire of the seized originating trunk, to hold the operated primary and secondary hold magnets, the line controller clears out, permitting the line-controller switches to clear out as described.

VB13. *Preference-shift*

After every originating operation, the line controller operates to change the preference as to primary switches and as to secondary sections. First choice shifts from 1 to 2 to 3, and so forth, to 10, and then back to 1 again. On each shift, the preceding first choice becomes last choice. On each even-numbered step, first choice is advanced to the next fives group of lines on a primary switch.

VB14. *Cycle-timing*

If the cycle of originating operations is not completed within a cycle-timing interval long enough for a matching attempt on each of four call-ins of originating trunks, the cycle timer clears out the line controller and returns it to normal condition for a new start.

VB15. *Taking time out*

When a line controller has made ten successive unsuccessful attempts to extend a calling line over an idle line link to an idle originating trunk, it places itself in a temporary quiescent condition wherein it will not respond to calling lines. It resumes its normal active condition responsive to the lapse of a substantial fraction of a minute.

VB16. *Peg count*

On the successful completion of each originating operation, the line controller grounds its originating-call-completed wire OCC to operate a corresponding peg-count meter. Each time it takes time out (by entering its temporary quiescent condition), it grounds its originating-calls-lost wire OCL to operate a corresponding meter.

VC. GENERAL TERMINATING-CALL OPERATION

On terminating calls, starting from normal cleared-out condition, the general operation of line controller 1200 is as follows:

VC1. *Receiving translated digits P, F, and U*

On the receipt from block translator 1800 (over one of ten P leads, one of five F leads, and one of five U leads) of translated digit information identifying a primary switch 800 containing a called line, the fives group of lines thereon, and the called line of the five, the line controller records the information on respective relay chains.

VC2. *Starting*

It operates its terminating-start relay 12B8 to disable its originating-start relay 12B10, thereby preventing interference by originating calls.

VC3. *Primary selection*

It grounds the line-controller switch select-magnet wires SM corresponding to the recorded primary digit, causing both line-controller switches to select the corresponding primary switch and to connect certain wires of the line controller therewith, at the same time grounding hold-pilot wire HP1.

VC4. *Line-link test*

On the noted operation of the line-controller switches, the line controller makes a continuing test of all the line links of the selected primary switch for idle-indicating battery on the sleeve. For each line link testing idle, the line controller closes the corresponding link-select-magnet wire LSM through to its corresponding link wire LK, thus notifying the block controller that the corresponding line link is idle, as well as preparing for select-magnet operation over one of the LK wires when the matched path has been selected by the block controller.

VC5. *Terminating-frame identification*

The line controller earlier prepares a circuit for grounding its terminating-frame wire TF to identify the called line-link frame at block controller 1600. The previously noted grounding of wire HP1 completes this circuit at the proper time to serve as a match-start signal in the block controller.

VC6. *Fives selection*

The receipt of ground over common-off-normal conductor CON, showing that the select magnets in both line-controller switches have operated, completes a prepared circuit through the line controller for the hold magnet 5 to 9 of each line-controller switch which corresponds to the recorded fives digit, causing line-controller switch 1000 to connect up the sleeve leads S of the lines in the selected fives group.

VC7. *Units selection*

With the units digit recorded, the one of the five sleeve leads connected up which corresponds to the called line is thereupon extended through the line controller and over called-line-sleeve conductor CLS to the block controller, for test.

VC8. *Clearing out*

Following the noted operations, the line controller remains quiescent while the block controller completes its operation, including matching a path to the called line and operating the switches to complete it. Thereupon the block translator withdraws the translated digit information, whereupon the line controller clears out, along with the two associated line-controller switches.

VC9. *Digit alarm*

If a fault causes block translator 1800 to ground two or more digit wires in the primary, the fives, or the units group, the line controller gives a lamp indication of the digit involved and grounds line-controller-alarm conductor LC-AL until alarm-release key 1207 is actuated.

VD. FUNCTIONAL RELAY GROUPS

The relays of line controller 1200 comprise the following functional groups:

1. Relays 12A1 to 12A11, originating-primary chain _____ (O)
2. Relays 12A12 to 12A22, terminating-primary chain _____ (T)
3. Relays 12A23 to 12A30, fives chain (O) (T)
4. Relays 12B1 to 12B7, units chain __ (O) (T)
5. Relays 12B8 and 12B9, terminating-control group _____ (T)
6. Relays 12B10 to 12B18, originating-control group _____ (O)
   6a. Relays 12B11 to 12B15, cycle timer___ (O)
7. Relays 12B19 to 12B24, time-out group___ (O)
   7a. Relays 12B22 to 12B24, time-out pulser _____ (O)
8. Relays 12C1 to 12C13, choice allotter____ (O)
9. Relays 12C14 to 12C29, trunk-call-in group _____ (O)
   9a. Relays 12C14 to 12C16, call-in pulser _____ (O)
   9b. Relays 12C17 to 12C21, call-in allotter _____ (O)
   9c. Relays 12C22 to 12C25 call-in totalizer _____ (O)
   9d. Relays 12C26 to 12C29, trunk call-in__ (O)
10. Relays 12D1 to 12D10, link-test group _____ (O) (T)
11. Relays 12D11 and 12D12, match-pilot group _____ (O)
12. Relays 12D13 to 2D22, trunk-test group (O)

NOTE: (O) signifies use in originating operation;
(T) signifies use in terminating operation.

VE. DETAILED ORIGINATING-CALL OPERATION

On originating calls, the detailed operation of line controller 1200 is as follows:

VE1. *Units, fives, and primary marking*

When a call is originated on any one of the 250 lines served by the associated line-link frame, the line relay thereof (such as 401, Fig. 4) operates on the concerned primary switch 800. As described, such line relay (1) grounds its individual mark conductor M, and (2) grounds the fives wire (F1 to F5) assigned to the fives group in which the calling line is located.

VE2. *Primary selection*

The grounding of any F wire of a line-link primary switch places a resistance-derived ground on the primary wire lead of that primary switch, being one of the ten wires P1 to P10 (Fig. 9) extending between the ten primary switches 800 and the line controller. With line controller 1200 in its illustrated normal condition, the grounding of any such lead P closes a circuit through a back contact of cutoff relay 12A1 for the corresponding primary relay 12A2 to 12A11.

VE2a. *Exercise of preference*

Battery potential from supply resistor 1209 normally stands on the lower winding of each relay 12A2 to 12A11. The choice allotter (Fig. 9, Part 3) supplies this potential directly over one or another of the wires 1 to 10 in group 1251 to the associated relay, and thence through the endless back-contact chain (contacts 2) of relays 12A2 to 12A11 to the other relays of the chain. If, for example, the choice allotter is in its illustrated position 1 (all of its relays in restored condition except relay 12C4), battery potential stands on wire 1 of group 1251 (through break contacts 1 of relays 12B18 and 12C2, and make contact 1 of relay 12C4) to give first choice to relay 12A2.

If two or more of the associated wires P1 to P10 incoming from the primary switches 800 are grounded at the same time, each corresponding one of the relays 12A2 to 12A11 starts to operate, but the first such relay in the current order of preference opens the preference chain (at its break contact 2) to prevent effective operation of any succeeding one.

Upon operating effectively, any primary relay 12A2 to 12A11 first opens (at its break contacts 2) the forward extension of the endless preference chain, and then closes its make contacts 1, 3, and 4. At its make contacts 1, it locks ground on its upper winding terminal through break contact 2 of clearout relay 12B18.

Cutoff relay 12A1 is operated by contacts 3 of any relay 12A2 to 12A11 to disconnect all leads P1 to P10. This leaves effectively operated and locked the first relay 12A2 to 12A11 (in the current order of preference) which had an operating circuit closed over its associated P wire, which is now disconnected by relay 12A1.

VE3. *Seizing the originating control group*

In a circuit through contacts 3 of the operated relay 12A2 to 12A11, and contacts 11 of relay 12A1, cutoff relay 12A1 starts the originating control group of the line controller into operation by operating originating-start relay 12B10, through break contact 5 of terminating-start relay 12B8 and break contact 6 of start relay 12B20 of the time-out group. Relay 12B10, at its break contact 9, disconnects terminating-start relay 12B8 to preclude interference with the initiated originating operation by a subsequent call for terminating operation, and it prepares a number of circuits for subsequent use.

VE4. *Starting the cycle timer*

Relay 12B10 at its contacts 6, starts the cycle timer (relays 12B11 to 12B15) into operation by applying operating ground to relay 12B11 through closed contact 2 of relay 12B15. Relays 12B11 to 12B15 now operate in succession, and relay 12B15 closes a short circuit around relay 12B11 to cause relays 12B11 to 12B14 to restore in succession. Each of the relays 12B11 to 12B13, on restoring, short-circuits the next succeeding relay. The time required for the cycle timer to pass through its indicated cycle of operation is in excess of the maximum time required for the line controller to complete originating-call operation and clear out. The principal portion of this time is accounted for by the restoring time of the successively short-circuited relays 12B11 to 12B14.

VE5. *Primary selection at line-controller switches*

Upon its described operation, originating-start relay 12B10 applies ground (at its contacts 8) through break contacts 3 of terminating-start relay 12B8, and through make contacts 4 of the locked one of the primary-chain relays 12A2 to 12A11, to the corresponding one of the select-magnet leads SM1 to SM10 extending to the line-controller switches 1000 and 1100. The grounding of this lead causes the corresponding select magnet to operate in each line-controller switch, whereupon hold magnets 1 to 4 operate in each switch as hereinbefore described to effect electrical selection of the control wires associated with the selected calling primary switch 800. At this time the hold-pilot wire HP1 is grounded as hereinbefore described to start matching operations as described hereinafter.

VE6. *Line-link test*

Line-controller switch 1000, as a part of its described primary-switch selection, connects the link-battery leads LB1 to LB10 (Fig. 9, Part 4) of the line controller respectively to the link-sleeve wires LS of the line links 202 serving the selected primary switch. At the same time, this line controller switch connects these wires LS respectively to the link-test wires LT1 to LT10 of the line controller, and consequently to the upper winding terminal of link-test relays 12D1 to 12D10. The lower winding terminal of each link-test relay is grounded, wherefore each such link-test relay now operates in series with its corresponding one of the battery-supply resistors 1211 to 1220, and over its wire LR1 to LR10 (Fig. 9, Part 4) unless the corresponding line link is busy. In that event, ground on the sleeve of the line link short-circuits the connected link-test relay. The link-test relays 12D1 to 12D10 now await matching.

VE7. *Fives selection*

Line-controller switch 1100 as a further part of the described primary selection, connects the fives wires F1 to F5 of the selected primary switch respectively to the associated wires F1 to F5 (Fig. 9, Part 1, upper margin) of the line controller, thereby closing a circuit from any grounded one of such leads, through contacts of cutoff relay 12A23, and through the upper winding of the corresponding fives relay 12A25 to 12A29, to battery through the associated preference chain and contacts of the choice allotter. If the choice allotter is in its assumed first position (wherein only relay 12C4 is operated) wire 1 in group 1252 between the choice allotter and the fives chain is connected to battery through front contact 2 of the first allotting relay 12C4, break contact 2 of relay 12C2, and make contact 5 of originating-start relay 12B10. This gives first choice to the first fives relay 12A25.

If two or more fives wires are grounded, two or more of the fives chain relays 12A25 to 12A29 attempt to operate, but only one fives relay operates effectively, the first one in the order of preference counting from the one currently having first choice. This arrangement is similar to the preference lockout arrangement described for the primary chain.

Upon its effective operation, the selected fives relay 12A25 to 12A29, at its contacts 2, locks operating ground on its upper winding terminal, and at its contacts 5, it operates cutoff relay 12A23 to disconnect the fives wires at contacts 1 to 5. Thereupon, any ineffectively operated fives relay restores.

VE8. *Fives selection at line-controller switches*

Cutoff relay 12A23, at its contact 6, operates its auxiliary relay 12A24 to connect common-off-normal wire CON to the hold-magnet lead (HM5 to HM9) selected by the locked fives-chain relay. The operate time of relay 12A24 provides a delay sufficient to insure that any ineffectively operated fives-chain relay is completely restored.

If, for example, the first fives relay 12A25 is the one operated and locked, the ground on the common-of-normal conductors CON (appearing responsive to the noted select-magnet operation in the line-controller switches) is now extended through contacts 1 of relays 12A24 and 12A25, to hold-magnet lead HM5 extending to the two line-controller switches, thereby operating the corresponding hold magnet HM5 in each switch to select the first fives group of lines served by the selected primary switch.

VE9. *Units selection*

In line-controller switch 1100 the noted fives selection connects the individual mark leads of the lines in the selected fives group respectively to the mark-units lead MU1 to MU5 of the line controller. Marking ground on any one of these leads closes a circuit for the upper winding of the associated one of the units-chain relays 12B2 to 12B6, through normally closed make-before-break contacts 4 of the relay, the common chain-end conductor 1210, chained back contacts 3 of relays 12B6 to 12B2, to battery through closed contact 4 of originating-start relay 12B10, and resistor 1208. On operating, any one of the relays 12B2 to 12B6, at make contact 4, locks itself to battery on the input wire of the chain (directly in the case of relay 12B2, and through the contact-3 chain in the case of any succeeding one); at break contact 4 disconnects its upper winding from chain-end wire 1210; and a contact 3 opens the chain to restore any succeeding one of the relays which may have operated. At its contact 2, any effectively operated relay 12B2 to 12B6 locks its upper winding terminal to ground at make contact 2 of originating-start relay 12B10 to maintain the units selection independent of the continued energization of the calling line relay.

After a slight interval, sufficient to permit the clearing out of any transient condition resulting from two or more relays of the units chain attempting to operate, auxiliary relay 12B1 operates, through contact 6 of the effectively operated relay 12B2 to 12B6, to extend the sleeve lead of the selected calling line into the line controller. This extension is prepared by the described fives-selecting action of line-controller switch 1000, which connects the sleeve leads of the lines in the selected fives group respectively to sleeve-units wires SU1 to SU5 of the line controller. The one of such wires which corresponds to the selected calling line is now extended (through contact 1 of the operated units-chain relay (12B2 to 12B6), and through the associated contact 2 to 6 of the operated auxiliary relay 12B1) to sleeve wire 1221 of the line controller. With relay 12B10 operated, wire 1221 is connected through contacts 10 thereof to ground through the winding of line-test relay 12B16.

VE10. *Calling-line test*

When the sleeve wire of the calling line is thus extended to line-test relay 12B16, if there is battery on the sleeve wire of the calling line (through the winding of the associated hold magnet on the primary switch 800), line-test relay 12B16 operates as an indication that the calling line has been selected and is capable of extension. Because of the relatively high resistance of line-test relay 12B16, neither the primary hold magnet HM associated with the calling line, nor the lockout relay LO, is prematurely operated, but the test current flowing through relay 12B16 sufficiently primes the hold magnet that it operates promptly when its operate circuit is later closed.

VE11. *Match-start*

As previously noted, hold-pilot wire HP-1 is grounded by series contacts HP of hold magnets HM1 to HM4 of line-controller switches 1000 and 1100 (Fig. 8) incident to the completion of primary selection thereat. This primary selection includes the previously noted connection of link-test relays 12D1 to 12D10 to the sleeve wires of the line links of the selected primary switch. The noted grounding of wire HP1 starts the matching operation to permit it to occur while the described fives, and units selection and line test are in progress.

Ground on wire HP1 extends through contacts 1 of originating-start relay 12B10 to match-start wire 1222 leading to the call-in totalizer, the call-in allotter, and the call-in pulser (Fig. 9, Part 5). Ground on match-start wire 1222 starts the call-in pulser (relays 12C14 to 12C16) into operation to control the step-by-step advance of the call-in allotter during matching, if required.

VE12. *First call-in*

The call-in allotter (relays 12C17 to 12C21) is a four-position counting chain so arranged that one or another of its counting relays 12C18 to 12C21 is in operated condition at any time. If the call-in allotter is in its illustrated first position (relay 12C18 operated and all other relays thereof restored), the noted extension of ground to match-start wire 1222 closes two relay circuits therethrough. One such circuit is through break contact 2 of relay 12C17 and make contact 3 of relay 12C18, to battery through the first relay 12C22 of the call-in totalizer (relays 12C22 to 12C24). At its contacts 1, relay 12C22 locks to ground on match-start wire 1222. The other such circuit is through break contact 3 of relay 12C17 and make contact 4 of relay 12C18, to battery through the first trunk call-in relay 12C26. Relay 12C22 now operates and locks to record the first call-in of originating trunks, and relay 12C26 operates to effect the first call-in of originating trunks 203 by connecting the match-test wires (MT1 to MT10) of the ten originating trunks of the first call-in group to contacts 2 of link-test relays 12D1 to 12D10 respectively.

As previously described, the ten originating trunks of any call-in group extends respectively from the ten secondary sections on the line-link frame. The ten line-links at any primary switch 800 on the same line-link frame extend respectively to these secondary sections. The successful extension of a calling line over an originating trunk depends upon that trunk being idle and upon the line link over which it is reached being idle.

As will later appear, when a match occurs on any call-in of originating trunks, match-pilot relay 12D11 operates, followed by its auxiliary relay 12D12. Among other things, relay 12D12 opens the operate circuit of relay 12C16 of the call-in pulser to prevent further advance of the call-in allotter until the line controller is cleared out.

VE13. *Succeeding call-ins*

If no match occurs on the first call-in of originating trunks, match-pilot relay 12D11 and its auxiliary relay 12D12 fail to operate, permitting the call-in pulser to advance the call-in allotter by operating the next succeeding counting relay (12C19) thereof and restoring the previously operated one (12C18). This advance results in the restoration of the operated trunk-call-in relay (12C26) and in the operation of the next succeeding one (12C27) accompanied by the operation and locking of the next succeeding relay (12C23) of the call-in totalizer. The match-test wires (MT11 to MT20) of the new call-in group are thus substituted for the match-test wires (MT1 to MT10) of the initial call-in group.

If no match results on the second call-in of originating trunks, the call-in allotter is again advanced by the call-in pulser, causing the operated trunk-call-in relay to restore and the next succeeding one to operate, along with the third totalizer relay.

If no match results on the third call-in, the operated call-in relay is restored and the remaining one is operated to call in the fourth and final group of originating trunks for test.

Since the corresponding call-in totalizer relays 12C22 to 12C25 are operated along with the trunk call-in relays 12C26 to 12C29, and are held locked following their operation, if matching does not occur on the fourth call-in, the next succeeding operation of relay 12C16 of the call-in pulser closes a circuit through series contacts 2 of call-in totalizer relays 12C22 to 12C25 for clearout relay 12B18, to clear out the line controller and return it and the line-controller switches to normal condition, as is hereinafter described.

VE14. *Matching*

As previously stated, the line links serving the selected primary switch are tested respectively by link-test relays 12D1 to 12D10, over wires LT1 to LT10. Any link-test relay now stands operated subject to the corresponding line link being idle (having no ground on its sleeve wire to shunt the link-test relay).

Since the ten line links serving any line-link primary switch extend each to a different one of the ten secondary sections, the ten originating trunks of any call-in group each extend from a different secondary section. Each, therefore, is capable of use only with its corresponding line link, and then only if both the line link and the originating trunk are idle.

On any call-in of originating trunks, the match-test wires of the ten trunks of the group called in (by any relay 12C26 to 12C29) are extended through contacts 1 to 10 of such relay to the armatures 2 of link-test relays 12D1 to 12D10, respectively. The make contacts of these armatures are connected through break contacts 1 to 10 of match-pilot relay 12D11 to ground through the high-resistance upper windings of trunk-test relays 12D13 to 12D22. The energization of the test winding of any such relay, from idle-indicating battery potential on the connected MT wire, shows that the corresponding path (through a line-link 202 extending to a secondary section and over an originating trunk 203 extending therefrom) is available, in that both the line link and the matched originating trunk of the path are idle.

If, for example, the first line link extending from the selected primary switch is idle, link-test relay 12D1 is operated as previously described. Accordingly, the match-test wire MT extended to armature 2 of this relay by the call-in operation is further extended through the make contact thereof, and through break contact 1 of relay 12D11, to ground through the upper winding (the test winding) of trunk-test relay 12D13. If the first originating trunk of the call-in group is idle, and is provided with a block coupler 500 (by jumper 204 on the block-link frame), an idle-indicating battery potential is supplied to the match-test wire MT thereof from the sleeve wire S of the connected block coupler 500, sleeve wire S of the originating trunk 203, and through the operate winding of the hold magnet HM (Fig. 4) serving the originating trunk on the secondary switch. This battery potential serves to effectively energize the test winding of relay 12D13, fully operating the relay.

For each matching path over an idle line link and corresponding originating trunk, the trunk-test relay 12D14 to 12D22 is similarly operated.

VE14a. *Matching-path preference*

When two or more idle matching paths are available on a call-in of originating trunks, and two or more trunk-test relays 12D13 to 12D22 operate as described, one such path must be selected as the matched path to the exclusion of any other available one. For this purpose, an endless-chain locking circuit is provided through contacts 3 of the trunk-test relays. Locking ground is supplied to this locking chain and one or another of the wires in group 1254. The choice allotter (relays 12C1 to 12C13) shifts the preference each time it advances a step, by advancing the point in the locking chain at which locking ground is applied.

With the choice allotter in its illustrated first position (relay 12C4 operated and all other relays restored), locking ground is extended through front contact 11 of originating-start relay 12B10, back contact 4 of relay 12C2, front contact 4 of the operated relay 12C4, and conductor 1 in group 1254, directly to the locking armature 3 of relay 12D13, giving first choice to relay 12D13, and consequently to secondary section 1, which it and link-test relay 12D1 represent. If trunk-test relay 12D13 is then in operated condition, it is thereby effectively locked irrespective of the operated condition of any other trunk-test relay, and it holds open the locking chain with respect to them. If relay 12D13 is not then operated, then the first succeeding operated trunk-test relay is thereby locked operated over the chain through back contacts 3 of the preceding trunk-test relays.

VE14b. *Match-pilot operation*

Upon the closure of a locking circuit through any operated trunk-test relay, match-pilot relay 12D11 operates in series with the locking winding thereof, disconnecting the trunk-test windings of all relays 12D13 to 12D22, whereupon any operated one of these relays restores except the effectively locked one. Relay 12D11 also operates its auxiliary relay 12D12, the operate time of which allows any operated ones of the trunk-test relays other than the locked one to restore.

Upon operating, auxiliary relay 12D12, at its contacts 1, disconnects conductor 1223 from the grounded match-start wire 1222, thereby temporarily halting the operation of the call-in pulser by preventing operation of relay 12C16. The currently operated trunk call-in relay (12C26 to 12C29) accordingly remains operated to permit the calling line to be extended over the selected matched path.

VE15. *Primary and secondary select-magnet operation*

At its contacts 2, auxiliary relay 12D12 of the match-pilot group grounds the associated front contacts 1 of the trunk-test relays 12D13 to 12D22, thereby extending ground through front contact 1 of the locked one of these relays to the corresponding one of link-select-magnet leads LSM1 to LSM10, thereby closing a circuit for the primary select magnet SM (Fig. 4) associated with the matched line link, in series with the associated secondary select magnet SM (Fig. 4). These two select magnets operate in series to select the matched line link 202 mechanically at the primary end and at the secondary end.

VE16. *Primary and secondary hold-magnet operation*

Series-connected off-normal contacts 801 and 907 (see Fig. 4) associated with the operated primary and secondary select magnets extend battery potential (obtained from control resistor CR, Fig. 9, Part 5, and secondary-control wire SC) through contacts of line-controller switch 1100 to the primary-secondary off-normal conductor PS—ON between the line-controller switches and the line controller (Fig. 9, Part 2). Battery on wire PS—ON completes a circuit for operate relay 12B17, to ground through the make contact of the operated line-test relay 12B16. Operate relay 12B17 thereupon locks itself to ground at its make contacts, and closes independent circuits for operating the primary hold magnet associated with the calling line and for operating the secondary hold magnet associated with the matched originating trunk.

The primary hold magnet is operated by the closure of contacts 4 of relay 12B17 to ground the sleeve wire S of the calling line by shunting the line-test relay 12B16 previously held operated thereover as described. The tip, ring, and sleeve conductors T, R, and S of the calling line (such as 200, Fig. 4) are thereby extended respectively to the primary end of the corresponding conductors of the matched line link 202.

The secondary hold magnet associated with the matched originating trunk is operated by the closure of contacts 5 of relay 12B17 to ground the associated make contact 2 of each trunk-test relay 12D13 to 12D22, thereby extending ground, through the front contact 2 of the operated and locked trunk-test relay, through the associated front contact of the operated one of the trunk call-in relays 12C26 to 12C29, to the match-test conductor MT (see Fig. 9) of the matched originating trunk. The operate winding of the associated hold magnet (such as HM3R) is thereby energized in a circuit over the sleeve wire S of the associated originating trunk to battery in the associated block coupler 500, as previously traced. By the operation of this hold magnet, the tip, ring, and sleeve conductors T, R, and S of the matched originating trunk 203 are thereby connected respectively to the corresponding conductors of the line link 202, and therethrough with the corresponding conductors of the calling line.

The foregoing extension of the calling line, over the matched line link to the matched originating trunk, constitutes seizure of the block coupler 500 serving the originating trunk. This block coupler responds to seizure by placing holding ground on its incoming sleeve (as hereinbefore described) in substitution for the idle-indicating battery potential formerly appearing thereon, thereby providing a holding circuit for the primary and secondary hold magnets effective to hold them after the line-controller apparatus has cleared out.

VE17. *Clearing out*

Line-test relay 12B16 restores responsive to being short-circuited by the noted grounding of the sleeve wire of the calling line incidental to the operation of the associated primary hold magnet. The appreciable interval of time required for relay 12B16 to restore responsive to being short-circuited is sufficient to permit the seized block coupler to return holding ground over the sleeve wire of the established connection before the line controller clears out.

With operate relay 12B17 operated and locked, the restoration of relay 12B16 operates clearout relay 12B18, which at its contacts 3 locks to ground on common-off-normal wire CON, and at its contacts 2 and 1, removes locking ground and preference-chain battery from relays 12A2 to 12A11 of the originating primary chain, restoring the operated one thereof.

Cutoff relay 12A1 and originating-start relay 12B10 restore responsive to the opening of contacts 3 of the primary chain relay. Originating-start relay 12B10 at its contacts 3 and 5 removes locking ground and preference-chain battery from the upper windings of relay 12A25 to 12A29 of the fives chain, restoring the operated one thereof, followed consequently by the restoration of cutoff relay 12A23 and its auxiliary relay 12A24; at its contacts 4 and 2, it removes preference-chain battery and locking ground from the upper windings of units-chain relays 12B2 to 12B6, restoring the operated one thereof, followed by the restoration of their auxiliary relay 12B1; at its contact 6, it removes starting ground from the cycle timer (relays 12B11 to 12B15), causing immediate restoration of all operated relays thereof; and at its contact 11 it removes locking-chain ground from the trunk-test relays 12D13 to 12D22, thereby restoring the operated one thereof, followed by the consequent restoration of match-pilot relay 12D11 and its auxiliary relay 12D12.

The restoration of the operated trunk-test relay 12D13 to 12D22 ungrounds the previously grounded link-select-magnet wire LSM1 to LSM16, permitting the operated primary and secondary select magnets to restore, and the restoration of the operated fives-chain relay 12A25 to 12A29 releases the corresponding pair of hold magnets in the line-controller switches. Responsive to either operation, signal battery is removed from conductor PS—ON, releasing operate relay 12B17 to open the initial circuit of clearout relay 12B18, leaving that relay locked to common-off-normal conductor CON if it is still grounded.

Upon the noted release of the locked primary-chain relay 12A2 to 12A11, ground is removed from the associated select-magnet wire SM, permitting both line-controller switches (1000 and 1100) to clear out. The restoration of the select magnets SM in such switches opens contacts 1007 and 1107 (shown in Fig. 4) which ungrounds wire CON to open the locking circuit of clearout relay 12B18. The restoration of relay 12B18 completes the clearing out of the line controller, except for a partial operation of the call-in pulser to cause an interim advance of the call-in allotter.

Clearout relay 12B18, at its contacts 1 and 2, replaces locking ground and preference-chain battery on the relays of the originating primary chain, thereby rendering the line controller again receptive to an originating call. Its contacts 5 reground armature spring 2 of terminating-start relay 12B8, thereby rendering the line controller again receptive to a terminating call.

VE18. *Progress advance of call-in allotter*

As a further result of its described restoration, originating-start relay 12B10, at its contacts 1, removes the ground connection originally applied to match-start wire 1222, but that wire remains grounded temporarily by the call-in pulser, wherein relays 12C14 and 12C15 are operated (as will be later described), and relay 12C16 is unoperated because its operating wire 1223 was disconnected by relay 12D12.

Upon its described restoration following the restoration of relay 12B10, relay 12D12 reconnects wire 1223 to the grounded match-start wire 1222, whereupon relay 12C16 operates preparatory to advancing the call-in allotter another step. Relays 12C14 to 12C16 are thereby restored successively. The operation is terminated at that point, for the driving ground is removed from the match-start wire by contacts 1 of relay 12C14. Upon restoring, relay 12C16, at its back contact, causes the next succeeding relay (such as 12C19) of the call-in allotter to operate (as will be hereinafter described), thereby preparing for calling in the next succeeding call-in group of originating trunks when the line controller is again taken for use for originating-cell operation.

VE19. *Operation of call-in allotter*

The call-in allotter, comprising control relay 12C17 and allotting relay 12C18 to 12C21, is shown in the first of its four allotting positions, the position which it assumes automatically when current is first applied to the line controller. At this time, the odd branch 1233 of its control conductor 1231 is grounded, through break contact 2 of relay 12C16 and break contact 1 of relay 12C17, operating the first allotting relay 12C18 through the chain contacts 3, 4, and 2 of relays 12C19 to 12C21, to battery through resistor 1224.

At its contacts 1, relay 12C18 locks itself operated by connecting the grounded lower winding of control relay 12C17 to the odd branch 1233 of the grounded control wire 1231, but relay 12C17 does not operate for the time being, as it is short-circuited by the ground on the control wire 1231 through break contact 2 of relay 12C16.

At its contacts 2, relay 12C18 prepares a circuit for later operating the second allotting relay 12C19 over the even branch 1232 of the control wire 1231; and at its contacts 3 and 4 it connects the first relay 12C26 of the trunk-call-in group, and the first relay 12C22 of the call-in totalizer to the match-start wire 1222. The call-in allotter is thus in position 1.

When the match-start wire 1222 is next grounded, the connected relays 12C22 and 12C26 operate as described, relay 12C22 locking directly to conductor 1222.

Relay 12C14 of the call-in pulser now operates through contacts 1 of relay 12C16 and, at its contacts 1, grounds match-start wire 1222 at a new point to insure the eventual completion of the started cycle of operations of the call-in pulser, after matching has occurred, to bring about the described interim advance of the call-in allotter.

Relay 12C14, at its contacts 2, operates relay 12C15, and relay 12C15 operates relay 12C16 over branch wire 1223, and through break contact 1 of match-pilot relay 12D12, to ground on wire 1222. Relays 12C14 to 12C16 are so adjusted that the time required for them to operate in succession is somewhat in excess of the time required for matching to occur and for match-pilot relay 12D12 to operate, if matching can occur on the first call-in.

When relay 12C16 next operates (during, or following, the current matching attempt), it disconnects relay 12C14 to restore relays 12C14 to 12C16, in succession, and it removes ground from control wire 1231 and from its connected branch 1233, thereby removing the short circuit from around the lower winding of relay 12C17. Control relay 12C17 now energizes in series with relay 12C18, which remains locked operated at its contact 1. The wires 1231 and 1222 incoming to the allotter are thereby transferred respectively from their odd branches 1233, 1235, and 1237 to their even branches 1232, 1234, and 1236. The call-in allotter is thus in position 1.5.

When relay 12C16 is next restored to reapply ground to control conductor 1231, ground is thereby applied to the even branch 1232 of the control conductor, energizing the holding winding (the upper winding) of control relay 12C17, and closing an operate circuit for the second allotting relay 12C19, through make contact 2 of relay 12C18 to battery through contacts 4 and 2 of relays 12C20 and 12C21. Relay 12C19 responsively operates and, at its contacts 2, locks itself directly to ground; at its contacts 1, it prepares a circuit over the odd branch 1233 for relay 12C20; at its contacts 5 and 4, it connects the second call-in-totalizer relay 12C23 and the second trunk call-in relay 12C27 to the match-start wire 1222, through make contacts 3 and 2 of control relay 12C17; and at its contacts 3, relay 12C19 removes chain battery from relay 12C18, thereby restoring it. Control relay 12C17 remains operated by its upper winding so long as the control wire 1231 remains grounded. The call-in allotter is now in position 2.

The next succeeding operation of call-in pulser relay 12C16 ungrounds conductor 1231 to restore control relay 12C17, leaving only relay 12C19 operated in the allotter. The allotter is thus in position 2.5.

Upon the next succeeding restoration of relay 12C16, the third allotting relay 12C20 operates over the odd branch of the control conductor, through contacts of the operated relay 12C19. Upon so doing, it locks itself to the odd branch of the control wire and to ground through the lower winding of the control relay 12C17; connects the fourth allotting relay 12C21 to the even branch of the control wire; connects up the third relay in the call-in totalizer and in the trunk-call-in group; and it opens its chain contacts 4 to restore the second counting relay 12C19. The call-in allotter is now in position 3.

When relay 12C16 is next operated to unground the control wire 1231, the lower winding of relay 12C17 is again unshorted and energized, this time in series with relay 12C20. Relay 12C20 remains operated, and relay 12C17 reoperates. The allotter is now in position 3.5.

When relay 12C16 again restores to ground the control conductor, the final allotter relay 12C21 is operated over the even branch of the control conductor, in parallel with the upper winding of relay 12C17, and through contacts 3 of the operated relay 12C20. Relay 12C21 locks itself to the even branch of the control conductor, and opens its chain contacts 2 to disconnect and restore relay 12C20. The call-in allotter is thus in position 4.

When relay 12C16 of the call-in pulser again operates to remove ground from the control conductor, relays 12C17 and 12C21 both restore. All relays of the call-in allotter are consequently now in restored condition. The allotter is thus in position 4.5.

When relay 12C16 again restores to ground the control wire, the first allotter relay 12C18 is reoperated to place the call-in allotter again in its illustrated position 1, at the start of a new cycle of operations.

In summary, it may be noted that, when relay 12C16 operates to end a control pulse to the call-in allotter, the allotter advances to a half-step position, in that control relay 12C17 restores if operated and operates if restored. This action prepares for the next step of the allotter, and effectively disconnects the currently connected pair of relays in the call-in totalizer group and trunk call-in group in preparation for connection of the next succeeding pair without overlap.

The overall result of the operation of the call-in allotter as controlled by the call-in pulser is: (1) it calls in the call-in groups of originating trunks successively until a match has occurred, or until all four have been called in with no match having occurred and (2) considering the four groups arranged in a continuous chain, or circle, the first trunk group called in on an operation of the line controller is the one next following the group last called in on the preceding operation of the line controller. The effect is to offer an equal number of calls to the four call-in groups of originating trunks 203. As a result, each call-in group should contain substantially the same number of equipped originating trunks as any of the others, keeping in mind that the full number (40) of originating trunks 203 will seldom be equipped (jumpered to respective block couplers) for that number will seldom be required. The unequipped originating trunks are preferably non-corresponding trunks in the several call-in groups to the end that the line links of any group of ten serving a line-link primary switch 800 are equally loaded. That is to say that the total number of equipped originating trunks should be apportioned approximately evenly among the ten secondary sections on the line-link frame.

VE20. *Operation of the choice allotter*

The choice allotter (Fig. 9, Part 3), comprising the thirteen relays 12C1 to 12C13, is a specialized counting chain arranged to assume allotting positions 1 to 10 successively in a cycle. Its purpose is to shift first choice successively among the ten associated primary switches 800, among the ten secondary sections (sections of five switches 900), and among the five fives groups of lines served by any primary switch 800.

The allotting relays are 12C4 to 12C13. They are controlled by relays 12C1 and 12C2 over odd and even control wires. Relay 12C3 is employed to disconnect relay 12C4 when relay 12C5 operates, and to hold it disconnected until a new cycle of operations is about to begin, thereby avoiding the necessity for a back-contact chain such as that of relays 12C19 to 12C21 of the call-in allotter.

The choice allotter is illustrated in position 1. In that position, the first allotting relay 12C4 stands operated through closed contacts of relays 12C2 and 12C3, and all other relays of the allotter are restored.

VE20a. *Residual-stick control relays*

Control relays 12C1 and 12C2 are referred to as residual-stick relays. Such a relay, upon being open-circuited after operation, retains sufficient residual magnetism to hold its armature operated against its spring load until the residual magnetism is neutralized. Each such relay has tandem windings, differentially connected.

Control relays 12C1 and 12C2 are controlled primarily by relay 12B15 of the cycle timer, which is operated at the initiation of each originating operation and is restored when the line controller is cleared out. The arrangement is such that the advance of the choice allotter (from one position to the next) occurs incidental to the clearing-out operation of the line controller, between successive originating uses thereof.

With cycle-timer relay 12B15 restored, and with both of the control relays 12C1 and 12C2 in their illustrated restored condition, both windings of relay 12C1 stand open, but both windings of relay 12C2 stand closed. The lower (heel-end) winding of relay 12C2 is energized through break contacts (2 and 4) of relays 12B23 and 12B15, and its upper (armature-end) winding is energized in parallel therewith through the break contacts of relay 12C1. With the two windings energized in opposition, as indicated, relay 12C2 remains unoperated. Control relays 12C1 and 12C2 are now in position 1, both restored.

When relay 12B15 next operates, upon a seizure of the line controller for originating operation, its contacts 4 disconnect ground from both windings of relay 12C2 (leaving it unoperated) and transfer ground to the circuit of relay 12C1. With relay 12C2 unoperated, only the lower winding of relay 12C1 is energized, the upper winding thereof being disconnected. Relay 12C1 is now operated by its lower winding, energized alone. Upon operating, it disconnects the upper winding of relay 12C2 from in parallel with the lower winding thereof. Relays 12C1 and 12C2 are now in position 1.5, relay 12C1 being operated alone.

When the line controller next clears out, contacts 4 of relay 12B15 transfer ground back from the circuit of relay 12C1 to the circuit of relay 12C2. Relay 12C1 remains operated by residual magnetism, and relay 12C2 is operated by its lower winding, energized alone. The control relays 12C1 and 12C2 are now in position 2, both relays operated.

When relay 12B15 operates the next time, on the line controller being again taken into originating use, it again removes ground from the circuit of relay 12C2 (leaving that relay held operated by residual magnetism), and again applies ground to the circuit of relay 12C1, energizing both its windings. The upper (armature-end) winding acts to reverse the flow of flux through the armature end of the core (not shown) and through the armature (not shown) causing the relay to release when the flux therethrough approaches zero value. Having released, the relay does not reoperate so long as the two differentially connected windings are both energized. Relays 12C1 and 12C2 are now in position 2.5, relay 12C2 being operated alone.

When relay 12B15 next restores, incident to the clearing out operation of the line controller, the upper (armature-end) winding of relay 12C2 is energized in parallel with the lower winding thereof (through the contacts of the restored relay 12C1) causing relay 12C2 to restore and remain restored for reasons given in connection with relay 12C1. Relays 12C1 and 12C2 are now again in position 1 (being both restored), at the beginning point of a new cycle.

In summary, considering relays 12C1 and 12C2 in position 1 (both restored), (1) relay 12C1 first operates to bring them into position 1.5; (2) relay 12C2 later operates to bring them into position 2 (both operated); (3) relay 12C1 restores to bring them into position 2.5 (relay 12C2 operated alone); and (4) relay 12C2 restores to bring them back into position 1 (both restored).

VE20b. *Allotting-relay action*

With the allotter in its illustrated first position, all relays thereof are restored except the first allotting relay 12C4. Relay 12C4 is operated from ground, closed contacts 3 of relay 12C2, odd control conductor 1241, the closed contacts of relay 12C3, and through the upper winding of relay 12C4 to battery. The input wires of the allotter (control ground at contacts 3 of relay 12C2, and wires 1243 to 1246) are thus connected to their respective odd branches through break contacts 3, 1, 2, 5, and 6 of control relay 12C2, and the odd branches of wires 1243, 1244, and 1246 are connected to their respective output wires 1 through make contacts 1, 2, and 4 of relay 12C4.

The choice allotter remains in its illustrated position 1 until the second control relay 12C2 operates to bring relay 12C1 and 12C2 into position 2 (both operated) at the end of the next ensuing originating-call operation. Relay 12C2, on operating, switches the input wires 1243 to 1246 from their odd branches to their even branches, thus advancing the allotter to position 1.5.

Through its make-before-break contacts 3, relay 12C2 transfers control ground from the odd control conductor 1241 to the even control conductor 1242, thereby opening the initial circuit of relay 12C4 and energizing three windings in series through make contacts 3 of relay 12C4. They are the upper winding of relay 12C5, the lower winding of 12C4, and the winding of cutoff relay 12C3. The holding winding of relay 12C4 is employed to hold that relay operated after ground is removed from the odd wire 1241, whereby the operate circuit of relay 12C5 (through contacts 3 of relay 12C4) is maintained intact. Relay 12C3 is operated to disconnect the upper winding of relay 12C4 from the odd wire 1241, and is arranged to be held operated through the holding windings of succeeding allotting relays until the point is reached in the operation of the choice allotter at which it should be restored to reconnect the No. 1 allotting relay 12C4.

The second allotting relay 12C5 is operated by the energization of its upper winding. It prepares a circuit at its contacts 3 for operating relay 12C6; at its contacts 1 and 4, it connects the associated No. 2 output wires to the currently effective even branches of input wires 1243, and 1246; and at its contacts 2 it connects wire 1 of group 1252 to the even branch of conductor 1244. The allotter is now in position 2 (relays 12C1 to 12C5 operated).

The next ensuing originating use of the line controller restores relays 12C1 and 12C2 as described. Relay 12C2 disconnects the even branches of the input wires and substitutes the odd branches. The allotter is thus advanced to position 2.5 (relays 12C3 to 12C5 operated).

The transfer of control ground from the even control conductor 1242 back to the odd conductor 1241 opens the noted operate circuit (upper winding) of the second allotting relay 12C5 and closes the operate circuit (upper winding) of the third allotting relay 12C6, in series with the lower winding of relay 12C5 and the winding of 12C3. Relay 12C6 accordingly operates and relays 12C5 and 12C3 remain operated in series therewith. The noted opening of the operate circuit of relay 12C5 deprives relay 12C4 of holding current (through its lower winding) causing it to restore. The allotter is now in position 3 (relays 12C3, 12C5, and 12C6 operated).

From this point, the choice-allotter action procedes in a progressive wave-like motion wherein the last preceding allotting relay is held operated in the operating circuit of the newly operated one, but the second preceding allotting relay is open-circuited and restored. Accordingly, except for a momentary half-step (transition) interval, only two allotting relays (12C4 to 12C13) are in operated condition at any one time, but only the last-operated one closes effective allotting circuits because of the action of control relay 12C2 in shifting the allotter input wires 1243 to 1246 back and forth between their odd and even branches.

When the allotter reaches its ninth position, the ninth allotting relay 12C12 stands operated from ground on odd control conductor 1241, contacts 3 of the operated eighth allotting relay 12C11, lower winding of relay 12C11, and relay 12C3, to battery. Relays 12C3, 12C11 and 12C12 are held operated over this circuit, and all other relays of the allotter are in restored condition.

When control relay 12C2 is next operated, the tenth (and final) allotting relay 12C13 is operated through contacts 3 of relay 12C12, in series with the holding winding of relay 12C12, but this circuit does not include cutoff relay 12C3. As a result, 12C3 restores along with relay 12C11, leaving relays 12C12 and 12C13 operated.

When control relay 12C2 next restores, the consequent removal of ground from the even control conductors 1242 restores relay 12C12 and 12C13, and the reconnection of ground to the odd-control conductor 1241 reoperates relay 12C4, through the contacts of the restored cutoff relay 12C3 to bring the choice allotter again into its illustrated first position to start a new cycle of operations.

VE20c. *Effect of choice-allotter action*

From the foregoing, it is clear that battery on wire 1241 is applied successively to the ten choice wires 1 to 10 of group 1251 leading to the originating primary chain of relays 12A2 to 12A11, thereby shifting first choice progressively from the first to the tenth of the line-link primary switches which these relays respectively represent.

Since each of the five wires 1 to 5 in group 1252 (extending from the choice allotter to the chain of reference contacts associated with the upper windings of fives-chain relays 12A25 to 12A29) are connected to the contacts 2 of two adjacent allotting relays (12C4 and 12C5, 12C6 and 12C7, etc., to 12C12 and 12C13) in the choice allotter, the first choice to locking battery on wire 1244 is shifted successively through the fives groups which these relays respectively represent. These five shifts occur on the respective odd-numbered steps of the allotter.

Locking ground potential (represented by wire 1246) is applied successively to the ten choice wires 1 to 10 in group 1254, leading to the trunk-test relays 12D13 to 12D22, thereby shifting first choice progressively from the first to the tenth of the line-link secondary sections, which are represented respectively by the trunk-test relays.

The shifting of the preference among the primary switches insures that a call from any given primary switch will eventually be afforded access to the line controller, irrespective of circuit conditions and matching conditions relating to the other primary switches; the shifting of the preference among the five groups of lines on a primary switch similarly acts to insure the eventual access to the line controller of a line in any fives group, irrespective of conditions surrounding the lines in the other fives group served by the same primary switch; and the shifting of the preference among the ten secondary sections on the line-link frame acts to spread the originating calls evenly among them.

Giving first choice to the secondary sections in regular order, combined with the previously described operation of the call-in allotter, serves to randomize the originating trunks 203 almost completely (provided care is taken as previously indicated with respect to which are equipped and which are unequipped in any call-in group) to the end that (1) the block couplers 500 have uniform traffic loads and (2) any tendency toward unbalanced load distribution which might result in unnecessary originating-action match failures is greatly minimized.

VE21. *Cycle-timer operation*

The cycle timer (relays 12B11 to 12B15) is provided primarily to clear out the line controller and return it to normal condition when the clearing-out operation does not occur normally. As noted hereinbefore, the cycle timer must defer its initiation of the clearing-out operation for an interval long enough to permit the line controller to function normally when four successive trunk-call-in operations are required. The waiting time afforded by the cycle timer is principally the time required for relays 12B11 to 12B14 to restore successively under short-circuited slow-restoring conditions.

When originating-start relay 12B10 operates, its contacts 6 apply starting ground to the cycle timer as noted hereinbefore, operating relays 12B11 to 12B15 in succession. Relay 12B11 is operated through closed contacts 2 of relay 12B15, and each of the relays 12B11 to 12B14, at its contacts 2, closes an operate circuit for the next succeeding relay. Relay 12B15, at its make-before-break contacts 2, locks itself and the preceding relays to the incoming grounded operate wire (in preparation for the restoration of relays 12B11 to 12B14 in succession) at the same time opening the initial operating path to prevent interference with the intended prompt restoration of all the relays whenever relay 12B10 restores.

Relay 12B15, at its contacts 1, grounds the restoring wire for relays 12B11 to 12B14, thereby directly short-circuiting the winding of relay 12B11. The additional time required for relays 12B12 to 12B15 to operate after 12B11 operates insures that the current through the winding of relay 12B11 has reach substantially its full value by the time the restoring short-circuit is applied.

Relays 12B11 to 12B14 now restore in succession, each of the relays 12B11 to 12B13, on restoring, extending ground at its contacts 1 to short-circuit the winding of the next relay.

When the line controller completes its normal operation and clears out before the action of the cycle timer has reached the point at which relay 12B14 restores, the removal of control ground from the cycle timer, at contacts 6 of relay 12B10, causes a quick restoration of relay 12B15 and any still-operated ones of the relays 12B11 to 12B14. If, for example, relays 12B11 to 12B13 have restored as described, and relay 12B14 is still operated when contacts 6 of relay 12B10 open, a local self-locking series circuit exists, for relays 12B14 and 12B15. This circuit is from ground through contacts 1 of relays 12B15 and 12B13, the winding of relay 12B14, contacts 2 of the same relay, and through the winding of relay 12B15 to battery. When this circuit becomes effective (upon the opening of the previously closed contacts 6 of relay 12B10), the current flow through the winding of relay 12B14 reverses, causing a reversal of flux through the magnetic structure (not shown). During this reversal, relay 12B14 restored, opening the noted incidental local locking circuit at its contacts 2. Relay 12B15 responsively restores. The action is similar when any preceding relay of the cycle timer is still operated when relay 12B10 restores. Since the noted current reversal results in a prompt and satisfactory clearing out of the cycle timer, the circuit has been left in its illustrated simple form rather than providing sufficient contact pairs on relay 12B10 or on relay 12B15 to isolate the several circuits.

When the line controller has not cleared out by the time relay 12B14 of the cycle timer restores responsive to being short-circuited upon the restoration of relay 12B13, clearout relay 12B18 is operated through break contact 3 of relay 12B14 and make contact 3 of relay 12B15 to initiate the clearing-out operation.

VE22. *Time-out group*

The time-out group (relays 12B19 to 12B24) is provided to halt the originating action of the line controller for a short period (say, from 9 to 18 seconds) when at least ten successive attempts to extend a calling line have all been unsuccessful. The minimum number of unsuccessful operations has been set at ten to give each of the line-link primary switches first-choice access to the originating primary chain.

The purpose of the time-out feature is to minimize useless relay operations in the line controller and useless operations of the line-controller switches 1000 and 1100.

Two conditions other than circuit failure within the line controller or in the line-controller switches can cause the line controller to execute a series of unsuccessful originating operations.

First, the traffic load on the line links and on the originating trunks may be sufficiently heavy that, for a period of time, no match is possible to an idle originating trunk from any primary switch.

Second, if the sleeve circuit of a calling line (between its sleeve wire S and battery) is open, the hold magnet thereof cannot be operated to extend that line. This condition is detected in the line controller by the failure of line-test relay 12B16 to operate.

When an originating operation of the line controller is successful, operate relay 12B17 operates as described (to effect operation of the concerned primary and secondary hold magnets) prior to the operation of clearout relay 12B18, but when the originating operation is not successful, relay 12B17 does not operate. Clearout relay 12B18 is then operated, either through the chain contacts 2 of the call-in totalizer (relays 12C22 to 12C25, or contacts 3 of relays 12B14 and 12B15 of the cycle timer. It is only when clearout relay 12B18 operates with operate relay 12B17 still unoperated that ground is placed effectively on input wire 1245 of the choice alotter, which is the wire thereof associated with the time-out group. Such ground is through break contact 2 of operate relay 12B17, make contacts 7 and 4 of relays 12B10 and 12B18, to wire 1245. Subject to the choice allotter being in position 10, the ground on input wire 1245 is extended through make contacts 5 of relays 12C2 and 12C13 to wire 10 of the time-out group 1253, operating pickup relay 12B19. Relay 12B19 locks itself to ground through break contacts 2 of relays 12B17 and 12B19, and the break contacts of stop relay 12B21.

If a successful originating operation occurs on any one of the next nine tries by the line controller, pickup relay 12B19 is unlocked and restored by operate relay 12B17. But, if each of the next nine originating operations of the line controller are unsuccessful, pickup relay 12B19 remains locked operated to cause the line controller to time out after the choice allotter has advanced from position 10, and through positions 1 to 8, to reach position 9. In this event, ground on input wire 1245 of the choice allotter is extended through break contact 5 of relay 12C2, make contact 5 of relay 12C12. Conductor 9 in group 1253, and make contact 1 of pickup relay 12B19, to start relay 12B20. Start relay 12B20 operates and locks operated (at its contacts 5) through contacts 1 of pickup relay 12B19; at contacts 4, prepares a circuit for stop relay 12B21; at contacts 3, places ground directly on the associated input wire 1245 of the choice allotter; at contacts 6, disconnects originating-start relay 12B10 to disable originating operation of the line controller during the time-out period; and at contacts 2, places starting ground on the time-out pulser (relays 12B22 to 12B24). The line controller is now at the beginning of its time-out period wherein it is unresponsive to calls originated on its associated line-link frame, as originating-start relay 12B10 is disconnected at contacts 6 of start relay 12B20.

Responsive to the closure of contacts 2 of start relay 12B20, relays 12B22 to 12B24, comprising the time-out pulser, operate in succession and to restore in succession to generate driving pulses for the choice allotter during the time-out period of the line controller. These relays are slow-restoring sleeved relays, adjusted to transmit driving impulses to the choice allotter at a relatively low frequency, such as one impulse every second or two. The arrangement is such that nine steps of the choice allotter are required to return the line controller to active condition with respect to originating calls, giving a delay ranging from, say nine to eighteen seconds, depending upon the adjustment of the relays of the time-out pulser.

On each operation and restoration of the relays of the time-out pulser, relay 12B23, at its contacts 2, transmits a driving impulse to control relays 12C1 and 12C2 of the choice allotter as previously described for contacts 4 of the cycle-timer relay 12B15, causing the choice allotter to advance one step for each operation of the time-out pulser.

Nothing further occurs within the time-out group of relays until the choice allotter has advanced nine steps following the operation of start relay 12B20, at which time it arrives in position 8. The choice allotter arrives in any new position with pulser relays 12B22 and 12B23 restored and with relay 12B24 still operated.

With start relay 12B20 operated, and with the choice allotter in position 8, operating ground on wire 1245 is extended to stop relay 12B21, through mark contact 5 of relay 12C2 and 12C11, and over conductor 8 in group 1253. Upon operating, stop relay 12B20 opens its contacts to restore pickup relay 12B19, which at its contacts 1, restores start relay 12B20. Relay 12B20 restores and removes start ground from the time-out pulser before the next cycle thereof starts. At its contacts 6, relay 12B20 terminates the time-out period by reconnecting the originating-start relay 12B10.

VE23. *Traffic metering*

The line controller is arranged to operate two meters (not shown) indicative of the disposition of originated calls handled by the line controller. These meters are operated over originated-calls-completed wire OCC and originated-calls-lost wire OCL (Fig. 9, Part 2).

Each time operate relay 12B7 operates (incidental to the closure of the hold-magnet circuits in the normal course of events following matching), it grounds wire OCC as an indication that an originating call has been completed; that is, extended successfully through the line-link frame.

The metering of lost originating calls is not so readily accomplished, as an operation of the line controller which finds all matching paths unavailable does not necessarily mean that a call is lost, for a calling subscriber often has only to wait a short time for a path to become available. It is considered, however, that any condition causing the time-out group to function as described to retire the line controller from originating operation (after at least ten unsuccessful originating-call attempts) causes a delay amounting to a lost call. Accordingly, each time start relay 12B20 operates to begin a time-out period, it grounds originating-calls-lost wire OCL to record a lost originating call. The reading of the originating-calls-lost meter, however, is not intended to show the precise number of lost originating calls. In this regard, note that a calling line with an open sleeve wire S will cause repeated groundings of wire OCL until the condition is remedied.

VF. DETAILED TERMINATING-CALL OPERATION

VF1. *Primary, fives, and units marking*

When the block translator 1800 receives digit information from a calling block coupler 500 identifying a line terminated on the line-link frame served by a specific line controller 1200, it translates that information into a primary digit, a fives digit, and a units digit, and transmits the translated digit information to the concerned line controller by simultaneously grounding one of ten P leads, one of five F leads, and one of five U leads extending between the block translator and the line controller. These three sets of leads are shown at the lower margin of Fig. 9, Part 1. These sets correspond respectively to the primary, fives and units digits of translated information.

The grounding of an F lead or a U lead by the block translator causes no immediate response, for operating battery is withheld from the associated lower windings of the fives-chain and units-chain relays until auxiliary relay 12B9 of the terminating-control group has operated to close its contacts 1 and 2. Interference is thereby avoided with originating control action, if it is in progress.

VF2. *Primary selection*

The grounding of the selected P lead incoming from the block translator causes the immediate operation of the associated one of the ten relays 12A12 to 12A21 in the terminating primary chain to select the corresponding line-link primary switch. Upon operating, any relay 12A12 to 12A21, at its contacts 3, prepares to ground the associated select-magnet wire SM leading to the line-controller switches, and at its contacts 2, it grounds the operate wire for the terminating-start relay 12B8. The circuit of relay 12B8 includes break contact 9 of originating-start relay 12B10, whereby relay 12B8 does not operate for the time being if originating operation is in progress.

VF3. *Seizing the terminating-control group*

Upon operating, terminating-start relay 12B8, at its contacts 3, opens the input ground wire to the selecting contacts of the originating primary chain, and at its contacts 4, it locks operated independent of contacts 9 of relay 12B10, to give terminating operation undisputed preference in the event of a close race between relays 12B8 and 12B10; at contacts 6, it connects hold-pilot wire HP1 to terminating-frame wire TF as a preparatory action, rather than immediately grounding wire TF as in the former application. At its contacts 5, relay 12B8 transfers the associated control wire from the circuit or originating-start relay 12B10 to the circuit of terminating-start-auxiliary relay 12B9; and at its contacts 2, it operates cutoff relay 12A1 through break contacts 5 of clearout relay 12B18.

Cutoff relay 12A1 disconnects the associated leads P1 to P10 incoming from the line-link primary switches 800 to insure that no more than one relay 12A2 to 12A11 is operated in the originating primary chain, thereby avoiding crossed-wire interference with the selection at the terminating primary chain. Relay 12A1 at its contacts 11, extends its operating ground to the associated control wire, operating relay 12B9 through make contacts 5 of relay 12B8.

VF4. *Fives and units selection*

Auxiliary terminating-start relay 12B9, at contacts 4, connects up the called-line-sleeve wire CLS as a preparatory measure; at contacts 2 and 1, it applies operating battery to the lower windings of the fives and units relays (12A25 to 12A29, and 12B2 to 12B6), whereupon the selected relay in each chain operates, followed by relays 12A23, 12A24, and 12B1, as hereinbefore described; at contacts 3 it grounds the multiplied make contacts 3 in the terminating primary chain (relays 12A12 to 12A21) which are associated with the select-magnet wires SM1 to SM10 of the line-controller switches 1000 and 1100, thereby grounding the select-magnet wire SM corresponding to the selected primary switch.

VF5. *Primary selection at the line-controller switches*

The two line-controller switches 1000 and 1100 now operate as described to set themselves according to the selected primary switch 800. As hereinbefore described, operation of hold magnets HM1 to HM4 of switches 1000 and 1100 grounds the hold-pilot wires HP1. With contacts 6 of relay 12B8 closed, as previously noted, ground is thereby placed on terminating-frame wire TF of the line controller, thereby identifying the called line-link frame and starting matching in the block controller, as hereinafter described.

VF6. *Link test*

Incidental to their primary-switch selecting operation, line-controller switch 1000 connects the link-test relays 12D1 to 12D10 (over wires LT1 to LT10) respectively to the sleeve wire S of the line links 202 extending from the selected primary switch, causing any such relay to operate subject to its corresponding line link being idle, as described for originating action. On operating, any link-test relay 12D1 to 12D10, at contacts 1, connects battery (on wires LSM1 to LSM10) to the associated one of link wires LK1 to LK10, through the corresponding series-connected primary and secondary select magnets. Battery so placed on any wire LK informs the block controller 1600 that the corresponding connected line link is idle. Moreover, the closure of the noted contact 1 of any link-test relay prefaces a circuit for operating the corresponding primary and secondary select magnets on the line-link frame if a path is matched over the corresponding line link.

VF7. *Fives selection at the line-controller switches*

As a part of their primary selection, the line-controller switches jointly ground common-off-normal wire CON (Fig. 9, Part 1) as described. At this time, ground on wire CON locks relay 12B8 thereover through its contacts 1, and completes a circuit through contacts 1 of auxiliary relay 12A24 and make contact 1 of the operated fives relay (12B25 to 12B29), over the associated wire HM5 to HM9, for operating the hold magnet HM5 to HM9 in the two line-controller switches which corresponds to the selected fives group of lines on the selected primary switch 800. As previously described, the sleeve wires S of the fives lines in the selected fives group are thereby connected respectively to the five sleeve-units wires SU incoming to the line controller.

VF8. *Sleeve of called line extended back*

With units selection having been made in the line controller, by the described operation of one of the units relays 12B2 to 12B6, the wire SU which represents the sleeve of the called line is now extended through contacts 1 of the operated units relay (12B2 to 12B6), a contact 2 to 6 of the operated auxiliary relay 12B1, local sleeve conductor 1221, and contact 4 of relay 12B9, to the called-line-sleeve wire CLS leading to the block controller 1600, enabling the block controller to test the called line thereover, and to later operate the hold magnet of the called line thereover.

VF9. *Line-test start*

The last noted hold-magnet operation in the line-controller switches 1000 and 1100 causes hold-pilot wire HP-2 incoming to the line controller to become grounded as hereinbefore described. The local branch of this wire stands open in the line controller at contacts 1 of originating-start relay 12B10, but a multiple of this wire is extended to the block controller as the test-start wire TS. With wire TF of this line controller grounded as described, the grounding of this wire acts in the block controller to start the testing of the called line.

VF10. *Matching and connection extension*

If an idle path can be matched to the called line (over an idle block link 206, terminating trunk 207, and line link 202), and if the called line tests idle, the block controller 1600 first causes the elements of the matched path to be selected, and then operates the appropriate hold magnets to cause the connection to be extended thereover to the called line.

To cause the matched line link to be selected, the block controller grounds the corresponding link wire LK, operating the concerned primary and secondary select magnets on the line-link frame through make contact 1 of the associated link-test relay (12D1 to 12D10) of the line controller, and over the associated link-select-magnet wire LSM. Operation of these select magnets extends battery to wire PS—ON as hereinbefore described. Off-normal wire ON (Fig. 9, Part 2, lower margin) is multiplied thereto, extending battery to the block controller as a signal that line-link selection has occurred.

The primary and secondary hold magnets on the block-link frame and the secondary hold magnet on the line-link frame are operated as described. The hold magnet individual to the called line is operated (to connect the called line to the primary end of the matched line link) by ground placed on wire CLS by the block controller, such wire having been connected to the sleeve of the called line as described.

VF11. *Clearing out*

When their operation has been completed, the block controller 1600 and block translator 1900 clear out. The clearing out of the block translator open-circuits and restores the operated digit relay in the terminating primary chain, in the fives chain, and in the units chain of the line controller. This permits the associated relays 12A23, 12A24, and 12B1 of the five and units chains to restore. The restoration of the digit relay (12A12 to 12A21) in the terminating primary chain opens the previously grounded SM wire to clear out the line-controller switches, and it opens the upper winding of terminating-start relay 12B8, leaving that relay locked to wire CON.

When the line-controller switches clear out, they restore any operated ones of link-test relays 12D1 to 12D10, and they unground common-offtroller in operating the secondary hold magnet on the block-link frame.

3. On terminating calls, the secondary hold magnet (switch 900) on the called line-link frame is operated by the block controller in multiple with the secondary hold magnet (switch 1400) on the block-link frame. The primary hold magnet (switch 800) on the called line-link frame is operated by the block controller over the noted temporary test connection to the sleeve of the called line.

VIA4. Call preference

On a terminating call, all digits have been dialed before block controller 1600 and associated common apparatus are called in. Therefore, a terminating call can still be completed even though its normal completion time (of a second or less) is extended somewhat when a chance coincidence requires it. With calls outgoing to another dial exchange, however, the normal outgoing-call completion time (of about one-tenth of a second) must not be materially exceeded, for (1) the calling subscriber will ordinarily continue to dial without pause, and (2) the impulses of the next digit, and of all succeeding digits of the called number, must be repeated over the outgoing trunk as they are dialed. Therefore, any such outgoing call is given preference over terminating calls, to the end that it will be extended to an idle trunk in the outgoing group during the usual inter-digit interval. For this reason, the common apparatus is arranged to interrupt operations and progress relating to a terminating call immediately upon being seized by an outgoing call, unless the operations relating to the terminating call are just being concluded.

For the sake of uniformity and circuit simplification, all outgoing calls (whether to a dial exchange or to a manual exchange) are treated as calls outgoing to a dial exchange, and are therefore given preference over terminating calls as noted.

VIB. FUNCTIONAL RELAY GROUPS

The relays 16A1 to 16E30 of block controller 1600 (Fig. 10) comprise functional groups 1 to 13 as follows:

1. 16A1 to 16A5, Line-test group_____ Ter.
2. 16A6 to 16A14, Terminating-control group _____ Ter.
3. 16A15, 16A17, to 16A20, Outgoing-control group_____ Otg.
4. 16D1 to 16D3, 16E1 to 16E10, Choice allotter _____ Ter., Otg.
5. 16B1, 16C1, 16C2, Call-in pulser_____ Ter.
6. 16B2 to 16B6, Call-in allotter_____ Ter.
7. 16B7 to 16B10, Call-in totalizer_____ Ter.
8. 16B11 to 16B30, Terminating-trunk call-in group_____ Ter.
   a. 16B11 to 16B15, Line-link frame A.
   b. 16B16 to 16B20, Line-link frame B.
   c. 16B21 to 16B25, Line-link frame C.
   d. 16B26 to 16B30, Line-link frame D.
9. Odd-numbered relays 16C11 to 16C29, Terminating-trunk test group_____ Ter.
10. 16C3 to 16C10, Line-link call-in group__ Ter.
    a. 16C3 to 16C6, Frames A to D.
    b. 16C7 to 16C10, Call-ins 1 to 4.
11. 16D9, 16E7, 16D10, Match-pilot group _____ Ter., Otg.
12. 16D11 to 16D30, Block-link test____ Ter., Otg.
13. 16E11 to 16E30, Matching relays__ Ter., Otg.

NOTE: (Ter.) signifies use in terminating calls; (Otg.) signifies use in outgoing calls.

VIC. OUTGOING-CALL OPERATION

Outgoing-call operation of the block controller is its operation (in cooperation with outgoing controller 1700) in guiding an outgoing-call connection across the block-link frame to an idle trunk 2020 in a called outgoing group, as distinct from its terminating-call operation, wherein the call terminates at a local called line.

VIC1. Outgoing-call seizure of common apparatus

When the initial digit dialed and registered in any block coupler 500 has a value assigned to an outgoing trunk group, outgoing-start relay 16A17 in the block controller operates in series with (1) a digit relay (not shown) in the outgoing controller 1700, (2) the outgoing-chain relay (not shown) in the concerned block coupler 500, and (3) a section-preference relay (not shown) associated with block controller switch 1500. As a consequence, (1) the operation of the noted digit relay, the outgoing controller 1700 is conditioned to test the trunks in the called outgoing group and to indicate idle ones thereof to the block controller; (2) by the noted operation of the outgoing-chain relay, the concerned block coupler 500 is connected to the block controller over wires specific to outgoing operation; and (3) by the operation of the noted section-preference relay, the block-controller switch 1500 is set on the block-link primary switch 1300 serving the concerned section of block couplers, all as described in the former application.

VIC2. Starting the block controller for outgoing operation

In the block controller 1600 the noted operation of outgoing-start relay 16A17 (over wire OTG—ST, and through contacts 3 of busy relays 16A18 and 16A19) closes a circuit for outgoing-start auxiliary relay 16A15. Relay 16A15 thereupon operates to start the sequence of operations necessary to extend the connection to an idle outgoing trunk in the called group.

Break contact 2 of relay 16A15 disconnects ground from the circuit of terminating-start auxiliary relay 16A7 to prevent that relay from operating later, or to restore it if it is operated.

Make contact 4 of relay 16A15 closes a circuit through break contact 6 of relay 16A7 for operating transfer relay 16A20 over wire 5 of group 1601, in series with match-complete relay 16E7. At its make contacts 1 and 2, transfer relay 16A20 prepares circuits for operating a primary hold magnet and a secondary hold magnet on the block-link frame, and at its make contacts 3, it extends the outgoing-matching-ground wire OTG—MG (incoming from the section-preference relays, not shown herein, but shown at 1550 in the former application), to the choice allotter, relays 16D1 to 16D3 and 16E1 to 16E10.

VIC3. Setting the block-link test relays

On being positioned as previously noted, block-controller switch 1500 conditions the sleeve wires of the twenty block links 206 (ten pairs) serving the connected primary switch, by connecting resistance battery to each. At the same time, it connects those sleeve wires respectively to the windings of block-link test relays 16D11 to 16D30, over the twenty sleeve wires SL-1 to SU-10. Any block-link test relay 16D11 to 16D30 normal conductor CON. This opens the locking circuit of terminating-start relay 12B8, whereupon relays 12B8, 12B9, and 12A1 restore, completing the clearing out of the line controller.

VF12. *Control and supervision of digit wires*

Circuit difficulties within the block translator 1600, or at the terminals of the cable conductors interconnecting the block translator with a line controller 1200 may cause two of the primary wires P, two of the fives wires F, or two of the units wires U extending between them to become shorted together. Unless prevented, this would cause operation of two or more relays in the concerned digit chain of the line controller, and that would mark one or more other lines in addition to the called line. But, operation by the block translator of two or more relays in the same digit chain is prevented by chaining the operating battery for each concerned digit chain in the line controller.

As an alarm-supervisory measure, each digit chain is provided with an alarm relay which operates when a crossed-wire condition attempts to operate two relays in the same digit chain. In the terminating primary chain, for example, any relay 12A12 to 12A21 on operating, opens its chain contact 1 to remove operating battery from any succeeding digit relay of the chain. As a result, when ground appears on the P wires incoming to two or more of these relays, the lowest-numbered relay in the chain operates normally, while any succeeding relay in the chain either fails to operate or restores promptly upon having its operating battery disconnected by the preferred relay in the chain. The relay attempting unsuccessfully to operate now finds high-resistance battery through the lower winding of the alarm relay 12A22 and the associated high-resistance resistor 1204. No relay 12A13 to 12A21 will operate in series with resistor 1204 but alarm relay 12A22 is sensitive enough to operate through it and through any relay 12A13 to 12A21 which is attempting to draw operating battery from the disconnected end of the chain. On operating, relay 12A22, at contacts 1, locks its upper winding to ground through the alarm-release key 1207. The associated primary-alarm lamp 1201 becomes lighted in parallel with the upper winding of relay 12A22. At its contacts 2, relay 12A22 grounds line-controller-alarm wire LC—AL extending to alarm-supervisory equipment (not shown), to signal a trouble condition in the line controller.

It will be observed that the circuit arrangement still permits a call to go through under the discussed abnormal condition. Such a call has an even chance of reaching the desired called line, since the lower-numbered one of two crossed wires P1 to P10 should represent the correct translation about half the time.

The chain and alarm arrangement is similar at the fives chain and at the units chain of relays, whereat alarm relays 12A30 and 12B7 are provided, along with their associated alarm lamps 1202 and 1203, and resistors 1205 and 1206.

VI. BLOCK CONTROLLER (FIG. 10)

Block controller 1600 of Fig. 10 will now be described. It is a common apparatus required for all calls across the block-link frame, comprising both outgoing calls and terminating calls.

As shown in Fig. 10, the block controller 1600 is generally similar to the block controller of the former application, differing primarily in that certain of its circuit paths are altered pursuant to the improved control arrangement for path selection with which this application deals. The primary point of operational difference resides in its cooperation with the concerned line controller to start terminating-call matching as soon as all the necessary information is available, rather than wating for the called line to be tested and to be found idle.

VIA. GENERAL OPERATION

The general operation of block controller 1600 is as follows:

VIA1. *Testing and matching*

1. On all the calls, the block controller 1600 tests the block links 206 extending from the concerned primary switch 1300 on the block-link frame to the secondary switches 1400 thereon, and performs a matching operation accordingly.

2. On outgoing calls, the outgoing controller 1700, through chain circuits interconnecting items 1600 and 1700 (wire group 241, Fig. 2), indicates to the block controller 1600 which trunks 2020 are idle in the called outgoing group, enabling the block controller to match an idle outgoing trunk with an idle block link.

3. On terminating calls the block translator 1800 (Fig. 6) is employed as previously noted, but gives no information directly to the block controller. Instead, the block translator transmits translated primary, fives, and units digit information to the concerned line-link frame A, B, C, or D as to the involved primary switch 800 thereon, the fives group of lines containing the called line, and the units identity of the called line within the fives group. The line-controller apparatus (items 1000 to 1200) on the line-link frame thereupon operates as described to select the indicated primary switch 800, the fives group of lines thereon, and the called line in the group of five; and it closes a temporary test connection from the block controller to the called line.

4. Incident to selecting the primary switch 800, the line-controller apparatus closes circuits to test the line links thereof (pursuant to notifying the block controller of their being busy or idle) at the same time identifying the called line-link frame at the block controller. The block controller thereupon matches an idle block link 206 with an idle terminating trunk 207 and with an idle line link 202. If the called line tests idle, the block controller causes the connection to be extended to the called line over the matched path.

VIA2. *Select-magnet operation*

1. On all calls, the block controller 1600, largely through circuits prepared by the block-controller switch 1500 (Figs. 2 and 6) operates a primary and a secondary select magnet on the block-link frame (switches 1300 and 1400) in accordance with the block-link path selected by the matching operation.

2. On terminating calls, the block controller acts through the line-controller apparatus on the called line-link frame to operate a primary select magnet and a secondary select magnet on the called line-link frame (switches 800 and 900).

VIA3. *Hold-magnet operation*

1. On all calls, block controller 1600 operates the concerned primary hold magnet and secondary hold magnet HM on the block-link frame (switches 1300 and 1400).

2. On outgoing calls the block controller employs a circuit prepared by the outgoing con-accordingly thereupon operates from the noted resistance battery, subject to the associated link being idle. If any one of the concerned twenty block links 206 is in use, ground on the sleeve wire S thereof short-circuits the corresponding block-link test relay.

VIC4. *Outgoing matching*

On an outgoing call, there are two requirements for matching over a possible path: (1) the block link 206 in the path must be idle, and (2) the outgoing trunk 2020 in the path must lie in the called group, and must be idle.

When the block-controller switch 1500 is completely set on the primary switch serving the connected block coupler, it grounds its wire OTG—MG. With transfer relay 16A20 operated as described, matching ground is thereby extended over wire 1617 to the associated contact portion of the choice allotter (Fig. 10, part 3). With the choice allotter in its illustrated position 1 (relay 16E1 operated and all other relays thereof restored), first choice stands on the first secondary switch 1400. Accordingly, the ground on wires OTG—MG and 1617 is extended, through break contact 3 of relay 16D2 and make contact 3 of relay 16E1, and over wire 1 in group 1602, to point 1 in the endless chain of break contacts 3 on the twenty block-link test relays 16D11 to 16D30. This endless chain constitutes the main portion of the outgoing matching chain circuit used for outgoing calls. This chain has ten normally open branches 1 to 10 extending to the outgoing controller 1700. Each branch includes a ground-in wire G—IN and a ground-out wire G—OUT, and has a matching-ground wire MG associated therewith.

The ten noted branches correspond respectively to the ten secondary switches 1400. Since, from any primary switch 1300, two block links 206 extend to each secondary switch 1400, the ten branches 1 to 10 of the outgoing matching chain are controlled by respective pairs of the block-link test relays 16D11 to 16D30.

In the outgoing controller 1700, the wire G—IN of any noted branch is connected to the wire G—OUT thereof unless one of the associated outgoing trunks is in the called group, and is idle, in which event the last noted wire G—IN is transferred from wire G—OUT to the associated wire MG.

By way of example, if both block links extending from the connected primary switch 1300 to the first secondary switch 1400 are idle, block-link test relays 16D11 and 16D12 are both operated. Consequently, the noted ground on wire 1 of group 1602 is disconnected from the succeeding portion of the chain and is transferred to ground-in wire G—IN-1. If there is an idle associated trunk in the called group, wire G—IN-1 is connected to wire MG—1 in the outgoing controller as noted, and matching occurs through the first block-link secondary switch as a consequence. Otherwise, the ground on wire G—IN-1 passes through the outgoing controller and reenters the block controller over wire G—OUT-1, connected to the second point in the noted main endless outgoing chain. The effect at the chain is the same as though neither of the link relays 16D11 and 16D12 had operated.

When no match occurs at the first secondary switch 1400, matching occurs over an outgoing trunk 2020 extending from the second secondary switch if (1) one or another of the link relays 16D13 and 16D14 is operated, and if the outgoing controller has indicated that a trunk of the second secondary switch 1400 is idle (by transferring wire G—IN-2 from wire G—OUT-2 to wire MG-2). Otherwise, the main outgoing-chain ground extends uninterruptedly to the circuit parts associated with the third block-link secondary switch, and so on to the tenth.

Assume that matching cannot occur through any one of the first nine secondary switches 1400, and that it occurs through the tenth secondary switch and over the trunk connected to vertical V20 thereof. In this event, if relay 16D29 is operated, the complete outgoing matching circuit is as follows: From ground on the outgoing-matching-ground wire OTG—MG incoming to the block controller 1600 from the block-controller switch 1500, contacts 3 of relay 16A20, wire 1617, break contact 3 of driver relay 16D2 of the choice allotter, make contact 3 of allotting relay 16E1, the associated wire 1 in group 1602, break contacts 3 of relay 16D11 and 16D12 (or over wires G—IN-1 and G—OUT-1 by way of the outgoing controller) to armature spring 3 of relay 16D13 associated with the second secondary switch, similarly through the portion of the outgoing chain associated with the second to ninth secondary switches, to armature spring 3 of relay 16D29 associated with the tenth secondary switch 1400, make contact 3 of the operated link-test relay 16D29, the associated ground-in wire G—IN-10, contacts (not shown) in the outgoing controller, matching-ground wire MG-10, make contact 1 of block-link test relay 16D29, the upper winding of matching relay 16E29, and through match-pilot relay 16D10 to battery. Relays 16E29 and 16D10 operate in series over this circuit.

VIC5. *Primary and secondary select-magnet operation*

At its contacts 6, matching relay 16E29 (which corresponds directly to block-link test relay 16D29) prepares a hereinafter-traced operate circuit for the secondary hold magnet associated with the matched outgoing trunk 2020, and at its contacts 1 (in series with closed contacts 1 of relay 16D7) grounds the associated tenth select-magnet wire SM-10 extending from the block controller to the block-controller switch 1500. Grounding this wire closes a circuit for the tenth principal select magnet SM10 on the connected primary switch 1300, which controls the selection of the tenth link pair, including the matched block link 206, the nineteenth. As previously noted, this select magnet is operated in series with the secondary select magnet which controls selection of the same pair of block links at the secondary switch (the tenth) to which the concerned pair of links extends. For example, the tenth principal select magnet on the first primary switch is in series with the first principal select magnet of the tenth secondary switch. Operation of the two concerned principal select magnets effects mechanical selection of the pair of links including the matched one.

Since matching relay 16E29 is the first relay of the pair, it represents the upper block link in the matched pair. At its contacts 2, relay 16E29 connects conductor SMU-10 (representative of the extension select magnet SMU of the tenth secondary switch), through contacts 3 of the operated match-complete relay 16E7, to conductor SMU between the block controller and the block-controller switch 1500. Conductor SMU now extends to ground through select magnet SMU of the connected primary switch 1300, while conductor SMU-10 extends to battery through select magnet SMU of the tenth secondary switch. These two extension-select magnets are accordingly operated in series to select the upper link 206 of the selected pair.

VIC6. *Series off-normal ground*

In the connected block-link primary switch 1300, the operation of the noted extension select magnet SMU and principal select magnet SM closes the associated series-connected off-normal contacts (see Fig. 6) to extend off-normal ground over the associated wire PON to the secondary switches 1400. In the tenth secondary switch 1400 (through which matching has occurred) operation of the noted principal select magnet SM and extension-select magnet SMU closes the associated series-connected off-normal contacts to extend the noted off-normal ground potential to secondary off-normal conductor SON, extending from the secondary switches to the block controller.

VIC7. *Primary and secondary hold-magnet operation*

The placing of ground on secondary off-normal wire SON incoming to the block controller 1600 closes two circuits in parallel through respective make contacts of the operated transfer relay 16A20. One circuit is through contacts 1 of relay 16A20, over the outgoing switching conductor OTG—SW, to the concerned primary hold magnet such as HM2-602 (Fig. 6), by way of the connected block coupler such as 500-L (Fig. 5). The other circuit is as follows: From ground through a make contact 2 of transfer relay 16A20, conductor 6 of group 1601, make contact 6 of the operated matching relay 16E29, operate wire OP-10 extending to the outgoing controller 1700, thence over a wire such as MT227 (Fig. 6), to battery through the left-hand winding of secondary hold magnet HM20 (not shown) of the tenth secondary switch 1400 similar to magnet HM17 of the illustrated switches 1400 (Fig. 6).

The operation of the last-noted secondary hold magnet results in the connection of the tip, ring, and sleeve conductors of the matched outgoing trunk respectively to the tip, ring, and sleeve conductors of the secondary end of the matched block link.

At the same time, the primary hold magnet associated with the connected block coupler operates over the other noted parallel circuit, to connect the outgoing tip, ring, and sleeve conductors of the block coupler respectively with the tip, ring, and sleeve conductors of the primary end of the matched block link, completing their extension to the tip, ring, and sleeve conductors of the matched outgoing trunk 2020.

VIC8. *Switching through*

The hold-pilot contacts of the primary hold magnet operate the switch-through relay 501 of the connected block coupler, connecting the incoming tip, ring, and sleeve conductors thereof metallically with the outgoing ones, and disconnecting the line-relay bridge as hereinbefore described. Holding ground is thereby extended forward momentarily over the sleeve conductor by the block coupler to hold the block-link primary and secondary hold magnets of the established connection. The switching-through operation of the block coupler seizes the outgoing trunk 2020 and associated trunk coupler, causing holding ground to be placed on the sleeve of the extended connection (as previously described) by the trunk coupler before it is removed at the block coupler.

VIC9. *Clearing out*

The noted operation of the switch-through relay 501 of the connected block coupler opens the outgoing chain circuit thereat to clear out the common apparatus as described in the former application.

In block controller 1600, the restoration of outgoing-start relay 16A17 permits outgoing-start auxiliary relay 16A15 to restore to return the block controller to its illustrated normal condition. This includes open-circuiting and restoring transfer relays 16A20 and match-pilot relay 16D10 (Fig. 10, Part 7). The operated matching relay (such as 16E29) is thereby restored.

VIC10. *Outgoing-call progress timing*

Since all calls through the block-link frame are handled through the block controller and related common equipment on a one-at-a-time basis, if the progress of outgoing-call operations in the block controller is halted or materially delayed, the block controller must be cleared promptly to free it to handle other outgoing calls. So-called busy relays 16A18 and 16A19 in the outgoing-control group of the block controller are employed successively to time the progress of outgoing-call operations. Relay 16A18 limits the time allowed between outgoing seizure of the block controller and the completion of matching. Relay 16A19 limits the time allowed between outgoing matching and switch-through. Each of the busy relays 16A18 and 16A19 is slow-operating because of a comparatively high-impedance winding and a comparatively strong restoring-spring adjustment.

VIC10a. *All outgoing paths busy*

When relays 16A17 and 16A15 operate as described upon the seizure of the block controller for outgoing-call operation, make contact 2 of auxiliary relay 16A15 extends ground through contacts 2 of relay 16A7 to wire 1 of group 1601, grounding wire 2 of the group through break contact 1 of match-pilot relay 16D10. Ground on this wire, completes a circuit for the first busy relay 16A18.

If all possible matching paths to trunks in the called group are busy, matching does not occur. Therefore, match-pilot relay 16D10 remains restored until the end of the delay time of busy relay 16A18 is reached. At this point relay 16A18 operates.

At its preliminary make contacts 1, relay 16A18 grounds the outgoing-busy wire OTG—BU, thereby operating the busy relay (not shown) in the connected block coupler 500 to return an outgoing-busy-tone signal and to initiate the clearing-out operation of the common equipment as described.

At make contact 2, relay 16A18 locks itself to ground on conductor 1 of group 1601, and at contact 3, it disconnects outgoing-start relay 16A17 to initiate the clearing out operation of the common equipment irrespective of the noted operations in the connected block coupler. Relay 16A18 is restored by the opening of make contact 2 of outgoing-start auxiliary relay 16A15 in the ordinary course of the clearing-out operation of the block controller.

The described operation of busy relay 16A18 occurs responsive to the outgoing matching operating being delayed for any reason.

VIC10b. *Post-match progress timing*

When match-pilot relay 16D10 operates as described responsive to the occurrence of the matching operation, it disconnects operating ground from the first busy relay 16A18 and transfers it to wire 3 in group 1601, connected to the second busy relay 16A19. The pre-match phase of progress timing is thereby ended, and the post-match phase is started.

If the block controller has not caused the matched path to be seized, or if for any reason has not cleared out by the time the post-match delay period has run, the second progress-timing relay 16A19 operates. At its contacts 1, 2, and 3 it performs operations as described for relay 16A18, causing a busy signal to be transmitted to the calling line, and causing the common equipment to be returned to common use.

VID. TERMINATING-CALL OPERATION

As previously noted terminating-call operation covers the operations involved in guiding a terminating connection across the block-link frame, over an idle terminating trunk 207, and across the called line-link frame, to the called line, as distinct from its outgoing-call operation wherein the call terminates at an idle trunk in a called outgoing group.

VID1. *General*

As described hereinbefore, a terminating call is made by dialing the initial digit assigned to the local 1000-line block of line numbers, followed by the dialing of the hundreds, tens, units, and stations digits in the number. When the initial digit assigned to index the 1000-line block of local numbers is dialed in any block coupler 500, the outgoing-start wire OTG—ST is rendered ineffective by outgoing controller 1700 to call in the common apparatus.

VID2. *Seizure of block controller and associated common equipment*

When the assigned directory number has been completely dialed (digits ID, H, T, U, and ST), the operation of the calling block coupler 500 at the end of the dialing of the station digit closes a circuit over the associated section of the terminating chain from ground through one of the section-preference relays 1550 (not shown), which corresponds to the section in which the calling block coupler is located, through the terminating-chain relay in the calling block coupler 500, and over the wire TER—ST to battery through contacts 2 of relay 16A13 of the block controller 1600 and terminating-start relay 16A6.

The noted operation of the terminating-chain relay in the calling block coupler guards the associated section branch of the terminating chain from seizure by another block coupler, and connects the calling block coupler with the "terminating" wires of the block controller, at the same time grounding the selected hundreds, tens, units, and stations digit wires multipled between the block couplers and extending to the block translator.

The operation of the main-terminating-chain relay in the section-preference relays guards the main terminating chain from seizure at any other block-coupler section, and positions the block-controller switch 1500 according to the block-link primary switch 1300 serving the block-coupler section at which the call originated.

The operation of terminating-start relay 16A6 in block controller 1600 starts the block controller into its hereinafter-described sequence of operations leading to the extension of the connection to the called line.

VID3. *Starting the cycle timer*

On operating, terminating-start relay 16A6 of the block controller operates terminating-start auxiliary relay 16A7 through back contact 2 of relay 16A15. Relay 16A7 adapts the block controller for terminating-call operation by opening certain circuit points and by preparing certain circuits to be subsequently closed. It also starts the cycle timer (relays 16A8 to 16A11) into operation by extending ground at its contacts 4 through normally closed contacts 3 of relay 16A11 to the winding of relay 16A8. Relays 16A8 to 16A11 now operate in rapid succession, each of the relays 16A8 to 16A10 operating the next succeeding relay. When relay 16A11 operates, its contacts 3 lock its own winding and those of relays 16A8 to 16A10 directly to ground at the contacts 4 of relay 16A7, opening the initial operating circuit of the relays in preparation for the restoration of relays 16A8 to 16A10 in a timed sequence.

Contacts 2 of relay 16A11 apply short-circuiting ground potential to the junction of the winding of relay 16A8 and the associated battery-supply resistor, causing that relay to restore after a predetermined interval, followed by the successive restoration of relays 16A9, 16A9', and 16A10 at the end of like intervals.

It may be noted that the cycle timer (relays 16A8 to 16A11) of the block controller is similar in purpose and function to the cycle timer (relays 12B11 to 12B5) of the line controller 1200, hereinbefore described.

Normally, the block controller completes its terminating-call operations and clears out before its cycle timer has run down.

VID4. *Preparing for matching*

At its contacts 5, relay 16A7 grounds wire 1611 through contacts 5 of relay 16A15, thereby operating match cut-through relay 16D9 through contacts 4 of relay 16D10, in preparation for matching.

VID5. *Setting the block-link test relays*

Block-controller switch 1500, closes test circuits over wires SL1 to SL10 for block-link test relays 16D11 to 16D30 respectively. Each such block-link test relay thereupon operates subject to the corresponding block link being idle in the group of twenty serving the connected primary switch.

The block controller now awaits terminating-frame information which is received indirectly from the block translator 1800 which will enable it to match a path toward the called line.

VID6. *Translating the called number*

Responsive to the noted grounding (by the connected block coupler) of the digit wires corresponding to the dialed hundreds, tens, and units digits, block translator 1800 determines from these dialed digits which of the four 250-line line-link frames A, B, C, and D serves the called line, and transmits translated digit information thereto indicating the primary switch 800 serving the called line, the concerned fives group of lines thereon, and the units identity of the called line within the group of five.

VID7. *Setting the line-controller apparatus*

The line-controller apparatus (the line controller 1200 and the two associated line-controller switches 1000 and 1100) responds as described to the translated digit information, by grounding its associated terminating-frame wire TF (one of the wires TFA to TFD (Fig. 10, Part 5) at the block controller 1600); it indicates to the block controller that matching operations may take place; it selects the called line and the primary switch serving it, and, for each idle line link serving the selected primary switch, it connects battery through the corresponding select-magnet wire to the corresponding one of the ten link wires LK. These are wires LK1 to LK10 for each line-link frame A to D as they appear at the block controller, Fig. 10, Part 6.

Incidental to its foregoing operations, the line-controller apparatus on the called line-link frame connects its called-line-sleeve wire CLS (extending between it and the block controller) to the sleeve conductor of the called line, and grounds the associated test-start wire TS as a signal to the block controller that the testing of the called line may begin.

VID8. *Setting the block controller according to the called line-link frame*

The noted grounding of the terminating-frame wire TF by the line-controller apparatus sets block controller 1600 according to the line-link frame at which the called line terminates. For example, if the call is to line-link frame A, wire TFA in the frame-A group of wires (TFA to CNA, Fig. 10, Part 5) is the one grounded. Ground on this wire operates frame-A connecting relay 16B11 in the terminating-trunk call-in group in parallel with relay 16C3 in the line-link call-in group. Relay 16B11 connects output wires 1621 to 1624 of the call-in allotter (Fig. 10, Part 4) respectively to terminating-trunk call-in relays 16B12 to 16B15, corresponding to the four call-in groups of terminating trunks serving the called line-link frame A, and also connects frame-A wires TSA, CLSA, and ONA to the corresponding wires TS, CLS, and ON of the block controller. Relay 76C3 connects link wires LK1 to LK10 of the called line-link frame A respectively to the ten corresponding local wires 1630 in the block controller which extend to successively operable call-in relays 16C7 to 16C10.

VID9. *Match start*

The hereinbefore-described operation of any frame-connecting relay 16B11, 16B16, 16B21, and 16B26 starts the matching operation by placing ground (from contact 10 of terminating-start auxiliary relay 16A7) on match-start wire 1610[1]. Ground on match-start wire 1610[1] starts the call-in pulser (relays 16B1, 16C1, and 16C2) into operation to control the step-by-step advance of the associated call-in allotter during matching, if such advance is required.

VID10. *First call-in of terminating trunks*

The call-in allotter (relays 16B2 to 16B6) is a four-position counting chain so arranged that one or another of the counting relays 16B3 to 16B6 is in operated condition at any time. If the call-in allotter is in its illustrated first position (relay 16B3 operated and all other relays thereof restored), ground on match-start wire 1610 reaches the first call-in wire 1621 through break contact 2 of driver relay 16B2 and make contact 3 of the operated counting relay 16B3. Ground on the call-in wire 1621 now operates the first call-in totalizer relay 16B7, which locks to match-start wire 1610. Ground on call-in wire 1621 also operates line-link call-in relay 16C7 to connect the local link wires 1630 to the wires in groups 1605 and 1606 in specific correspondence to the first call-in group of terminating trunks.

Ground on the first call-in wire 1621 also closes a circuit through a make contact of the operated frame-A relay 16B11 for the first terminating-trunk call-in relay 16B12 associated with the called line-link frame A. Relay 16B12 connects the match-test wires MT1 to MT10 of the terminating trunks of the first call-in group of line-link frame A respectively to the ten odd-numbered terminating-trunk test relays 16C11 to 16C29. Any such relay 16C11 to 16C29 now operates subject to the connected terminating-trunk being idle, in which case it has an idle-indicating battery potential on the match-test wire MT thereof. As described in connection with Figs. 4 to 7 for the match-test wire MT-226 of Fig. 6, the match-test wire MT of a terminating trunk 207 is an extension of the sleeve conductor S thereof, and battery potential normally stands thereon through the two associated secondary hold magnets, such as 610 on the block-link frame and 706 on the line-link frame (Figs. 7 and 6). But, when a terminating trunk 201 is busy, holding ground is on its sleeve conductor and the attached MT conductor, to prevent the concerned ground-connected trunk-test relay 16C11 to 16C29 from operating thereover.

It will be recalled that the terminating trunks of any call-in group comprise ten trunks extending from respective secondary sections on the called line-link frame.

As more fully described hereinafter, matching may now occur to select a path over any one of the terminating trunks in call-in group 1 of line-link frame A (1) subject to such terminating trunk 207 being idle, (2) subject to a block-link 206 of the pair over which it is reached being idle, and (3) subject to the line link being idle over which the terminating trunk must be extended to the called line. As will be described, when matching occurs, match-pilot relay 16D10 is operated to open the operate circuit of relay 16C2 of the call-in pulser to temporarily prevent the call-in allotter from advancing to the next call-in of terminating trunks.

VID11. *Succeeding call-ins*

If no match occurs upon the first call-in of terminating trunks, match-pilot relay 16D10 fails to operate, permitting the call-in pulser (Fig. 10, Part 4) to advance the call-in allotter by operating the next succeeding counting relay 16B4 and restoring the previously operated one, relay 16B3. This results in the transfer of ground from the first call-in wire 1621 to the second call-in wire 1622. The operated pair of call-in relays, 16C7 and 16B12 are thereby restored and the next succeeding pair, 16C8 and 16B13, operate. The next succeeding relay (16B8) in the call-in totalizer now operates and locks. The match-test wires MT11 to MT20 of the second call-in group of terminating trunks 207 of frame A are thus substituted for the match-test wires MT1 to MT10 of the initial call-in group, and by the operation of relay 16C8 in place of relay 16C7, the link wires LK of the called line-link frame A are presented in the correct order of slip for the second call-in group of frame-A terminating trunks 207.

If no match results on the second call-in of terminating trunks, the call-in allotter is again advanced by the call-in pulser, causing the operated pair of call-in relays (16B13 and 16C8) to restore and the next succeeding pair (16B14 and 16C9) to operate over wire 1623, along with the operation and locking of the third totalizer relay 16B9.

If no match results on the third call-in of terminating trunks, the third pair of call-in relays (16B14 and 16C9) is restored and the fourth pair (16B15 and 16C10) is operated over wire 1624 to call in the fourth and final group of terminating trunks of line-link frame A for test, and the fourth call-in totalizer relay 16B10 operates and locks.

VID11a. All terminating paths busy

If no match results on the fourth call-in of terminating trunks, the next succeeding operation of relay 16C2 of the call-in pulser closes a series circuit through contacts 1 of the locked call-in totalizer relays 16B7 to 16B10 for grounding the terminating-busy wire TER—BU, which causes the connected block 500 to return a busy tone to the calling line and to relinquish the common equipment, as well as operating clear-out relay 16A13 with hereinafter-described results.

VID12. Testing the called line

While the foregoing operations are occurring incident to matching, the called line is undergoing test.

When the line-controller apparatus on line-link frame A (called as assumed) connects the associated call-line-sleeve wire CLSA to the sleeve of the called line as hereinbefore described and grounds the associated test-start wire TSA, and when frame-A relay 16B11 has operated, a circuit is closed from ground on wire TSA, contacts of the operated relay 16B11, wire TS in the block controller, contacts 7 of relay 16A7, and break contact 4 of relay 16A2 to battery through the lower winding of busy relay 16A3 in the line-test group of the block controller. Relay 16A3 is rendered slow operating by having a relatively strong restoring-spring adjustment, and by having its upper (armature-end) winding short-circuited through its break contact 3, to provide a retarding shading effect.

VID12a. Called line tests idle

When the called line is idle, the ground-connected test relay 16A1 operates (through contacts 2 of relay 16A4 and over wires CLS and CLSA) in series with the primary hold magnet (such as HM-703, Fig. 7) connected to the sleeve of the called line, but the resistance of the winding of relay 16A1 is sufficiently high that the hold magnet does not operate in series therewith. Relay 16A1 thereupon operates idle relay 16A2 before the retarded busy relay 16A3 has had time to operate. Idle relay 16A2 disconnects busy relay 16A3 at its break contact 4 and locks to the grounded conductor TS at its make contact 4.

VID13. Successful conclusion of terminating matching

The foregoing essential preparations for the successful conclusion of terminating matching may be restated briefly as follows:

1. Block-link test relays 16D11 to 16D30 are connected respectively to the sleeve wires S of the block links 206 serving the connected primary switch, and any relay 16D11 to 16D30 now stands operated subject to the corresponding block link being idle.

2. On any call-in of terminating trunks, the match-test wires MT of the ten trunks 207 of the group called in by any one of the call-in relays 16B12 to 16B15 are extended respectively to the ground-connected windings of terminating-trunk test relays 16C11 to 16C29. Any such relay operates as described subject to the corresponding terminating trunk 207 of the current call-in group being idle.

3. The link wires LK1 to LK10 of the called line-link frame A are associated respectively with the line links serving the line-link primary switch 800 on which the called line is connected. For each idle one of these line links, idle-indicating battery potential is impressed on the corresponding LK wire from the corresponding select-magnet wire on the line-link frame.

Consider, for example, the described call-in 1 of terminating trunks (relays 16C3 and 16C7 energized): (1) If both block links 206 are idle in the first pair serving the connected primary switch 1300, block-link test relays 16D11 and 16D12 are operated; (2) if the first terminating trunk 207 of the first call-in group is idle, terminating-trunk test relay 16C11 is operated; and (3) if the first line-link serving the connected line-link primary switch 800 is idle, there is battery on link wire LK1 of frame A. Subject to each of the foregoing three conditions being met, the first pair of ten possible pairs of matching circuits are closed as follows:

From battery on link wire LK1 of the frame-A group (Fig. 10, part 6), through make contacts of frame-A relay 16C3, local line-link wire 1630-1, make contacts of relay 16C7, wire 1 in group 1605, make contact 1 of relay 16C11, wire 1631—1, make contacts 1 of relay 16D9, and thence over parallel branches through make contacts 2 of relays 16D11 and 16D12, to ground through the high-resistance test windings of the first pair of matching relays 16E11 and 16E12. Matching relays 16E11 and 16E12 consequently both operate.

With the choice allotter (relays 16D1 to 16D3 and 16E1 to 16E10) in its illustrated first position, locking ground through contacts 1 of relays 16A7 and 16A15, wire 1614, break contact 1 of relay 16D2, and contact 1 of relay 16E1 stands on wire 1 in preference locking group 1603 incoming to the locking chain of contacts 5 of the matching relays 16E11 to 16E30. Relay 16E11 consequently has locking preference over all other matching relays. Upon operating, relay 16E11 closes a locking circuit from ground on wire 1 in group 1603, its make contact 5, through its upper winding, to battery through the winding of match-pilot relay 16D10, at the same time disconnecting locking ground from the locking armatures of all succeeding matching relays. Consequently, the second matching relay 16E12 cannot lock operate, nor can any subsequent relay in the matching chain.

Match-pilot relay 16D10 operates in series with matching relay 16E11. Its break contact 3 removes ground from wire 1612 to stop the operation of the call-in pulser by depriving the third relay 16C2 thereof of operating ground.

At its contacts 4, relay 16D10 open-circuits and restores match-cut-through relay 16D9. The ten matching wires 1631 extending between the make contacts of terminating-trunk test relays 16C11 to 16C29 and the contacts 2 of the block-link test relays 16D11 to 16D29 are thereby opened, open-circuiting the ground-connected test windings of all the matching relays 16E11 to 16E30. Relay 16E11 remains operated over its noted locking circuit, but all other operated matching relays immediately restore, not having been able to lock operated with the choice allotter in its first position, and with break contact 5 open at relay 16E11.

The terminating matching operation is now complete. The locked condition of matching relay 16E11 (with all other matching relays restored) identifies the matched path as over the first (or upper) block link 206 of the first pair serving the connected block-link primary switch, and consequently over the first terminating trunk of the currently connected call-in group (the first), and over the first one of the ten links, serving the concerned primary switch 800 on the called line-link frame A.

With the terminating matching operation having been completed as described, match-complete relay 16E7 now operates subject to the called line having tested idle as hereinbefore described. In that event, idle relay 16A2 stands operated and busy relay 16A3 stands unoperated, extending ground through contacts 5 of relays 16A2 and 16A3 through contacts 9 of terminating-start auxiliary relay 16A7 to wire 1609. Ground on wire 1609 operates relay 16E7 through make contacts 2 of relay 16D10 and break contacts 11 of match-cut-through relay 16D9.

VID14. *Primary and secondary select-magnet operation*

At its make contacts 1, 3, and 4, match-complete relay 16E7 closes three prepared select-magnet circuits, two on the block-link frame, and one on the called line-link frame, for selecting the matched block link and the matched line link.

Selection of the first pair of block links (containing the matched one) is accomplished through contacts 1 of relays 16E7 and 16E11 which ground the first principal select-magnet wire SM1 extending between the block controller and the block-controller switch 1500. Selection of the matched upper link of the pair is accomplished through contacts 3 of relay 16E7 and contacts 2 of relay 16E11, which connect wire SMU of the block-controller switch (leading to ground through the corresponding select magnet of the connected primary switch) to wire SMU-1, which lead to battery through magnet SMU of the first secondary switch 900 on the the block-link frame. The primary and secondary select magnets associated with the block link in the matched path are thereby operated to select the matched block link as described for outgoing operations.

Selection of the matched line link occurs responsive to the extension of ground, through contacts 4 of relays 16E7 and 16E11, over the associated wire 1 in group 1606, and through make contacts 1 of relay 16C7, wire 1630-1, and through contacts 1 of relay 16C3 to link wire LK1 of line-link frame A. As previously described, the primary and secondary select magnets SM on the line-link frame which are associated with the selected line link in the matched path are operated in series over this wire to effect mechanical selection thereof.

VID15. *Block-link off-normal ground*

When the primary and secondary select magnets have operated on the block-link frame to select the matched block link, they establish the described series ground connection across the block-link frame to secondary off-normal wire SON (Fig. 10, Part 5) incoming to the block controller. Ground is thereby extended, through break contact 3 of outgoing-start auxiliary relay 16A15 and through make contact 3 of terminating-start auxiliary relay 16A7, to the upper winding terminal of operate relay 16A14.

VID16. *Line-link off-normal battery*

When the primary and secondary select magnets have operated on the called line-link frame A to select the matched line link, they extend the described series battery connections across the line-link frame, and through the line-controller apparatus, to off-normal wire ONA of frame A (Fig. 10, Part 5), thereby extending battery through a make contact of frame-A relay 16B11 to local wire ON of the block controller, and thence through break contact 1 of reset relay 16A12 to the lower winding terminal of operate relay 16A14.

VID17. *Hold magnet operation*

Operate relay 16A14, having been supplied with a ground potential at upper winding terminal, and with a battery potential at its lower winding terminal, now operates to close three operate circuits for four hold-magnets as follows:

1. Contacts 1 of relay 16A14 ground terminating-switch wire TER—SW to operate the block-link primary hold magnet (such as 602) associated with the connected block coupler 500, over the hereinbefore traced circuit;

2. Its contacts 5 ground wire 4 in group 1601, extending ground, through make contacts 3 of relay 16E11, wire 1 of group 1604, and contacts 1 of relays 16E11 and 16E12 to the match-test conductor MT1 of the matched terminating trunk 207 to operate the associated secondary hold magnet on the block-link frame and the one on the line-link frame in parallel, as shown in Figs. 6 and 7 for magnets 619 and 706; and 3. Its contacts 7 ground the called-line-sleeve wire CLS to close a circuit through a make contact of frame-A relay 16B11 and over the frame-A wire CLSA, for the hold magnet (such as 703, Fig. 7) associated with the called line.

The four noted hold magnets operate to ex-

VID18. Clearing out

The clearing out of the block controller 1600 and associated common apparatus is initiated from two points. First, the switching relay (not shown) in the connected block coupler 500 opens the associated section of the terminating chain as described in the former application. Second, clearout relay 16A13 in the block controller is operated by contacts 6 of relay 16A14. The clearout relay is adjusted to be comparatively slow in operation to allow time for the noted hold magnets to operate. When clearout relay 16A13 operates, its contacts 2 open the terminating-start wire TER—ST. The closed terminating-chain circuit over which the common apparatus was seized is thus opened independently at two points to insure that it is cleared out. The noted relays previously held operated in the terminating chain thereupon restore.

In the block controller, terminating-start relay 16A6 responds to the noted opening of the terminating chain by open-circuiting and restoring the associated auxiliary relay 16A7. Relay 16A7 opens its contacts 4 to clear out the associated cycle timer (relays 16A8 to 16A11); its contacts 1 remove ground from wire 1614 of the choice allotter, unlocking and restoring the locked matching relay 16E11 and match-pilot relay 16D10, followed by the restoration of match-complete relay 16E7. Contacts 10 of relay 16A7 remove the initial ground connection from wire 1610, and consequently from match-start wire 1610¹, but ground is held locked on wire 1610¹ by relay 16B1 until the call-in pulser completes its cycle of operation which was arrested by the described operation of match-pilot relay 16D10.

Frame-A relays 16B11 and 16C3 are restored, along with relays in the line-test group, when the line-controller apparatus on the called line-link frame clears out.

Reset relay 16A12 is operated by relay 16A13 to open-circuit and restore relay 16A14, whereupon relays 16A13 and 16A12 restore in succession.

VID18a. Progress advance of the call-in allotter

The block controller 1600 is now cleared out and returned to its illustrated normal condition except for such relays as are held operated by ground locked on match-start wire 1610¹ at contacts 2 of relay 16B1 of the call-in pulser.

When match-pilot relay 16D10 restores as noted, it reconnects ground to the circuit of relay 16C2 of the call-in pulser, thereby operating relay 16C2 through contacts 1 of the operated relay 16C1. Contacts 2 of relay 16C2 disconnect relay 16B1 from the match-start wire 1610¹, whereupon relays 16B1, 16C1, and 16C2 restore successively. The operation of the call-in-pulser terminates at this point, as relay 16B1 removes locking ground from match-start wire 1610¹. The operation and restoration of relay 16C2 causes the associated call-in allotter to advance one step. The next succeeding call-in group of terminating trunks is thus advanced to first call-in position for the next terminating-call operation.

The operation of the apparatus on Part 4 of Fig. 10 (the call-in pulser, the call-in allotter, and the call-in totalizer of the block controller) is not described in detail, for these items operate as described for the corresponding equipment of Fig. 9, Part 5, of the hereinbefore-described line controller 1200. The only circuit difference is that each of the call-in totalizer relays 16B7 to 16B10 has a second locking winding which enables them to be operated directly off call-in wires 1621 to 1624, rather than requiring a separate group of contacts on the call-in allotter such as contacts 3, 4, 5, and 3 of relays 12C18, 12C19, 12C20, and 12C21.

VID18. Called line is busy

If the called line is in use when tested by the block controller as described, test relay 16A1 of the block controller fails to operate, being short-circuited by holding ground on the sleeve wire S individual to the called line. Under this condition, idle relay 16A2 has not been operated when slow-operating busy relay 16A3 operates at the end of the time interval for which it is adjusted. Therefore, the described operate circuit of match-complete relay 16D10 is maintained open at contacts 5 of each of the relays 16A2 and 16A3, for there is no point in further extending the connection toward a busy line.

A moment following the operation of busy relay 16A3, slow-operate test-cutoff relay 16A4 operates. Its make contact 1 grounds terminating-busy wire TER—BU through a break contact 3 of relay 16A2. The busy relay is thereby operated in the connected block coupler 500, and clearout relay 16A13 is operated in parallel therewith. A busy signal is thus returned to the calling line and the common apparatus is cleared out as described.

VID20. A reverting call

Reverting calls are handled through the block couplers 500 and the block controller 1600 by dialing the regular directory number of the station on the same line with the calling line. The "called" line, being also the calling line, always tests busy when a reverting call is made. Consequently, whenever busy relay 16A3 operates, block controller 1600 must make a reverting-call test before it can treat the called line as normally busy, in the above-described manner.

When busy relay 16A3 operates as described, its break contact 3 opens its short-circuited upper winding to render it fast restoring, and its make contact 4 closes a circuit for test-cutoff relay 16A4. Relay 16A4 is slow-operating as pointed out for relay 16A3, to provide the time interval required for the reverting-call test.

During the interval of time occurring between the operation of busy relay 16A3 and the operation of test-cutoff relay 16A4, direct ground is removed, at break contact 2 of relay 16A3, from the associated sleeve-ground wire SG, leaving this wire grounded only through the associated resistor 1613. As hereinbefore described, wire SG is the extended incoming sleeve conductor S of the connected block coupler 500. Consequently the holding ground supplied over this conductor to the hold magnets of the line-link primary and secondary switches on the calling line-link frame is now obtained through the resistor 1613. If the calling and called lines are the same, test relay 16A1 is now connected to the sleeve of the calling line and consequently is operated in parallel with resistor 1613. It thereupon operates idle relay 16A2. The operation of relay 16A2 following the operation of relay 16A3 signals a reverting call rather than a call to a normally busy called line. Reverting-call wire RC and terminating-switching wire TER—SW are each grounded (through make contacts 2 and 1 respectively of relays 16A2 and 16A3 in series), conditioning the connected block coupler 500 for operation as a reverting-call ring-back switch as described in the former application. The block coupler 500 thereupon initiates the described clearing out operation of the common equipment.

VID21. *Terminating-call progress timing*

The progress of the bloc controller and associated apparatus during terminating-call operation is timed by the cycle timer, comprising relays 16A8 to 16A11, which operate sequentially, as described, responsive to the operation of terminating-start auxiliary relay 16A7. Following operation of relay 16A11, relays 16A8 to 16A10 are restored sequentially. The cycle timer is completely run down upon the restoration of relay 16A10. Relays 16A8 to 16A10 are adjusted to be sufficiently slow-restoring that the block controller has time to complete its outgoing operation and clear out before the cycle timer has run down.

When the clearing-out operation occurs before the cycle timer has run down, the restoration of relay 16A7 open-circuits the locked relay 16A11 and any one of the relays 16A8 to 16A10 which is still operated. All the relays of the cycle timer thereupon promptly restore.

This cycle timer operates in detail as described fully for the cycle timer (relays 12B11 to 12B15) of the line controller 1200, but the relays of the cycle timer of the block controller are preferably adjusted for a longer cycle to enable the block controller to wait for the concerned line controller to complete an originating operation in which it may be engaged.

If a circuit failure in the block controller or associated common apparatus, or in the concerned line-controller apparatus, halts the normal progress of terminating-call operations, the cycle timer of the block controller runs down before the block controller has cleared out. Under this condition, the cycle timer of the block controller grounds terminating-busy wire TER—BU through contacts 1 of relays 16A10 and 16A11. The busy relay in the connected block coupler 500 and clearout relay 16A13 of the block controller are thereby operated to initiate the described clearing out of the block controller and associated common equipment by opening the terminating-start wire TER—ST.

VID22. *Operation of call-in allotter*

The call-in allotter of the block controller comprises driver relay 16B2 and four allotting relays 16B3 to 16B6. As previously noted, this allotter operates as described for the call-in allotter of any line controller 1200. In its four positions, this allotter connects match-start wire 1610 to the four call-in wires 1621 to 1624.

The overall result of the operation of the call-in allotter of Fig. 10, Part 4, as controlled by the associated call-in pulser is: (1) it calls in the call-in groups of connected terminating trunks successively until a match has occurred, or until all four have been called in with no match having occurred, and (2) considering the four call-in groups of terminating trunks 207 extending to any line-link frame as arranged in a continuous chain, or circle, the first call-in group called in on an operation of the block controller is the call-in group next following the call-in group (for the same or another line-link frame) last called in on the preceding terminating operation of the block controller. The effect is to randomize the calls offered to the four call-in groups of terminating trunks extending to any line-link frame.

VID23. *Operation of the choice allotter*

The choice allotter comprising the thirteen relays 16D1 to 16D3 and 16E1 to 16E10 is a specialized counting chain arranged to assume allotting positions 1 to 10 successively in recurring cycles as described in detail for the choice allotter comprising relays 12C1 to 12C13 of line controller 1200 (Fig. 9). Its purpose is to shift first choice successively among the ten secondary switches 1400 on the block-link frame.

The allotting relays are 16E1 to 16E10. They are controlled by driver relays 16D1 and 16D2 over the associated odd and even control wires as described for the choice allotter of Fig. 12. Relay 16D3 is employed as described for relay 12C3.

Driver relays 16D1 and 16D2 are controlled by ground applied alternately to wires 1615 and 1616 by make and break contacts 4 of relay 16A11 of the cycle timer, which is operated as described at the initiation of each terminating-call operation and is restored when the block controller is next cleared out.

Ground is supplied to armature 4 of relay 16A11 through break contact 4 of relay 16A15, which operates whenever the block controller is seized for outgoing operation. By this arrangement, the advance of the choice allotter from one position to the next occurs between successive terminating-call uses of the choice allotter.

As the choice allotter of the block controller progresses through its allotting positions 1 to 10 as described in detail for the choice allotter of Fig. 9, outgoing matching-ground wire OTG—MG is applied successively to the ten choice wires in group 102 leading to the ten points of entry to the outgoing matching chain carried through contacts 3 of block-link test relays 16D11 to 16D30, thereby shifting outgoing-call first choice progressively from the first to the tenth of the block-link secondary switches 1400, which the ten pairs of these relays respectively represent.

Additionally, the locking ground wire 1614 is applied successively to the ten choice wires in group 1603 leading to the locking chain of contacts 5 of matching relays 16E11 to 16E30, thereby shifting terminating-call first choice progressively from the first to the tenth of the block-link secondary switches 1400, which the ten pairs of these relays respectively represent.

Giving first choice to the secondary switches in regular order for outgoing calls, tends to balance the traffic load through the secondary switches and among the trunks in any called outgoing group, which also distributes the outgoing-call load more or less evenly among the block-link pairs serving any block-link primary switch 1300.

Giving first choice to the secondary switches in regular order for terminating calls combined with the previously described action of the call-in allotter to randomize the terminating trunks almost completely to the end that any tendency toward unbalanced load distribution which might result in unnecessary match failures is greatly minimized.

VID24. *Terminating-trunk slip*

The following four tables give the trunk number and identity of each of the forty terminating trunks serving line-link frames A, B, C, and D, respectively.

A. TERMINATING TRUNKS TO FRAME A

| | Trk. No. | From | To |
|---|---|---|---|
| Call-In 1 | 1 | SW1-V1 | SE1-V1 |
| | 2 | SW2-V1 | SE2-V1 |
| | 3 | SW3-V1 | SE3-V1 |
| | 4 | SW4-V1 | SE4-V1 |
| | 5 | SW5-V1 | SE5-V1 |
| | 6 | SW6-V1 | SE6-V1 |
| | 7 | SW7-V1 | SE7-V1 |
| | 8 | SW8-V1 | SE8-V1 |
| | 9 | SW9-V1 | SE9-V1 |
| | 10 | SW10-V1 | SE10-V1 |
| Call-In 2 | 11 | SW1-V2 | SE2-V2 |
| | 12 | SW2-V2 | SE3-V2 |
| | 13 | SW3-V2 | SE4-V2 |
| | 14 | SW4-V2 | SE5-V2 |
| | 15 | SW5-V2 | SE6-V2 |
| | 16 | SW6-V2 | SE7-V2 |
| | 17 | SW7-V2 | SE8-V2 |
| | 18 | SW8-V2 | SE9-V2 |
| | 19 | SW9-V2 | SE10-V2 |
| | 20 | SW10-V2 | SE1-V2 |
| Call-In 3 | 21 | SW1-V3 | SE3-V3 |
| | 22 | SW2-V3 | SE4-V3 |
| | 23 | SW3-V3 | SE5-V3 |
| | 24 | SW4-V3 | SE6-V3 |
| | 25 | SW5-V3 | SE7-V3 |
| | 26 | SW6-V3 | SE8-V3 |
| | 27 | SW7-V3 | SE9-V3 |
| | 28 | SW8-V3 | SE10-V3 |
| | 29 | SW9-V3 | SE1-V3 |
| | 30 | SW10-V3 | SE2-V3 |
| Call-In 4 | 31 | SW1-V4 | SE4-V4 |
| | 32 | SW2-V4 | SE5-V4 |
| | 33 | SW3-V4 | SE6-V4 |
| | 34 | SW4-V4 | SE7-V4 |
| | 35 | SW5-V4 | SE8-V4 |
| | 36 | SW6-V4 | SE9-V4 |
| | 37 | SW7-V4 | SE10-V4 |
| | 38 | SW8-V4 | SE1-V4 |
| | 39 | SW9-V4 | SE2-V4 |
| | 40 | SW10-V4 | SE3-V4 |

B. TERMINATING TRUNKS TO FRAME B

| | Trk. No. | From | To |
|---|---|---|---|
| Call-In 1 | 1 | SW1-V5 | SE1-V1 |
| | 2 | SW2-V5 | SE2-V1 |
| | 3 | SW3-V5 | SE3-V1 |
| | 4 | SW4-V5 | SE4-V1 |
| | 5 | SW5-V5 | SE5-V1 |
| | 6 | SW6-V5 | SE6-V1 |
| | 7 | SW7-V5 | SE7-V1 |
| | 8 | SW8-V5 | SE8-V1 |
| | 9 | SW9-V5 | SE9-V1 |
| | 10 | SW10-V5 | SE10-V1 |
| Call-In 2 | 11 | SW1-V6 | SE2-V2 |
| | 12 | SW2-V6 | SE3-V2 |
| | 13 | SW3-V6 | SE4-V2 |
| | 14 | SW4-V6 | SE5-V2 |
| | 15 | SW5-V6 | SE6-V2 |
| | 16 | SW6-V6 | SE7-V2 |
| | 17 | SW7-V6 | SE8-V2 |
| | 18 | SW8-V6 | SE9-V2 |
| | 19 | SW9-V6 | SE10-V2 |
| | 20 | SW10-V6 | SE1-V2 |
| Call-In 3 | 21 | SW1-V7 | SE3-V3 |
| | 22 | SW2-V7 | SE4-V3 |
| | 23 | SW3-V7 | SE5-V3 |
| | 24 | SW4-V7 | SE6-V3 |
| | 25 | SW5-V7 | SE7-V3 |
| | 26 | SW6-V7 | SE8-V3 |
| | 27 | SW7-V7 | SE9-V3 |
| | 28 | SW8-V7 | SE10-V3 |
| | 29 | SW9-V7 | SE1-V3 |
| | 30 | SW10-V7 | SE2-V3 |
| Call-In 4 | 31 | SW1-V8 | SE4-V4 |
| | 32 | SW2-V8 | SE5-V4 |
| | 33 | SW3-V8 | SE6-V4 |
| | 34 | SW4-V8 | SE7-V4 |
| | 35 | SW5-V8 | SE8-V4 |
| | 36 | SW6-V8 | SE9-V4 |
| | 37 | SW7-V8 | SE10-V4 |
| | 38 | SW8-V8 | SE1-V4 |
| | 39 | SW9-V8 | SE2-V4 |
| | 40 | SW10-V8 | SE3-V4 |

C. TERMINATING TRUNKS TO FRAME C

| | Trk. No. | From | To |
|---|---|---|---|
| Call-In 1 | 1 | SW1-V9 | SE1-V1 |
| | 2 | SW2-V9 | SE2-V1 |
| | 3 | SW3-V9 | SE3-V1 |
| | 4 | SW4-V9 | SE4-V1 |
| | 5 | SW5-V9 | SE5-V1 |
| | 6 | SW6-V9 | SE6-V1 |
| | 7 | SW7-V9 | SE7-V1 |
| | 8 | SW8-V9 | SE8-V1 |
| | 9 | SW9-V9 | SE9-V1 |
| | 10 | SW10-V9 | SE10-V1 |
| Call-In 2 | 11 | SW1-V10 | SE2-V2 |
| | 12 | SW2-V10 | SE3-V2 |
| | 13 | SW3-V10 | SE4-V2 |
| | 14 | SW4-V10 | SE5-V2 |
| | 15 | SW5-V10 | SE6-V2 |
| | 16 | SW6-V10 | SE7-V2 |
| | 17 | SW7-V10 | SE8-V2 |
| | 18 | SW8-V10 | SE9-V2 |
| | 19 | SW9-V10 | SE10-V2 |
| | 20 | SW10-V10 | SE1-V2 |
| Call-In 3 | 21 | SW1-V11 | SE3-V3 |
| | 22 | SW2-V11 | SE4-V3 |
| | 23 | SW3-V11 | SE5-V3 |
| | 24 | SW4-V11 | SE6-V3 |
| | 25 | SW5-V11 | SE7-V3 |
| | 26 | SW6-V11 | SE8-V3 |
| | 27 | SW7-V11 | SE9-V3 |
| | 28 | SW8-V11 | SE10-V3 |
| | 29 | SW9-V11 | SE1-V3 |
| | 30 | SW10-V11 | SE2-V3 |
| Call-In 4 | 31 | SW1-V12 | SE4-V4 |
| | 32 | SW2-V12 | SE5-V4 |
| | 33 | SW3-V12 | SE6-V4 |
| | 34 | SW4-V12 | SE7-V4 |
| | 35 | SW5-V12 | SE8-V4 |
| | 36 | SW6-V12 | SE9-V4 |
| | 37 | SW7-V12 | SE10-V4 |
| | 38 | SW8-V12 | SE1-V4 |
| | 39 | SW9-V12 | SE2-V4 |
| | 40 | SW10-V12 | SE3-V4 |

D. TERMINATING TRUNKS TO FRAME D

| | Trk. No. | From | To |
|---|---|---|---|
| Call-In 1 | 1 | SW1-V13 | SE1-V1 |
| | 2 | SW2-V13 | SE2-V1 |
| | 3 | SW3-V13 | SE3-V1 |
| | 4 | SW4-V13 | SE4-V1 |
| | 5 | SW5-V13 | SE5-V1 |
| | 6 | SW6-V13 | SE6-V1 |
| | 7 | SW7-V13 | SE7-V1 |
| | 8 | SW8-V13 | SE8-V1 |
| | 9 | SW9-V13 | SE9-V1 |
| | 10 | SW10-V13 | SE10-V1 |
| Call-In 2 | 11 | SW1-V14 | SE2-V2 |
| | 12 | SW2-V14 | SE3-V2 |
| | 13 | SW3-V14 | SE4-V2 |
| | 14 | SW4-V14 | SE5-V2 |
| | 15 | SW5-V14 | SE6-V2 |
| | 16 | SW6-V14 | SE7-V2 |
| | 17 | SW7-V14 | SE8-V2 |
| | 18 | SW8-V14 | SE9-V2 |
| | 19 | SW9-V14 | SE10-V2 |
| | 20 | SW10-V14 | SE1-V2 |
| Call-In 3 | 21 | SW1-V15 | SE3-V3 |
| | 22 | SW2-V15 | SE4-V3 |
| | 23 | SW3-V15 | SE5-V3 |
| | 24 | SW4-V15 | SE6-V3 |
| | 25 | SW5-V15 | SE7-V3 |
| | 26 | SW6-V15 | SE8-V3 |
| | 27 | SW7-V15 | SE9-V3 |
| | 28 | SW8-V15 | SE10-V3 |
| | 29 | SW9-V15 | SE1-V3 |
| | 30 | SW10-V15 | SE2-V3 |
| Call-In 4 | 31 | SW1-V16 | SE4-V4 |
| | 32 | SW2-V16 | SE5-V4 |
| | 33 | SW3-V16 | SE6-V4 |
| | 34 | SW4-V16 | SE7-V4 |
| | 35 | SW5-V16 | SE8-V4 |
| | 36 | SW6-V16 | SE9-V4 |
| | 37 | SW7-V16 | SE10-V4 |
| | 38 | SW8-V16 | SE1-V4 |
| | 39 | SW9-V16 | SE2-V4 |
| | 40 | SW10-V16 | SE3-V4 |

In the foregoing tables A to D, "SW" is an abbreviation of "switch" and refers to a secondary switch 1400 on the block-link frame; "SE" is an abbreviation of "section" and refers to a secondary section, being a section (left or right) of a secondary switch 900 on a line-link frame; and "V" is an abbreviation of "vertical" and refers to a vertical location on a secondary switch 1400 on the block-link frame or to a vertical location on a secondary section on a line-link frame.

The information opposite any trunk number on a table identifies the block-link secondary switch 1400 and vertical thereof from which the terminating trunk extends, and it identifies the secondary section and vertical thereof on the line-link frame to which the trunk extends.

Considering the forty terminating trunks extending to any line-link frame, the group of ten comprising call-in 1 extend "straight," or without "slip," from secondary switches 1 to 10 to the secondary sections 1 to 10, while the terminating trunks of call-in 2 extend to the secondary sections in the order of 2, 3, 4, 5, 6, 7, 8, 9, 10, 1. This shifted order at the secondary sections is referred to as a slip of 1. The trunks of call-in 3 connect to the secondary sections with a slip of 2 and the trunks of call-in 4 have a slip of 3.

The purpose of the terminating-trunk slip is to enhance the probability of matching during periods of heavy traffic by presenting the pairs of block links to the line links in a new order on each call-in.

The four call-in relays 16C7 to 16C10 of the block controller (Fig. 10, Part 6) are provided to connect up the line-link wires LK of frames A to D in correct correspondence with the terminating-trunk test relays and the block-link test relays in view of the noted slip in call-ins 2 to 4 of the terminating trunks. With this slip in view, the first call-in relay 16C7 connects the link-extension wires 1630 (to which the wires LK of the called line-link frame A, B, C, or D have been connected by the concerned one of relays 16C3 to 16C6) to the corresponding local extensions (groups 1605 and 1606) without slip; the second call-in relay 16C8 connects the noted wires together with a slip of one; the third call-in relay 16C9 connects the wires together with a slip of two; and the fourth call-in relay 16C10 connects these wires together with a slip of three. In this way the matching circuits over wires LK and the wires in group 1605, and the select magnet circuits over the wires in group 1606 pass through contacts of the line-link call-in relays in the same order that paths exist from the block links over the terminating trunks to the line links.

VIE. OVERLAPPING TERMINATING-CALL AND OUTGOING-CALL OPERATION

Since, as described fully in the noted former application, two separate chains (an outgoing chain and a terminating chain) are provided through the block couplers 500 and the section-preference relays (not shown herein) for the seizure of the block controller 1600 and associated apparatus, over-lapping seizure can occur, as a seizure over either chain does not preclude seizure over the other chain. The two separate chains permit outgoing-call operations to take precedence over terminating-call operations in all cases in which circuit confusion is unlikely; that is, in all cases except the special one in which the block controller is just concluding terminating-call operation when the outgoing-call seizure occurs. The cases under which overlapping seizure of the block controller and common apparatus can occur over the outgoing chain and the terminating chain are seperately described as follows:

VIE1. *Terminating-call and outgoing-call seizures occur together*

When terminating-call and outgoing-call seizures of the control chains by respective block couplers occur together, terminating-start relay 16A6 and outgoing-start relay 16A17 of the block controller 1600 both operate at the same time, each over a separate chain circuit. Terminating-start auxiliary relay 16A7 and outgoing-start auxiliary relay 16A15 thus operate at the same time. Outgoing-start auxiliary relay 16A15, at its break contact 2, open-circuits relay 16A7, usually before it has completely operated. Contacts 7 of relay 16A7 withhold operating current from relays 16A2 and 16A3 and contacts 10 withhold ground from wire 1610, thereby holding the called-line testing operation, and the terminating-call matching operation in abeyance while the outgoing-call operation proceeds as hereinbefore described. Through a chain-preference arrangement described in the former application, the seizure of the terminating chain is temporarily ignored when both chains are seized together, wherefore the block-controller switch 1500 is set in accordance with the block-link primary switch through which the outgoing call is to be handled.

When the outgoing-call operation is concluded, relays 16A17 and 16A15 restore as described, whereupon terminating-start auxiliary relay 16A7 is reconnected at break contact 2 of relay 16A15, and thereupon reoperates to permit terminating-call operations to proceed in the block controller 1600.

In the meantime, the block translator 1800 has remained set and has forwarded the translated digit information for the waiting terminating call to the line-controller apparatus on the called line-link frame, which has performed its operations preparatory to the testing of the called line by the block controller. If the line-controller apparatus is ready, the testing of the called line starts immediately upon the noted reoperation of relay 16A7 to close test-start conductor TS at its contacts 7. In the example assumed, the completion of the terminating-call operation of the block controller thus is not materially delayed, if delayed at all, by the comparatively rapid outgoing-call operation which was given preference, for the latter took place during a short interval of normal waiting time at the block controller.

VIE2. *Outgoing-call seizure occurs first*

When the outgoing-call seizure of the block controller and related apparatus occurs before the overlapping seizure for terminating-call operation, the operation is the same as when both seizures occur at the same time, except that the momentary operation described for terminating-start relay 16A7 does not occur, as that relay has already been disconnected at break contact 2 of outgoing-start auxiliary relay 16A15.

VIE3. *Terminating-call seizure occurs first*

When the terminating-call seizure of the block controller and related apparatus occurs before the overlapping seizure for outgoing-call operation, the immediate result depends upon whether the outgoing-call seizure occurs before or after the operation of operate relay 16A14.

VIE3a. *Operate relay 16A14 still unoperated*

If the terminating-call operations have not proceeded to the point where matching and select-magnet operation have been followed by the described operation of operate relay 16A14 to close the hold-magnet circuits, the operation of relays 16A17 and 16A15 restores terminating-start auxiliary relay 16A7 as described, which restores any operated one of relays 16A2 and 16A3 by opening its contacts 7.

The terminating-call operations in progress are thereby halted. But, to secure a faster clearing out of the matching-relay circuits (relays 16E11 to 16E30), contact 1 of relay 16A15 disconnects the allotter-controlled locking-ground wire 1614, and contact 5 of relay 16A15 disconnects wire 1611 to open-circuit match-cut-through relay 16D9, which disconnects the ground-connected test windings (the lower windings) of the matching relays 16E11 to 16E30.

After the outgoing operations have been disposed of and relay 16A17 and 16A15 have restored, terminating-start auxiliary relay 16A7 reoperates as described to restart the interrupted terminating-call operations in the block controller.

VIE3b. *Operate relay 16A14 already operated*

If the terminating-call operations have so far proceeded that the described matching and select-magnet operations have been followed by the operation of operate relay 16A14, the terminating-call operations are permitted to proceed to their conclusion notwithstanding the operation of outgoing-start relay 16A17 and its auxiliary relay 16A15. To disrupt the operations at this point would often lead to circuit confusion, as (for example) some of the concerned hold magnets may have operated, and locked, but not others.

With operate relay 16A14 operated, ground at its contacts 3 remains on the circuit of terminating-start auxiliary relay 16A7 notwithstanding the operation of relay 16A15; operate relay 16A14 remains locked operated through its own contacts 4 rather than being disconnected by break contact 3 of relay 16A15; and ground through contacts 1 and 2 of relay 16A13 and 16A14 remains on locking wire 1614 rather than being disconnected by contact 1 of relay 16A15. The opening of a point in the circuit of match-cut-through 16D9 by contact 5 of relay 16A15 does no harm, as relay 16D9 has been restored before the operation of relay 16A14.

With relay 16A7 held operated, the outgoing-call progress-timing action of relays 16A18 and 16A19 is withheld at break contact 2 thereof, and break contact 6 of relay 16A7 maintains transfer relay 16A20 disconnected.

With relays 16A7 and 16A14 operated, ground through contacts 8, 4, and 8 of relays 16A7, 16A13, and 16A14 is held on hold-magnet wire HM of the block-controller switch 1500 to maintain that switch set for the terminating call notwithstanding that its select magnets have been reset for the outgoing call.

When the described hold-magnet operation occurs responsive to the operation of relay 16A14, the described outgoing-call clear-out operation of the block controller is initiated at the connected block coupler 500 and also by the operation of the slightly slow-operating clearout relay 16A13. Reset relay 16A12, operated by relay 16A13, open-circuits operate relay 16A14, which is also open-circuited at contacts 3 of relay 16A7 responsive to the opening as described of the terminating-start-wire TER—ST. Relays 16A14, 16A13, and 16A12 thereupon restore.

Upon the restoration of relay 16A7, or upon the operation of clear-out relay 16A13, ground is removed from hold-magnet wire HM to permit the block-controlled switch 1500 to be reset for the outgoing call, whereupon conductor OTG—MG becomes grounded as described in the former application to control the outgoing matching operation.

Also, upon the restoration of relay 16A7 or upon the operation of relay 16A13, locking ground is removed from locking wire 1614 restoring the operated matching relay (16E11 to 16E30) to open the primary and secondary select-magnet circuits.

Upon the restoration of relay 16A7, its break contact 6 extends ground to the lower terminal of transfer relay 16A20 to operate that relay in series with the lower winding of match-complete relay 16E7 as previously described. Transfer relay 16A20, however, is short-circuited by ground on the associated wire SON until the primary and secondary select magnets on the block-link frame have restored to remove the ground therefrom. When ground is thus removed from conductor SON, transfer relay 16A20 operates in series with the lower winding of match-complete relay 16E7 with results as hereinbefore described.

By the foregoing operations, the terminating-call operations just being concluded are allowed to proceed to normal termination, whereupon the temporarily delayed outgoing-call operations proceed normally.

VII. SECOND EMBODIMENT
(FIGS. 11 AND 12)

The second embodiment of this invention (shown in Figs. 11 and 12) provides a further improved control arrangement for path selection.

Fig. 12 shows a partial circuit diagram of the line controller and Fig. 11 shows a partial circuit diagram of the block controller. The circuit parts omitted are assumed to be shown in Figs. 9 and 10.

As will hereinafter appear, the principal feature of the second embodiment is that the terminating-call matching operations are effectively started somewhat sooner than in the first embodiment. The noted improvement is based on the line controller first effecting frame identification in the block controller, following which it transmits a match-start signal to the block controller as soon as the line-controller apparatus is ready. These successive operations, while speeding up match completion as noted, require two wires (TF and MC) in place of the single signal wire TF of the first embodiment.

VIIA. LINE CONTROLLER 1200' (FIG. 12)

Referring to Fig. 12, originating-call operation of line controller 1200' is the same as hereinbefore described for line controller 1200 of Fig. 9.

On terminating-call operation, terminating-start relay 12B8 of line controller 1200' operates incidental to the grounding of the selected P lead by the block translator as hereinbefore described. Its contacts 6 place ground on the terminating-frame wire TF to identify the called line-link frame to the block controller as disclosed in the former Bellamy and Bowser application.

Responsive to the hereinbefore described operation of the associated line-controller switches to select the concerned primary switch and line links thereof, ground appears on hold-pilot wire HP-1 as previously described. This ground is transmitted to the block controller over match-control wire MC to start matching operations therein.

Except as noted above, the terminating-call operation of the line controller 1200' is as hereinbefore described for line controller 1200 of Fig. 9.

VIIB. BLOCK CONTROLLER 1600¹ (FIG. 11)

Referring to Fig. 11, the operation of block controller 1600¹ on outgoing calls is as hereinbefore described for block controller 1600 of Fig. 10, and its operation on terminating calls is the same as described, except as noted hereinafter.

On terminating-call operation, when terminating-start auxiliary relay 16A7 of block controller 1600¹ operates as described for Fig. 10, its contacts 10 prepare a path for grounding match-start wire 1610'.

If the called line is one served by line-link frame A, line controller 1200' (Fig. 12) of line-link frame A is the one used in the extension of the connection toward the noted called line. Then, when such line controller 1200' grounds its terminating-frame wire TF as described, wire TFA of Fig. 11 is consequently grounded, thereby operating frame identity relay 16B11 in parallel with call-in relay 16C3 of Fig. 10. Contacts of relay 16B11 connect the output wires (1621 to 1624) of the call-in allotter to the frame-A terminating-trunk call-in relays 16B12 to 16B15, and also connect frame-A wires TSA, CLSA, MCA and ONA to the corresponding internal wires TS, CLS, MC, and ON.

When ground is later placed on match-control wire MCA by the line controller apparatus as described for Fig. 12, such ground is extended through contacts of relay 16B11 to wire MC of the block controller, and thence through contacts 10 of relay 16A7, to match-start wire 1610'. Ground on wire 1610' causes matching to occur as described for Fig. 10.

Since relay 16B11 is already operated when ground is placed on wire MC as noted above, the matching operations are started immediately in the block controller 1600' rather than awaiting the operating time of the noted frame identity relay 16B11 as is required in the block controller of Fig. 10.

As noted above, the subsequent operation of block controller 1600¹ is as described for block controller 1600 of Fig. 10.

VIII. THIRD EMBODIMENT (FIG. 13)

The third embodiment of this invention (shown in Fig. 13, considered with Fig. 12) provides a still further improved control arrangement for path selection.

Fig. 13 shows a partial circuit diagram of block controller 1600². The circuit parts not shown are assumed to be as shown in Fig. 10.

As will hereinafter appear, the principal feature of the third embodiment is that the terminating-call matching operations are effectively started somewhat sooner than in either of the other embodiments. The noted improvement is based on block controller 1600² operating the currently allotted terminating-trunk call-in relay and associated line-link call-in preparatory to matching before the line-controller 1200' transmits the described match-start signal (over its wire MC).

The operation of block controller 1600² of Fig. 13 on outgoing calls is as described for block controller 1600 of Fig. 10, and its operation on terminating calls is the same as described for Fig. 10 except as noted hereinafter.

On terminating-call operation, when terminating-start auxiliary relay 16A7 of block controller 1600² operates as described for Fig. 10, its contacts 10 join wires MC and 1610¹ preparatory to starting the call-in pulser (relays 16B1, C1, and C2 of Fig. 10).

If the called line is one served by line-link frame A, line controller 1200' (Fig. 12) of line-link frame A is the one used in the extension of the connection toward the noted called line. Then, when such line controller 1200' grounds its terminating-frame wire TF as described, wire TFA of Fig. 13 is consequently grounded, thereby operating frame-identity relay 16B11 in parallel with call-in relay 16C3 of Fig. 10.

Contacts of relay 16B11 connect the output wires (1621 to 1624) of the call-in allotter to terminating-trunk call-in relays 16B12 to 16B15, and connect frame-A wires TSA, CLSA, MCA, and ONA to the corresponding internal wires TS, CLS, MC, and ON. Relay 16B11 also grounds wire 1610², branch 1300 of which serves as the locking wire for the call-in totalizer (relays 16B7 to 16B10, Fig. 10). The ground on wire 1610² extends through contacts of the call-in allotter (relays 16B2 to 16B6, Fig. 10) to one or another of the output wires 1621 to 1624 depending on the position of the call-in allotter. Ground on any such wire operates the associated one of the frame-A terminating-trunk call-in relays 16B12 to 16B15 through contacts of relay 16B11, and operates the corresponding one of call-in relays 16C7 to 16C10 (Fig. 10).

When the line controller 1200' of Fig. 12 is ready for the terminating matching operation, wire MC thereof is grounded as described. This occurs coincidentally with the described bringing in of the sleeves of the concerned group of line links for test by link-test relays 12D1 to 12D10 (Fig. 9). On operating, any such relay closes the associated one of the link wires LK1 to LK10 to serve as a signal to the block controller that the corresponding line link is idle. With the noted call-in relays operated in the block controller 1600², along with match-cut-through relay 16D9 (Fig. 10), the closing of any noted wire LK results immediately in the operation of one or both of the two associated ones of the matching relays (16E11 to 16E30, Fig. 16), subject to the existing setting of terminating-trunk test relays 16C11 to 16C29 and of block-link test relays 16D11 to 16D30. The matching operation is thus initiated in block controller 1600² over wires LK of the concerned line controller, causing one or more matching relays to operate immediately if a match is available on the current call-in of terminating trunks, and this occurs without the necessity of awaiting the operation of one or more relays in the block controller 1600², as required for block controllers 1600 and 1600¹.

When wire MCA of block controller 1600² is grounded as described, ground is thereby extended through contacts of relays 16B11 and 16A7 to wire 1610¹, thereby starting the call-in pulser into operation to control the advance of the call-in allotter if matching does not occur on the current call-in of terminating trunks.

With locking wire 1300 of the call-in totalizer constituting a branch of wire 1610², which remains grounded during any outgoing-call operation which may intervene as described during terminating-call operation, the call-in totalizer remains set during any such intervention, thereby permitting the use of only the unused call-ins when terminating-call operations are resumed following the noted intervention. If the full number of call-ins are desired under the noted circumstances, it suffices to transfer wire 1300 from wire 1610² to wire 1610¹, which loses ground at contacts 10 of relay 16A7 whenever an outgoing call intervenes.

I claim:

1. In a switching system, means including block links and respectively corresponding terminating trunks and line links serially related therewith for extending connections to desired called lines, switching apparatus for extending connections to said block links respectively, for interconnecting them with the terminating trunks, and for interconnecting the line links with the terminating trunks and with the called lines, means effective when any said line is called for extending a temporary test connection thereto over a circuit path excluding said trunks, links, and switching apparatus, means effective coincidentally with the said extension of the temporary test connection for matching a path to the called line over an idle terminating trunk and an idle corresponding line link, and means effective following said matching and controlled over said temporary test connection for operating said switching apparatus to extend a connection to the called line over the matched path subject to the called line being idle.

2. In a crossbar switching system including a controller crossbar switch having individually operable select magnets and contact sets comprising groups selectable by said select magnets respectively, said switch having first and second groups of hold magnets, each hold magnet being operable to close a separate contact set in any group selected by an operated select magnet, a common operate circuit for the hold magnets of the first group and separate operate circuits for the hold magnets of the second group, a first hold-pilot circuit path and means for closing it subject to the operation of all the hold magnets of the first group, and a second hold-pilot circuit path and means for closing it subject to the operation of any hold magnet in the second group.

3. In a crossbar switching system including a pair of crossbar controller switches each having individually operable select magnets and contact sets comprising groups selectable by said select magnets respectively, each said switch having a first and a second group of hold magnets, each hold magnet being operable to close a separate contact set in any group selected by an operated select magnet, a first hold-pilot circuit path and means for closing it subject to the operation of all the hold magnets of the first group in both controller switches, and a second hold-pilot circuit path and means for closing it subject to the operation of any hold magnet in the second group of either switch provided it is accompanied by the operation of any hold magnet in the second group of the other switch.

4. In a switching system including switching apparatus operable to extend calling ones of a number of lines to respective idle trunks over respective idle line links, said lines comprising groups served respectively by groups of said line links, said trunks corresponding respectively to the line links in any said group thereof, a line controller common to all said lines, means controlled by the line controller responsive to a calling condition on any one of said lines for identifying the group in which such line is located and for calling in the line links comprising the group serving the identified group of lines, means in the line controller for thereupon testing the called-in line links and said trunks to match a path from the calling line to an idle trunk over an idle line link, means in the line controller for operating said switching apparatus to extend the calling line over the matched path and for clearing out the line controller, timing apparatus operable to clear out the line controller when no path can be matched from the calling line, and means operable coincidentally with the said calling in of line links for initiating the operation of said timing apparatus.

5. In a switching system including switching apparatus operable to extend calling ones of a number of lines to respective idle trunks over respective idle line links, said lines comprising groups served respectively by groups of said line links, said trunks comprising separate call-in groups, each such group comprising trunks corresponding respectively to line links in any said group thereof, a line controller common to all said lines, means controlled by the line controller responsive to a calling condition on any one of said lines for identifying the group in which such line is located and for calling in the line links comprising the group serving the identified group of lines, means in the line controller for thereupon testing the called-in line links, call-in apparatus for calling in the trunk groups in succession and for testing them with the line links to match a path from the calling line to an idle trunk over an idle line link, means in the line controller for operating said switching apparatus to extend the calling line over the matched path and for clearing out the line controller, and means operable coincidentally with the said calling in of line links for initiating the operation of said call-in apparatus.

6. In a crossbar switching system including lines comprising groups served by respective line controllers and by respective groups of terminating trunks and line links, a block controller common to the said line controllers and acting in cooperation with the line controller serving a called line for extending a connection thereto over a matched path including in tandem an idle block link, an idle terminating trunk, and an idle line link, means controlled by the last-noted line controller for calling in a group of line links for test incidental to the selection of a matched path to the called line and for signalling the block controller coincidentally therewith that the line links have been called in, the block controller responding to said signal by calling in for test terminating trunks in the group corresponding to the line controller from which the signal was received and by matching a path to the called line over a block link, one of the last-named terminating trunks, and one of the last-named line links.

7. In a crossbar switching system including lines comprising groups served by respective line controllers and by respective groups of terminating trunks and line links, a block controller common to the said line controllers and acting in cooperation with the line controller serving a called line for extending a connection thereto over a matched path including in tandem an idle block link, an idle terminating trunk, and an idle line link, means controlled by the last-noted line controller for calling in a group of line links for test incidental to the selection of a matched path to the called line and for signalling the block controller coincidentally therewith that the line links have been called in, the block controller responding to said signal by matching a path to the called line over a block link, a terminating trunk serving the group containing the called line, and one of the last-noted line links.

8. In a crossbar switching system including lines comprising groups served by respective line controllers and by respective groups of terminating trunks and line links, a block controller common to the said line controllers and acting in cooperation with the line controller serving any called one of said called lines for extending a connection thereto over a matched path including an idle terminating trunk and an idle line link in tandem, means for taking for use the block controller and the line controller serving the called line, means in the block controller for testing terminating trunks in the group serving the called line and for preparing matching circuits corresponding respectively to the terminating trunks, means in the line controller for testing line links serving the called line and corresponding respectively to said matching circuits, the last said testing means closing the matching circuit corresponding to any idle one of the testing line links subject to the corresponding terminating trunk having been found idle by the block controller.

9. In a crossbar switching system including lines comprising groups served by respective line controllers and by respective groups of terminating trunks and line links, a block controller common to the said line controllers and acting in cooperation with the line controller serving any called one of said called lines for extending a connection thereto over a matched path including an idle terminating trunk and an idle line link in tandem, means for taking for use the block controller and the line controller serving the called line, means in the block controller for testing terminating trunks in the group serving the called line and for preparing matching circuits corresponding respectively to the terminating trunks, means in the line controller for testing line links serving the called line and corresponding respectively to said matching circuits, the last said testing means closing the matching circuit corresponding to any idle one of the tested line links subject to the corresponding terminating trunk and block link having been found idle by the block controller, means effective coincidentally with the said testing of line links for transmitting a control signal to the block controller, the block controller responding to said control signal by starting a timing operation which culminates in abandonment of the attempt to close a matching circuit if none has been closed before the end of the timing operation.

RICHARD P. BOYER, Jr.

No references cited.